United States Patent
Schmidt et al.

(10) Patent No.: US 10,175,376 B2
(45) Date of Patent: Jan. 8, 2019

(54) METAL DETECTOR APPARATUS, SYSTEM, AND METHOD

(71) Applicant: Proteus Digital Health, Inc., Redwood City, CA (US)

(72) Inventors: Raymond Schmidt, San Mateo, CA (US); Patricia Johnson, San Carlos, CA (US); Maria Holen, Santa Clara, CA (US); Richard Huang, Union City, CA (US); Alvin Thai, San Jose, CA (US)

(73) Assignee: PROTEUS DIGITAL HEALTH, INC., Redwood City, CA (US)

( * ) Notice: Subject to any disclaimer, the term of this patent is extended or adjusted under 35 U.S.C. 154(b) by 251 days.

(21) Appl. No.: 14/776,358

(22) PCT Filed: Mar. 14, 2014

(86) PCT No.: PCT/US2014/029272
§ 371 (c)(1),
(2) Date: Sep. 14, 2015

(87) PCT Pub. No.: WO2014/144738
PCT Pub. Date: Sep. 18, 2014

(65) Prior Publication Data
US 2016/0033667 A1    Feb. 4, 2016

Related U.S. Application Data

(60) Provisional application No. 61/794,492, filed on Mar. 15, 2013.

(51) Int. Cl.
*G01V 3/10* (2006.01)
*G01V 15/00* (2006.01)

(52) U.S. Cl.
CPC ............... *G01V 3/10* (2013.01); *G01V 3/104* (2013.01); *G01V 15/00* (2013.01)

(58) Field of Classification Search
USPC ................................................. 324/234–238
See application file for complete search history.

(56) References Cited

U.S. PATENT DOCUMENTS

| 1,548,459 A | 8/1925 | Hammer |
| 2,587,158 A * | 2/1952 | Hofberg .................. B07C 5/344 |
| | | 209/523 |

(Continued)

FOREIGN PATENT DOCUMENTS

| CN | 1588649 | 3/2005 |
| CN | 1650844 | 8/2005 |

(Continued)

OTHER PUBLICATIONS

Youtube video Pharmaceutical Metal Detector/Tablet Metal Detector/ Capsule Metal Detector/ Dry Fruits https://www.youtube.com/watch?v=IO126txam_s, May 12, 2012.*

(Continued)

*Primary Examiner* — David M. Gray
*Assistant Examiner* — Geoffrey T Evans
(74) *Attorney, Agent, or Firm* — K&L Gates LLP

(57) ABSTRACT

Provided is an apparatus, system, and method for detecting a metal contaminant in a sensor-enabled dose form. According to the method, a sensor-enabled dose form is oriented in a predetermined orientation. The sensor-enabled dose form is received through an aperture of a metal detector. A detection signal is generated by the metal detector in response to receiving the sensor-enabled dose form through the aperture of the metal detector. The detection signal is compared to a predetermined threshold. The presence of a metal contaminant in the sensor-enabled dose form is deter- (Continued)

mined based on the comparison of the detection signal and the predetermined threshold. In another method, the sensor-enabled dose form is first oriented in a first orientation and then in a second orientation. The apparatus includes a guide, a metal detector, and a comparator circuit. The system further includes a controller to reject contaminated sensor-enabled dose forms.

30 Claims, 16 Drawing Sheets

(56) References Cited

U.S. PATENT DOCUMENTS

| | | | |
|---|---|---|---|
| 2,973,555 A | 3/1961 | Schwepke | |
| 3,048,526 A | 8/1962 | Boswell | |
| 3,079,824 A | 3/1963 | Schott | |
| 3,096,248 A | 7/1963 | Rudzki | |
| 3,176,399 A | 4/1965 | Marino et al. | |
| 3,589,943 A | 6/1971 | Grubb et al. | |
| 3,607,788 A | 9/1971 | Adolph | |
| 3,642,008 A | 2/1972 | Bolduc | |
| 3,679,480 A | 7/1972 | Brown et al. | |
| 3,682,160 A | 8/1972 | Murata | |
| 3,719,183 A | 3/1973 | Schwartz | |
| 3,799,802 A | 3/1974 | Schneble, Jr. et al. | |
| 3,828,766 A | 8/1974 | Krasnow | |
| 3,837,339 A | 9/1974 | Aisenberg et al. | |
| 3,849,041 A | 11/1974 | Knapp | |
| 3,893,111 A | 7/1975 | Cotter | |
| 3,944,064 A | 3/1976 | Bashaw et al. | |
| 3,967,202 A | 6/1976 | Batz | |
| 3,989,050 A | 11/1976 | Buchalter | |
| 4,017,856 A | 4/1977 | Wiegand | |
| 4,055,178 A | 10/1977 | Harrigan | |
| 4,062,750 A | 12/1977 | Butler | |
| 4,077,397 A | 3/1978 | Ellis | |
| 4,077,398 A | 3/1978 | Ellis | |
| 4,082,087 A | 4/1978 | Howson | |
| 4,090,752 A | 5/1978 | Long | |
| 4,106,348 A | 8/1978 | Auphan | |
| 4,129,125 A | 12/1978 | Lester | |
| 4,139,589 A | 2/1979 | Beringer et al. | |
| 4,143,770 A * | 3/1979 | Grimmell | B07C 5/368 |
| | | | 209/558 |
| 4,166,453 A | 9/1979 | McClelland | |
| 4,239,046 A | 12/1980 | Ong | |
| 4,251,795 A | 2/1981 | Shibasaki et al. | |
| 4,269,189 A | 5/1981 | Abraham | |
| 4,331,654 A | 5/1982 | Morris | |
| 4,345,588 A | 8/1982 | Widder et al. | |
| 4,418,697 A | 12/1983 | Tama | |
| 4,425,117 A | 1/1984 | Hugemann | |
| 4,439,196 A | 3/1984 | Higuchi | |
| 4,494,950 A | 1/1985 | Fischel | |
| 4,559,950 A | 12/1985 | Vaughan | |
| 4,564,363 A | 1/1986 | Bagnall et al. | |
| 4,635,641 A | 1/1987 | Hoffman | |
| 4,654,165 A | 3/1987 | Eisenber | |
| 4,663,250 A | 5/1987 | Ong et al. | |
| 4,669,479 A | 6/1987 | Dunseath | |
| 4,687,660 A | 8/1987 | Baker et al. | |
| 4,725,997 A | 2/1988 | Urquhart et al. | |
| 4,749,575 A | 6/1988 | Rotman et al. | |
| 4,763,659 A | 8/1988 | Dunseath | |
| 4,767,627 A | 8/1988 | Caldwell et al. | |
| 4,775,536 A | 10/1988 | Patell | |
| 4,784,162 A | 11/1988 | Ricks | |
| 4,793,825 A | 12/1988 | Benjamin et al. | |
| 4,814,181 A | 3/1989 | Jordan et al. | |
| 4,844,076 A | 7/1989 | Lesho | |
| 4,847,090 A | 7/1989 | Della Posta et al. | |
| 4,876,093 A | 10/1989 | Theeuwes et al. | |
| 4,891,223 A | 1/1990 | Ambegaonakar et al. | |
| 4,896,261 A | 1/1990 | Nolan | |
| 4,975,230 A | 12/1990 | Pinkhasov | |
| 4,987,897 A | 1/1991 | Funke | |
| 5,000,957 A | 3/1991 | Eckenhoff et al. | |
| 5,016,634 A | 5/1991 | Vock et al. | |
| 5,018,335 A | 5/1991 | Yamamoto et al. | |
| 5,079,006 A | 1/1992 | Urguhart | |
| 5,110,441 A | 5/1992 | Kinlen et al. | |
| 5,160,885 A | 11/1992 | Hannam et al. | |
| 5,167,626 A | 12/1992 | Casper | |
| 5,176,626 A | 1/1993 | Soehendra | |
| 5,187,723 A * | 2/1993 | Mueller-Stuercken | G01V 3/101 |
| | | | 324/243 |
| 5,213,738 A | 5/1993 | Hampton et al. | |
| 5,218,343 A | 6/1993 | Stobbe et al. | |
| 5,261,402 A | 11/1993 | DiSabito | |
| 5,263,481 A | 11/1993 | Axelgaard et al. | |
| 5,273,066 A | 12/1993 | Graham et al. | |
| 5,279,607 A | 1/1994 | Schentag et al. | |
| 5,281,287 A | 1/1994 | Lloyd | |
| 5,283,136 A | 2/1994 | Peled et al. | |
| 5,288,564 A | 2/1994 | Klein | |
| 5,305,745 A | 4/1994 | Zacouto | |
| 5,318,557 A | 6/1994 | Gross | |
| 5,331,953 A | 7/1994 | Andersson et al. | |
| 5,394,882 A | 3/1995 | Mawhinney | |
| 5,395,366 A | 3/1995 | D'Andrea et al. | |
| 5,436,091 A | 7/1995 | Shackle et al. | |
| 5,443,461 A | 8/1995 | Atkinson et al. | |
| 5,443,843 A | 8/1995 | Curatolo et al. | |
| 5,458,141 A | 10/1995 | Neil et al. | |
| 5,458,994 A | 10/1995 | Nesselbeck et al. | |
| 5,485,841 A | 1/1996 | Watkin et al. | |
| 5,506,248 A | 4/1996 | Nikfar et al. | |
| 5,551,020 A | 8/1996 | Flax et al. | |
| 5,567,210 A | 10/1996 | Bates et al. | |
| 5,596,302 A | 1/1997 | Mastrocola et al. | |
| 5,600,548 A | 2/1997 | Nguyen et al. | |
| 5,603,363 A | 2/1997 | Nelson | |
| 5,634,468 A | 6/1997 | Platt | |
| 5,645,063 A | 7/1997 | Straka et al. | |
| 5,659,247 A | 8/1997 | Clements | |
| 5,703,463 A | 12/1997 | Smith | |
| 5,705,189 A | 1/1998 | Lehmann et al. | |
| 5,724,432 A | 3/1998 | Bouvet et al. | |
| 5,738,708 A | 4/1998 | Peachey et al. | |
| 5,740,811 A | 4/1998 | Hedberg | |
| 5,757,326 A | 5/1998 | Koyama et al. | |
| 5,772,575 A | 6/1998 | Lesinski et al. | |
| 5,792,048 A | 8/1998 | Schaefer | |
| 5,802,467 A | 9/1998 | Salazar | |
| 5,833,716 A | 11/1998 | Bar-Or | |
| 5,842,324 A | 12/1998 | Grosskopf et al. | |
| 5,845,265 A | 12/1998 | Woolston | |
| 5,862,803 A | 1/1999 | Besson | |
| 5,868,136 A | 2/1999 | Fox | |
| 5,914,132 A | 6/1999 | Kelm et al. | |
| 5,914,701 A | 6/1999 | Gersheneld et al. | |
| 5,925,030 A | 7/1999 | Gross et al. | |
| 5,957,854 A | 9/1999 | Besson et al. | |
| 5,963,132 A | 10/1999 | Yoakum et al. | |
| 5,974,124 A | 10/1999 | Schlueter, Jr. et al. | |
| 5,981,166 A | 11/1999 | Mandecki | |
| 5,999,846 A | 12/1999 | Pardey et al. | |
| 6,018,229 A | 1/2000 | Mitchell et al. | |
| 6,038,464 A | 3/2000 | Axelgaard et al. | |
| 6,042,710 A | 3/2000 | Dubrow | |
| 6,047,203 A | 4/2000 | Sackner | |
| 6,068,465 A | 5/2000 | Wilson | |
| 6,068,589 A | 5/2000 | Neukermans | |
| 6,076,016 A | 6/2000 | Feierbach et al. | |
| 6,081,734 A | 6/2000 | Batz | |
| 6,091,975 A | 7/2000 | Daddona et al. | |
| 6,095,985 A | 8/2000 | Raymond et al. | |
| 6,115,636 A | 9/2000 | Ryan | |
| 6,122,351 A | 9/2000 | Schlueter, Jr. et al. | |
| 6,141,592 A | 10/2000 | Pauly | |
| 6,149,940 A | 11/2000 | Maggi et al. | |
| 6,200,265 B1 | 3/2001 | Walsh et al. | |

(56) References Cited

U.S. PATENT DOCUMENTS

| | | |
|---|---|---|
| 6,206,702 B1 | 3/2001 | Hayden et al. |
| 6,217,744 B1 | 4/2001 | Crosby |
| 6,231,593 B1 | 5/2001 | Meserol |
| 6,245,057 B1 | 6/2001 | Sieben et al. |
| 6,269,058 B1 | 7/2001 | Yamanoi et al. |
| 6,285,897 B1 | 9/2001 | Kilcoyne et al. |
| 6,287,252 B1 | 9/2001 | Lugo |
| 6,288,629 B1 | 9/2001 | Cofino et al. |
| 6,289,238 B1 | 9/2001 | Besson et al. |
| 6,315,719 B1 | 11/2001 | Rode et al. |
| 6,317,714 B1 | 11/2001 | Del Castillo |
| 6,342,774 B1 | 1/2002 | Kreisinger et al. |
| 6,344,824 B1 | 2/2002 | Takasugi et al. |
| 6,358,202 B1 | 3/2002 | Arent |
| 6,364,834 B1 | 4/2002 | Reuss |
| 6,366,206 B1 | 4/2002 | Ishikawa et al. |
| 6,371,927 B1 | 4/2002 | Brune |
| 6,374,670 B1 | 4/2002 | Spelman |
| 6,380,858 B1 | 4/2002 | Yarin et al. |
| 6,390,088 B1 | 5/2002 | Noehl et al. |
| 6,394,997 B1 | 5/2002 | Lemelson |
| 6,426,863 B1 | 7/2002 | Munshi |
| 6,432,292 B1 | 8/2002 | Pinto et al. |
| 6,440,069 B1 | 8/2002 | Raymond et al. |
| 6,441,747 B1 | 8/2002 | Khair |
| 6,453,199 B1 | 9/2002 | Kobozev |
| 6,477,424 B1 | 11/2002 | Thompson et al. |
| 6,496,705 B1 | 12/2002 | Ng et al. |
| 6,526,315 B1 | 2/2003 | Inagawa |
| 6,531,026 B1 | 3/2003 | Takeichi et al. |
| 6,544,174 B2 | 4/2003 | West |
| 6,547,994 B1 | 4/2003 | Monkhouse et al. |
| 6,564,079 B1 | 5/2003 | Cory |
| 6,567,685 B2 | 5/2003 | Takamori et al. |
| 6,572,636 B1 | 6/2003 | Hagen et al. |
| 6,577,893 B1 | 6/2003 | Besson |
| 6,579,231 B1 | 6/2003 | Phipps |
| 6,595,929 B2 | 7/2003 | Stivoric |
| 6,599,284 B2 | 7/2003 | Faour et al. |
| 6,602,518 B2 | 8/2003 | Seielstad et al. |
| 6,605,038 B1 | 8/2003 | Teller |
| 6,609,018 B2 | 8/2003 | Cory |
| 6,612,984 B1 | 9/2003 | Kerr |
| 6,632,175 B1 | 10/2003 | Marshall |
| 6,632,216 B2 | 10/2003 | Houzego et al. |
| 6,635,279 B2 | 10/2003 | Kolter et al. |
| 6,643,541 B2 | 11/2003 | Mok et al. |
| 6,654,638 B1 | 11/2003 | Sweeney |
| 6,663,846 B1 | 12/2003 | McCombs |
| 6,673,474 B2 | 1/2004 | Yamamoto |
| 6,680,923 B1 | 1/2004 | Leon |
| 6,689,117 B2 | 2/2004 | Sweeney et al. |
| 6,694,161 B2 | 2/2004 | Mehrotra |
| 6,704,602 B2 | 3/2004 | Berg et al. |
| 6,720,923 B1 | 4/2004 | Hayward et al. |
| 6,738,671 B2 | 5/2004 | Christophersom et al. |
| 6,740,033 B1 | 5/2004 | Olejniczak et al. |
| 6,745,082 B2 | 6/2004 | Axelgaard et al. |
| 6,755,783 B2 | 6/2004 | Cosentino |
| 6,757,523 B2 | 6/2004 | Fry |
| 6,759,968 B2 | 7/2004 | Zierolf |
| 6,767,200 B2 | 7/2004 | Sowden et al. |
| 6,773,429 B2 | 8/2004 | Sheppard et al. |
| 6,800,060 B2 | 10/2004 | Marshall |
| 6,801,137 B2 | 10/2004 | Eggers et al. |
| 6,816,794 B2 | 11/2004 | Alvi |
| 6,822,554 B2 | 11/2004 | Vrijens et al. |
| 6,824,512 B2 | 11/2004 | Warkentin et al. |
| 6,836,862 B1 | 12/2004 | Erekson et al. |
| 6,839,659 B2 | 1/2005 | Tarassenko et al. |
| 6,840,904 B2 | 1/2005 | Goldberg |
| 6,842,636 B2 | 1/2005 | Perrault |
| 6,845,272 B1 | 1/2005 | Thomsen |
| 6,864,780 B2 | 3/2005 | Doi |
| 6,879,810 B2 | 4/2005 | Bouet |
| 6,888,337 B2 | 5/2005 | Sawyers |
| 6,889,165 B2 | 5/2005 | Lind et al. |
| 6,909,878 B2 | 6/2005 | Haller |
| 6,922,592 B2 | 7/2005 | Thompson et al. |
| 6,928,370 B2 | 8/2005 | Anuzis et al. |
| 6,929,636 B1 | 8/2005 | Von Alten |
| 6,937,150 B2 | 8/2005 | Medema |
| 6,942,616 B2 | 9/2005 | Kerr |
| 6,946,156 B2 | 9/2005 | Bunick |
| 6,951,536 B2 | 10/2005 | Yokoi |
| 6,957,107 B2 | 10/2005 | Rogers et al. |
| 6,960,617 B2 | 11/2005 | Omidian et al. |
| 6,968,153 B1 | 11/2005 | Heinonen |
| 6,977,511 B2 | 12/2005 | Patel et al. |
| 6,982,094 B2 | 1/2006 | Sowden |
| 6,987,965 B2 | 1/2006 | Ng et al. |
| 6,990,082 B1 | 1/2006 | Zehavi et al. |
| 7,002,476 B2 | 2/2006 | Rapchak |
| 7,004,395 B2 | 2/2006 | Koenck |
| 7,009,634 B2 | 3/2006 | Iddan et al. |
| 7,009,946 B1 | 3/2006 | Kardach |
| 7,013,162 B2 | 3/2006 | Gorsuch |
| 7,016,648 B2 | 3/2006 | Haller |
| 7,020,508 B2 | 3/2006 | Stivoric |
| 7,024,248 B2 | 4/2006 | Penner et al. |
| 7,031,745 B2 | 4/2006 | Shen |
| 7,031,857 B2 | 4/2006 | Tarassenko et al. |
| 7,039,453 B2 | 5/2006 | Mullick |
| 7,044,911 B2 | 5/2006 | Drinan et al. |
| 7,046,649 B2 | 5/2006 | Awater et al. |
| 7,083,578 B2 | 8/2006 | Lewkowicz |
| 7,116,252 B2 | 10/2006 | Teraguchi |
| 7,118,531 B2 | 10/2006 | Krill |
| 7,122,143 B2 | 10/2006 | Sowden et al. |
| 7,127,300 B2 | 10/2006 | Mazar et al. |
| 7,146,228 B2 | 12/2006 | Nielsen |
| 7,146,449 B2 | 12/2006 | Do et al. |
| 7,149,581 B2 | 12/2006 | Goedeke et al. |
| 7,154,071 B2 | 12/2006 | Sattler et al. |
| 7,155,232 B2 | 12/2006 | Godfrey et al. |
| 7,160,258 B2 | 1/2007 | Imran |
| 7,164,942 B2 | 1/2007 | Avrahami |
| 7,171,166 B2 | 1/2007 | Ng et al. |
| 7,171,177 B2 | 1/2007 | Park et al. |
| 7,171,259 B2 | 1/2007 | Rytky |
| 7,176,784 B2 | 2/2007 | Gilbert et al. |
| 7,187,960 B2 | 3/2007 | Abreu |
| 7,188,199 B2 | 3/2007 | Leung et al. |
| 7,188,767 B2 | 3/2007 | Penuela |
| 7,194,038 B1 | 3/2007 | Inkinen |
| 7,196,495 B1 | 3/2007 | Burcham |
| 7,206,630 B1 | 4/2007 | Tarler |
| 7,209,790 B2 | 4/2007 | Thompson et al. |
| 7,215,660 B2 | 5/2007 | Perlman |
| 7,215,991 B2 | 5/2007 | Besson |
| 7,218,967 B2 | 5/2007 | Bergelson |
| 7,231,451 B2 | 6/2007 | Law |
| 7,243,118 B2 | 7/2007 | Lou |
| 7,246,521 B2 | 7/2007 | Kim |
| 7,249,212 B2 | 7/2007 | Do |
| 7,252,792 B2 | 8/2007 | Perrault |
| 7,253,716 B2 | 8/2007 | Lovoi et al. |
| 7,261,690 B2 | 8/2007 | Teller |
| 7,270,633 B1 | 9/2007 | Goscha |
| 7,273,454 B2 | 9/2007 | Raymond et al. |
| 7,289,855 B2 | 10/2007 | Nghiem |
| 7,291,497 B2 | 11/2007 | Holmes |
| 7,292,139 B2 | 11/2007 | Mazar et al. |
| 7,294,105 B1 | 11/2007 | Islam |
| 7,311,665 B2 | 12/2007 | Hawthorne |
| 7,313,163 B2 | 12/2007 | Liu |
| 7,317,378 B2 | 1/2008 | Jarvis et al. |
| 7,318,808 B2 | 1/2008 | Tarassenko et al. |
| 7,336,929 B2 | 2/2008 | Yasuda |
| 7,342,895 B2 | 3/2008 | Serpa |
| 7,346,380 B2 | 3/2008 | Axelgaard et al. |
| 7,349,722 B2 | 3/2008 | Witkowski et al. |
| 7,352,998 B2 | 4/2008 | Palin |
| 7,353,258 B2 | 4/2008 | Washburn |

(56) References Cited

U.S. PATENT DOCUMENTS

| | | |
|---|---|---|
| 7,357,891 B2 | 4/2008 | Yang et al. |
| 7,359,674 B2 | 4/2008 | Markki |
| 7,366,558 B2 | 4/2008 | Virtanen et al. |
| 7,368,190 B2 | 5/2008 | Heller et al. |
| 7,368,191 B2 | 5/2008 | Andelman et al. |
| 7,373,196 B2 | 5/2008 | Ryu et al. |
| 7,375,739 B2 | 5/2008 | Robbins |
| 7,376,435 B2 | 5/2008 | McGowan |
| 7,382,247 B2 | 6/2008 | Welch et al. |
| 7,382,263 B2 | 6/2008 | Danowski et al. |
| 7,387,607 B2 | 6/2008 | Holt |
| 7,388,903 B2 | 6/2008 | Godfrey et al. |
| 7,389,088 B2 | 6/2008 | Kim |
| 7,392,015 B1 | 6/2008 | Farlow |
| 7,395,106 B2 | 7/2008 | Ryu et al. |
| 7,396,330 B2 | 7/2008 | Banet |
| 7,404,968 B2 | 7/2008 | Abrams et al. |
| 7,413,544 B2 | 8/2008 | Kerr |
| 7,414,534 B1 | 8/2008 | Kroll et al. |
| 7,414,543 B2 | 8/2008 | Rye et al. |
| 7,415,242 B1 | 8/2008 | Ngan |
| 7,424,268 B2 | 9/2008 | Diener |
| 7,424,319 B2 | 9/2008 | Muehlsteff |
| 7,427,266 B2 | 9/2008 | Ayer et al. |
| 7,442,164 B2 | 10/2008 | Berrang et al. |
| 7,443,290 B2 | 10/2008 | Takiguchi |
| 7,458,887 B2 | 12/2008 | Kurosawa |
| 7,471,665 B2 | 12/2008 | Perlman |
| 7,471,992 B2 | 12/2008 | Schmidt et al. |
| 7,492,128 B2 | 2/2009 | Shen |
| 7,499,674 B2 | 3/2009 | Salokannel |
| 7,510,121 B2 | 3/2009 | Koenck |
| 7,512,448 B2 | 3/2009 | Malick |
| 7,515,043 B2 | 4/2009 | Welch |
| 7,519,416 B2 | 4/2009 | Sula et al. |
| 7,523,756 B2 | 4/2009 | Minai |
| 7,525,426 B2 | 4/2009 | Edelstein |
| 7,527,807 B2 | 5/2009 | Choi et al. |
| 7,537,590 B2 | 5/2009 | Santini, Jr. et al. |
| 7,539,533 B2 | 5/2009 | Tran |
| 7,542,878 B2 | 6/2009 | Nanikashvili |
| 7,547,278 B2 | 6/2009 | Miyazaki et al. |
| 7,551,590 B2 | 6/2009 | Haller |
| 7,554,452 B2 | 6/2009 | Cole |
| 7,558,620 B2 | 7/2009 | Ishibashi |
| 7,575,005 B2 | 8/2009 | Mumford |
| 7,616,111 B2 | 11/2009 | Covannon |
| 7,617,001 B2 | 11/2009 | Penner et al. |
| 7,626,387 B2 | 12/2009 | Adachi |
| 7,639,473 B2 | 12/2009 | Hsu et al. |
| 7,640,802 B2 | 1/2010 | King et al. |
| 7,645,262 B2 | 1/2010 | Greenberg et al. |
| 7,647,112 B2 | 1/2010 | Tracey |
| 7,647,185 B2 | 1/2010 | Tarassenko et al. |
| 7,653,031 B2 | 1/2010 | Godfrey et al. |
| 7,672,714 B2 | 3/2010 | Kuo |
| 7,673,679 B2 | 3/2010 | Harrison et al. |
| 7,678,043 B2 | 3/2010 | Gilad |
| 7,686,839 B2 | 3/2010 | Parker |
| 7,697,994 B2 | 4/2010 | Vandanacker et al. |
| 7,720,036 B2 | 5/2010 | Sadri |
| 7,729,776 B2 | 6/2010 | Von Arx et al. |
| 7,733,224 B2 | 6/2010 | Tran |
| 7,736,318 B2 | 6/2010 | Costentino |
| 7,756,587 B2 | 7/2010 | Penner et al. |
| 7,760,104 B2 | 7/2010 | Asp |
| 7,782,991 B2 | 8/2010 | Sobchak et al. |
| 7,796,043 B2 | 9/2010 | Euliano et al. |
| 7,797,033 B2 | 9/2010 | D'Andrea et al. |
| 7,809,399 B2 | 10/2010 | Lu |
| 7,844,341 B2 | 11/2010 | Von Arx et al. |
| 7,881,799 B2 | 2/2011 | Greenberg et al. |
| 7,975,587 B2 | 7/2011 | Schneider |
| 7,978,064 B2 | 7/2011 | Zdeblick et al. |
| 7,983,189 B2 | 7/2011 | Bugenhagen |
| 8,036,731 B2 | 10/2011 | Kimchy et al. |
| 8,036,748 B2 | 10/2011 | Zdeblick et al. |
| 8,054,047 B2 | 11/2011 | Chen et al. |
| 8,055,334 B2 | 11/2011 | Savage et al. |
| 8,082,919 B2 | 12/2011 | Brunnberg et al. |
| 8,119,045 B2 | 2/2012 | Schmidt et al. |
| 8,131,376 B1 | 3/2012 | Faraji et al. |
| 8,177,611 B2 | 5/2012 | Kang |
| 8,185,191 B1 | 5/2012 | Shapiro et al. |
| 8,185,646 B2 | 5/2012 | Headley |
| 8,200,320 B2 | 6/2012 | Kovacs |
| 8,207,731 B2 | 6/2012 | Moskalenko |
| 8,224,596 B2 | 7/2012 | Agrawal et al. |
| 8,253,586 B1 | 8/2012 | Matak |
| 8,254,853 B2 | 8/2012 | Rofougaran |
| 8,271,146 B2 | 9/2012 | Heber et al. |
| 8,298,574 B2 | 10/2012 | Tsabari et al. |
| 8,343,068 B2 | 1/2013 | Najafi et al. |
| 8,374,698 B2 | 2/2013 | Ok et al. |
| 8,389,003 B2 | 3/2013 | Mintchev et al. |
| 8,404,275 B2 | 3/2013 | Habboushe |
| 8,425,492 B2 | 4/2013 | Herbert et al. |
| 8,443,214 B2 | 5/2013 | Lee et al. |
| 8,454,528 B2 | 6/2013 | Yuen et al. |
| 8,532,776 B2 | 9/2013 | Greenberg et al. |
| 8,545,402 B2 * | 10/2013 | Hafezi ............... A61B 5/0031 128/902 |
| 8,547,248 B2 | 10/2013 | Zdeblick et al. |
| 8,564,432 B2 | 10/2013 | Covannon et al. |
| 8,597,186 B2 | 12/2013 | Hafezi et al. |
| 8,634,838 B2 | 1/2014 | Hellwig et al. |
| 8,647,358 B2 | 2/2014 | Brister et al. |
| 8,660,645 B2 | 2/2014 | Stevenson et al. |
| 8,668,643 B2 | 3/2014 | Kinast |
| 8,685,451 B2 | 4/2014 | Toneguzzo et al. |
| 8,697,057 B2 | 4/2014 | Van Epps et al. |
| 8,698,006 B2 | 4/2014 | Bealka et al. |
| 8,758,237 B2 | 6/2014 | Sherman et al. |
| 8,784,308 B2 | 7/2014 | Duck et al. |
| 8,816,847 B2 | 8/2014 | Zdeblick et al. |
| 8,836,513 B2 | 9/2014 | Hafezi et al. |
| 8,838,217 B2 | 9/2014 | Myr |
| 8,858,432 B2 | 10/2014 | Robertson |
| 8,908,943 B2 | 12/2014 | Berry et al. |
| 8,912,908 B2 | 12/2014 | Berkman et al. |
| 8,926,509 B2 | 1/2015 | Magar et al. |
| 8,932,221 B2 | 1/2015 | Colliou et al. |
| 8,945,005 B2 | 2/2015 | Hafezi et al. |
| 8,989,837 B2 | 3/2015 | Weinstein et al. |
| 9,031,658 B2 | 5/2015 | Chiao et al. |
| 9,088,168 B2 | 7/2015 | Mach et al. |
| 9,107,806 B2 | 8/2015 | Hafezi et al. |
| 9,119,554 B2 | 9/2015 | Robertson et al. |
| 9,119,918 B2 | 9/2015 | Robertson et al. |
| 9,149,423 B2 | 10/2015 | Duck et al. |
| 9,158,890 B2 | 10/2015 | Meredith et al. |
| 9,161,707 B2 | 10/2015 | Hafezi et al. |
| 9,189,941 B2 | 11/2015 | Eschelman et al. |
| 9,226,663 B2 | 1/2016 | Fei |
| 9,226,679 B2 | 1/2016 | Balda |
| 9,268,909 B2 | 2/2016 | Jani et al. |
| 9,270,025 B2 | 2/2016 | Robertson et al. |
| 9,271,897 B2 | 3/2016 | Costello et al. |
| 9,277,864 B2 | 3/2016 | Yang et al. |
| 9,433,371 B2 | 9/2016 | Hafezi et al. |
| 9,439,599 B2 | 9/2016 | Thompson et al. |
| 9,517,012 B2 | 12/2016 | Lane et al. |
| 9,649,066 B2 | 5/2017 | Zdeblick et al. |
| 9,741,975 B2 | 8/2017 | Laulicht et al. |
| 9,756,874 B2 | 9/2017 | Arne et al. |
| 2001/0027331 A1 | 10/2001 | Thompson |
| 2001/0044588 A1 | 11/2001 | Mault |
| 2001/0051766 A1 | 12/2001 | Gazdinski |
| 2002/0002326 A1 | 1/2002 | Causey et al. |
| 2002/0026111 A1 | 2/2002 | Ackerman |
| 2002/0032384 A1 | 3/2002 | Raymond et al. |
| 2002/0032385 A1 | 3/2002 | Raymond et al. |
| 2002/0040278 A1 | 4/2002 | Anuzis et al. |
| 2002/0077620 A1 | 6/2002 | Sweeney et al. |

(56) References Cited

U.S. PATENT DOCUMENTS

| | | |
|---|---|---|
| 2002/0128934 A1 | 9/2002 | Shaer |
| 2002/0132226 A1 | 9/2002 | Nair |
| 2002/0136744 A1 | 9/2002 | McGlynn et al. |
| 2002/0179921 A1 | 12/2002 | Cohn |
| 2002/0192159 A1 | 12/2002 | Reitberg |
| 2002/0193669 A1 | 12/2002 | Glukhovsky |
| 2002/0198470 A1 | 12/2002 | Imran et al. |
| 2003/0017826 A1 | 1/2003 | Fishman et al. |
| 2003/0023150 A1 | 1/2003 | Yokoi et al. |
| 2003/0028226 A1 | 2/2003 | Thompson |
| 2003/0062551 A1 | 4/2003 | Chen et al. |
| 2003/0065536 A1 | 4/2003 | Hansen |
| 2003/0076179 A1 | 4/2003 | Branch et al. |
| 2003/0083559 A1 | 5/2003 | Thompson |
| 2003/0091625 A1 | 5/2003 | Hariharan et al. |
| 2003/0126593 A1 | 7/2003 | Mault |
| 2003/0130714 A1 | 7/2003 | Nielsen et al. |
| 2003/0135128 A1 | 7/2003 | Suffin et al. |
| 2003/0135392 A1 | 7/2003 | Vrijens et al. |
| 2003/0152622 A1 | 8/2003 | Louie-Helm et al. |
| 2003/0158466 A1 | 8/2003 | Lynn et al. |
| 2003/0158756 A1 | 8/2003 | Abramson |
| 2003/0162556 A1 | 8/2003 | Libes |
| 2003/0164401 A1 | 9/2003 | Andreasson et al. |
| 2003/0164766 A1* | 9/2003 | Britton .................. G01V 3/105 340/552 |
| 2003/0167000 A1 | 9/2003 | Mullick et al. |
| 2003/0171791 A1 | 9/2003 | KenKnight |
| 2003/0171898 A1 | 9/2003 | Tarassenko et al. |
| 2003/0181788 A1 | 9/2003 | Yokoi et al. |
| 2003/0185286 A1 | 10/2003 | Yuen |
| 2003/0187337 A1 | 10/2003 | Tarassenko et al. |
| 2003/0187338 A1 | 10/2003 | Say et al. |
| 2003/0195403 A1 | 10/2003 | Berner et al. |
| 2003/0213495 A1 | 11/2003 | Fujita et al. |
| 2003/0214579 A1 | 11/2003 | Iddan |
| 2003/0216622 A1 | 11/2003 | Meron et al. |
| 2003/0216625 A1 | 11/2003 | Phipps |
| 2003/0216666 A1 | 11/2003 | Ericson et al. |
| 2003/0216729 A1 | 11/2003 | Marchitto |
| 2003/0219484 A1 | 11/2003 | Sowden et al. |
| 2003/0232895 A1 | 12/2003 | Omidian et al. |
| 2004/0008123 A1 | 1/2004 | Carrender et al. |
| 2004/0018476 A1 | 1/2004 | LaDue |
| 2004/0034295 A1 | 2/2004 | Salganicoff |
| 2004/0046550 A1* | 3/2004 | Kondo .................. G01N 27/82 324/233 |
| 2004/0049245 A1 | 3/2004 | Gass |
| 2004/0073095 A1 | 4/2004 | Causey et al. |
| 2004/0073454 A1 | 4/2004 | Urquhart et al. |
| 2004/0077995 A1 | 4/2004 | Ferek-Petric |
| 2004/0082982 A1 | 4/2004 | Gord et al. |
| 2004/0087839 A1 | 5/2004 | Raymond et al. |
| 2004/0092801 A1 | 5/2004 | Drakulic |
| 2004/0106859 A1 | 6/2004 | Say et al. |
| 2004/0115507 A1 | 6/2004 | Potter et al. |
| 2004/0115517 A1 | 6/2004 | Fukada et al. |
| 2004/0121015 A1 | 6/2004 | Chidlaw et al. |
| 2004/0148140 A1 | 7/2004 | Tarassenko et al. |
| 2004/0153007 A1 | 8/2004 | Harris |
| 2004/0167226 A1 | 8/2004 | Serafini |
| 2004/0167801 A1 | 8/2004 | Say et al. |
| 2004/0193020 A1 | 9/2004 | Chiba |
| 2004/0193029 A1 | 9/2004 | Gluhovsky |
| 2004/0193446 A1 | 9/2004 | Mayer et al. |
| 2004/0199222 A1 | 10/2004 | Sun et al. |
| 2004/0215084 A1 | 10/2004 | Shimizu et al. |
| 2004/0218683 A1 | 11/2004 | Batra |
| 2004/0220643 A1 | 11/2004 | Schmidt |
| 2004/0224644 A1 | 11/2004 | Wu |
| 2004/0225199 A1 | 11/2004 | Evanyk |
| 2004/0253304 A1 | 12/2004 | Gross et al. |
| 2004/0258571 A1 | 12/2004 | Lee et al. |
| 2004/0259899 A1 | 12/2004 | Sanghvi et al. |
| 2004/0260154 A1 | 12/2004 | Sidelnik |
| 2005/0003074 A1 | 1/2005 | Brown et al. |
| 2005/0017841 A1 | 1/2005 | Doi |
| 2005/0020887 A1 | 1/2005 | Goldberg |
| 2005/0021370 A1 | 1/2005 | Riff |
| 2005/0024198 A1 | 2/2005 | Ward |
| 2005/0027205 A1 | 2/2005 | Tarassenko et al. |
| 2005/0033544 A1* | 2/2005 | Brooks .................. G01R 33/02 702/128 |
| 2005/0038321 A1 | 2/2005 | Fujita et al. |
| 2005/0043634 A1 | 2/2005 | Yokoi et al. |
| 2005/0043894 A1 | 2/2005 | Fernandez |
| 2005/0054897 A1 | 3/2005 | Hashimoto et al. |
| 2005/0055014 A1 | 3/2005 | Coppeta et al. |
| 2005/0062644 A1 | 3/2005 | Leci |
| 2005/0065407 A1 | 3/2005 | Nakamura et al. |
| 2005/0070778 A1 | 3/2005 | Lackey |
| 2005/0075145 A1 | 4/2005 | Dvorak et al. |
| 2005/0090753 A1 | 4/2005 | Goor et al. |
| 2005/0092108 A1 | 5/2005 | Andermo |
| 2005/0096514 A1 | 5/2005 | Starkebaum |
| 2005/0096562 A1 | 5/2005 | Delalic et al. |
| 2005/0101843 A1 | 5/2005 | Quinn |
| 2005/0101872 A1 | 5/2005 | Sattler |
| 2005/0115561 A1 | 6/2005 | Stahmann et al. |
| 2005/0116820 A1 | 6/2005 | Goldreich |
| 2005/0117389 A1 | 6/2005 | Worledge |
| 2005/0121322 A1 | 6/2005 | Say et al. |
| 2005/0131281 A1 | 6/2005 | Ayer et al. |
| 2005/0143623 A1 | 6/2005 | Kojima |
| 2005/0146594 A1 | 7/2005 | Nakatani et al. |
| 2005/0148883 A1 | 7/2005 | Boesen |
| 2005/0154428 A1 | 7/2005 | Bruinsma |
| 2005/0156709 A1 | 7/2005 | Gilbert et al. |
| 2005/0165323 A1 | 7/2005 | Montgomery |
| 2005/0177069 A1 | 8/2005 | Takizawa |
| 2005/0182389 A1 | 8/2005 | LaPorte |
| 2005/0187789 A1 | 8/2005 | Hatlestad et al. |
| 2005/0192489 A1 | 9/2005 | Marshall |
| 2005/0197680 A1 | 9/2005 | DelMain et al. |
| 2005/0208251 A1 | 9/2005 | Aisenbrey |
| 2005/0228268 A1 | 10/2005 | Cole |
| 2005/0234307 A1 | 10/2005 | Heinonen |
| 2005/0240305 A1 | 10/2005 | Bogash et al. |
| 2005/0245794 A1 | 11/2005 | Dinsmoor |
| 2005/0259768 A1 | 11/2005 | Yang et al. |
| 2005/0261559 A1 | 11/2005 | Mumford |
| 2005/0267556 A1 | 12/2005 | Shuros et al. |
| 2005/0267756 A1 | 12/2005 | Schultz et al. |
| 2005/0277912 A1 | 12/2005 | John |
| 2005/0277999 A1 | 12/2005 | Strother et al. |
| 2005/0279054 A1 | 12/2005 | Mauze et al. |
| 2005/0280539 A1 | 12/2005 | Pettus |
| 2005/0285746 A1 | 12/2005 | Sengupta |
| 2005/0288594 A1 | 12/2005 | Lewkowicz et al. |
| 2006/0001496 A1 | 1/2006 | Abrosimov et al. |
| 2006/0028727 A1 | 2/2006 | Moon et al. |
| 2006/0036134 A1 | 2/2006 | Tarassenko et al. |
| 2006/0058602 A1 | 3/2006 | Kwiatkowski et al. |
| 2006/0061472 A1 | 3/2006 | Lovoi et al. |
| 2006/0065713 A1 | 3/2006 | Kingery |
| 2006/0068006 A1 | 3/2006 | Begleiter |
| 2006/0074283 A1 | 4/2006 | Henderson |
| 2006/0074319 A1 | 4/2006 | Barnes et al. |
| 2006/0078765 A1 | 4/2006 | Yang et al. |
| 2006/0095091 A1 | 5/2006 | Drew |
| 2006/0095093 A1 | 5/2006 | Bettesh et al. |
| 2006/0100533 A1 | 5/2006 | Han |
| 2006/0109058 A1 | 5/2006 | Keating |
| 2006/0110962 A1 | 5/2006 | Powell |
| 2006/0122474 A1 | 6/2006 | Teller et al. |
| 2006/0122494 A1 | 6/2006 | Bouchoucha |
| 2006/0122667 A1 | 6/2006 | Chavan et al. |
| 2006/0129060 A1 | 6/2006 | Lee et al. |
| 2006/0136266 A1 | 6/2006 | Tarassenko et al. |
| 2006/0142648 A1 | 6/2006 | Banet |
| 2006/0145876 A1 | 7/2006 | Kimura |
| 2006/0148254 A1 | 7/2006 | McLean |
| 2006/0149339 A1 | 7/2006 | Burnes |
| 2006/0155174 A1 | 7/2006 | Glukhovsky et al. |

(56) References Cited

U.S. PATENT DOCUMENTS

| | | |
|---|---|---|
| 2006/0155183 A1 | 7/2006 | Kroecker |
| 2006/0161225 A1 | 7/2006 | Sormann et al. |
| 2006/0179949 A1 | 8/2006 | Kim |
| 2006/0183993 A1 | 8/2006 | Horn |
| 2006/0184092 A1 | 8/2006 | Atanasoska et al. |
| 2006/0204738 A1 | 9/2006 | Dubrow et al. |
| 2006/0210626 A1 | 9/2006 | Spaeder |
| 2006/0216603 A1 | 9/2006 | Choi |
| 2006/0218011 A1 | 9/2006 | Walker |
| 2006/0235489 A1 | 10/2006 | Drew |
| 2006/0243288 A1 | 11/2006 | Kim et al. |
| 2006/0247505 A1 | 11/2006 | Siddiqui |
| 2006/0253005 A1 | 11/2006 | Drinan |
| 2006/0270346 A1 | 11/2006 | Ibrahim |
| 2006/0273882 A1 | 12/2006 | Posamentier |
| 2006/0276702 A1 | 12/2006 | McGinnis |
| 2006/0280227 A1 | 12/2006 | Pinkney |
| 2006/0282001 A1 | 12/2006 | Noel |
| 2006/0289640 A1 | 12/2006 | Mercure |
| 2006/0293607 A1 | 12/2006 | Alt |
| 2007/0000776 A1 | 1/2007 | Karube et al. |
| 2007/0002038 A1 | 1/2007 | Suzuki |
| 2007/0006636 A1 | 1/2007 | King et al. |
| 2007/0008113 A1 | 1/2007 | Spoonhower et al. |
| 2007/0016089 A1 | 1/2007 | Fischell et al. |
| 2007/0027386 A1 | 2/2007 | Such |
| 2007/0027388 A1 | 2/2007 | Chou |
| 2007/0038054 A1 | 2/2007 | Zhou |
| 2007/0049339 A1 | 3/2007 | Barak et al. |
| 2007/0055098 A1 | 3/2007 | Shimizu et al. |
| 2007/0060797 A1 | 3/2007 | Ball |
| 2007/0060800 A1 | 3/2007 | Drinan et al. |
| 2007/0066929 A1 | 3/2007 | Ferren et al. |
| 2007/0073353 A1 | 3/2007 | Rooney et al. |
| 2007/0096765 A1 | 5/2007 | Kagan |
| 2007/0106346 A1 | 5/2007 | Bergelson |
| 2007/0123772 A1 | 5/2007 | Euliano |
| 2007/0129622 A1 | 6/2007 | Bourget |
| 2007/0130287 A1 | 6/2007 | Kumar |
| 2007/0135803 A1 | 6/2007 | Belson |
| 2007/0142721 A1 | 6/2007 | Berner et al. |
| 2007/0156016 A1 | 7/2007 | Betesh |
| 2007/0160789 A1 | 7/2007 | Merical |
| 2007/0162089 A1 | 7/2007 | Mosesov |
| 2007/0162090 A1 | 7/2007 | Penner |
| 2007/0167495 A1 | 7/2007 | Brown et al. |
| 2007/0167848 A1 | 7/2007 | Kuo et al. |
| 2007/0173701 A1 | 7/2007 | Al-Ali |
| 2007/0179347 A1 | 8/2007 | Tarassenko et al. |
| 2007/0179371 A1 | 8/2007 | Peyser et al. |
| 2007/0185393 A1 | 8/2007 | Zhou |
| 2007/0191002 A1 | 8/2007 | Ge |
| 2007/0196456 A1 | 8/2007 | Stevens |
| 2007/0207793 A1 | 9/2007 | Myer |
| 2007/0208233 A1 | 9/2007 | Kovacs |
| 2007/0213659 A1 | 9/2007 | Trovato et al. |
| 2007/0237719 A1 | 10/2007 | Jones |
| 2007/0244370 A1 | 10/2007 | Kuo et al. |
| 2007/0255198 A1 | 11/2007 | Leong et al. |
| 2007/0255330 A1 | 11/2007 | Lee |
| 2007/0270672 A1 | 11/2007 | Hayter |
| 2007/0279217 A1 | 12/2007 | Venkatraman |
| 2007/0282174 A1 | 12/2007 | Sabatino |
| 2007/0282177 A1 | 12/2007 | Pilz |
| 2007/0299480 A1 | 12/2007 | Hill |
| 2008/0000804 A1 | 1/2008 | Carey et al. |
| 2008/0014866 A1 | 1/2008 | Lipowshi |
| 2008/0020037 A1 | 1/2008 | Robertson et al. |
| 2008/0021519 A1 | 1/2008 | Degeest |
| 2008/0021521 A1 | 1/2008 | Shah |
| 2008/0027679 A1 | 1/2008 | Shklarski |
| 2008/0033273 A1 | 2/2008 | Zhou |
| 2008/0038588 A1 | 2/2008 | Lee |
| 2008/0039700 A1 | 2/2008 | Drinan et al. |
| 2008/0045843 A1 | 2/2008 | Tsuji et al. |
| 2008/0046038 A1 | 2/2008 | Hill |
| 2008/0051647 A1 | 2/2008 | Wu et al. |
| 2008/0051667 A1 | 2/2008 | Goldreich |
| 2008/0058614 A1 | 3/2008 | Banet |
| 2008/0062856 A1 | 3/2008 | Feher |
| 2008/0065168 A1 | 3/2008 | Bitton et al. |
| 2008/0074307 A1 | 3/2008 | Boric-Lubecke |
| 2008/0077015 A1 | 3/2008 | Botic-Lubecke |
| 2008/0077028 A1 | 3/2008 | Schaldach et al. |
| 2008/0077188 A1 | 3/2008 | Denker et al. |
| 2008/0091089 A1 | 4/2008 | Guillory et al. |
| 2008/0091114 A1 | 4/2008 | Min |
| 2008/0097549 A1 | 4/2008 | Colbaugh |
| 2008/0097917 A1 | 4/2008 | Dicks |
| 2008/0103440 A1 | 5/2008 | Ferren et al. |
| 2008/0112885 A1 | 5/2008 | Okunev et al. |
| 2008/0114224 A1 | 5/2008 | Bandy et al. |
| 2008/0119705 A1 | 5/2008 | Patel |
| 2008/0119716 A1 | 5/2008 | Boric-Lubecke |
| 2008/0121825 A1 | 5/2008 | Trovato et al. |
| 2008/0137566 A1 | 6/2008 | Marholev |
| 2008/0139907 A1 | 6/2008 | Rao et al. |
| 2008/0140403 A1 | 6/2008 | Hughes et al. |
| 2008/0146871 A1 | 6/2008 | Arneson et al. |
| 2008/0146889 A1 | 6/2008 | Young |
| 2008/0146892 A1 | 6/2008 | LeBeouf |
| 2008/0154104 A1 | 6/2008 | Lamego |
| 2008/0166992 A1 | 7/2008 | Ricordi |
| 2008/0175898 A1 | 7/2008 | Jones et al. |
| 2008/0183245 A1 | 7/2008 | Van Oort |
| 2008/0188837 A1 | 8/2008 | Belsky et al. |
| 2008/0194912 A1 | 8/2008 | Trovato et al. |
| 2008/0208009 A1 | 8/2008 | Shklarski |
| 2008/0214901 A1 | 9/2008 | Gehman |
| 2008/0214985 A1 | 9/2008 | Yanaki |
| 2008/0243020 A1 | 10/2008 | Chou |
| 2008/0249360 A1 | 10/2008 | Li |
| 2008/0262320 A1 | 10/2008 | Schaefer et al. |
| 2008/0262336 A1 | 10/2008 | Ryu |
| 2008/0269664 A1 | 10/2008 | Trovato et al. |
| 2008/0275312 A1 | 11/2008 | Mosesov |
| 2008/0284599 A1 | 11/2008 | Zdeblick et al. |
| 2008/0288027 A1 | 11/2008 | Kroll |
| 2008/0294020 A1 | 11/2008 | Sapounas |
| 2008/0299197 A1 | 12/2008 | Toneguzzo et al. |
| 2008/0300572 A1 | 12/2008 | Rankers |
| 2008/0303638 A1 | 12/2008 | Nguyen |
| 2008/0306357 A1 | 12/2008 | Korman |
| 2008/0306359 A1 | 12/2008 | Zdeblick et al. |
| 2008/0306360 A1 | 12/2008 | Robertson et al. |
| 2008/0311852 A1 | 12/2008 | Hansen |
| 2008/0312522 A1 | 12/2008 | Rowlandson |
| 2008/0316020 A1 | 12/2008 | Robertson |
| 2009/0009330 A1 | 1/2009 | Sakama et al. |
| 2009/0009332 A1 | 1/2009 | Nunez et al. |
| 2009/0024045 A1 | 1/2009 | Prakash |
| 2009/0024112 A1 | 1/2009 | Edwards et al. |
| 2009/0030293 A1 | 1/2009 | Cooper et al. |
| 2009/0030297 A1 | 1/2009 | Miller |
| 2009/0034209 A1 | 2/2009 | Joo |
| 2009/0043171 A1 | 2/2009 | Rule |
| 2009/0048498 A1 | 2/2009 | Riskey |
| 2009/0062634 A1 | 3/2009 | Say et al. |
| 2009/0062670 A1 | 3/2009 | Sterling |
| 2009/0062730 A1 | 3/2009 | Woo |
| 2009/0069642 A1 | 3/2009 | Gao |
| 2009/0069655 A1 | 3/2009 | Say et al. |
| 2009/0069656 A1 | 3/2009 | Say et al. |
| 2009/0069657 A1 | 3/2009 | Say et al. |
| 2009/0069658 A1 | 3/2009 | Say et al. |
| 2009/0069724 A1 | 3/2009 | Otto et al. |
| 2009/0076343 A1 | 3/2009 | James |
| 2009/0076350 A1 | 3/2009 | Bly et al. |
| 2009/0082645 A1* | 3/2009 | Hafezi ............... A61B 5/073 600/302 |
| 2009/0087483 A1 | 4/2009 | Sison |
| 2009/0088618 A1 | 4/2009 | Ameson |
| 2009/0099435 A1 | 4/2009 | Say et al. |
| 2009/0105561 A1 | 4/2009 | Boydon et al. |

(56) References Cited

U.S. PATENT DOCUMENTS

| | | |
|---|---|---|
| 2009/0110148 A1 | 4/2009 | Zhang |
| 2009/0112626 A1 | 4/2009 | Talbot |
| 2009/0124871 A1 | 5/2009 | Arshak |
| 2009/0124965 A1 | 5/2009 | Greenberg et al. |
| 2009/0131774 A1 | 5/2009 | Sweitzer |
| 2009/0135886 A1 | 5/2009 | Robertson et al. |
| 2009/0142853 A1 | 6/2009 | Warrington et al. |
| 2009/0149839 A1 | 6/2009 | Hyde et al. |
| 2009/0157113 A1 | 6/2009 | Marcotte |
| 2009/0157358 A1 | 6/2009 | Kim |
| 2009/0161602 A1 | 6/2009 | Matsumoto |
| 2009/0163789 A1 | 6/2009 | Say et al. |
| 2009/0171180 A1 | 7/2009 | Pering |
| 2009/0171420 A1 | 7/2009 | Brown et al. |
| 2009/0173628 A1 | 7/2009 | Say et al. |
| 2009/0177055 A1 | 7/2009 | Say et al. |
| 2009/0177056 A1 | 7/2009 | Say et al. |
| 2009/0177057 A1 | 7/2009 | Say et al. |
| 2009/0177058 A1 | 7/2009 | Say et al. |
| 2009/0177059 A1 | 7/2009 | Say et al. |
| 2009/0177060 A1 | 7/2009 | Say et al. |
| 2009/0177061 A1 | 7/2009 | Say et al. |
| 2009/0177062 A1 | 7/2009 | Say et al. |
| 2009/0177063 A1 | 7/2009 | Say et al. |
| 2009/0177064 A1 | 7/2009 | Say et al. |
| 2009/0177065 A1 | 7/2009 | Say et al. |
| 2009/0177066 A1 | 7/2009 | Say et al. |
| 2009/0182206 A1 | 7/2009 | Najafi |
| 2009/0182207 A1 | 7/2009 | Riskey et al. |
| 2009/0182212 A1 | 7/2009 | Say et al. |
| 2009/0182213 A1 | 7/2009 | Say et al. |
| 2009/0182214 A1 | 7/2009 | Say et al. |
| 2009/0182215 A1 | 7/2009 | Say et al. |
| 2009/0182388 A1 | 7/2009 | Von Arx |
| 2009/0187088 A1 | 7/2009 | Say et al. |
| 2009/0187089 A1 | 7/2009 | Say et al. |
| 2009/0187090 A1 | 7/2009 | Say et al. |
| 2009/0187091 A1 | 7/2009 | Say et al. |
| 2009/0187092 A1 | 7/2009 | Say et al. |
| 2009/0187093 A1 | 7/2009 | Say et al. |
| 2009/0187094 A1 | 7/2009 | Say et al. |
| 2009/0187095 A1 | 7/2009 | Say et al. |
| 2009/0187381 A1 | 7/2009 | King et al. |
| 2009/0192351 A1 | 7/2009 | Nishino |
| 2009/0192368 A1 | 7/2009 | Say et al. |
| 2009/0192369 A1 | 7/2009 | Say et al. |
| 2009/0192370 A1 | 7/2009 | Say et al. |
| 2009/0192371 A1 | 7/2009 | Say et al. |
| 2009/0192372 A1 | 7/2009 | Say et al. |
| 2009/0192373 A1 | 7/2009 | Say et al. |
| 2009/0192374 A1 | 7/2009 | Say et al. |
| 2009/0192375 A1 | 7/2009 | Say et al. |
| 2009/0192376 A1 | 7/2009 | Say et al. |
| 2009/0192377 A1 | 7/2009 | Say et al. |
| 2009/0192378 A1 | 7/2009 | Say et al. |
| 2009/0192379 A1 | 7/2009 | Say et al. |
| 2009/0194747 A1 | 8/2009 | Zou et al. |
| 2009/0197068 A1 | 8/2009 | Yamaguchi et al. |
| 2009/0198115 A1 | 8/2009 | Say et al. |
| 2009/0198116 A1 | 8/2009 | Say et al. |
| 2009/0198175 A1 | 8/2009 | Say et al. |
| 2009/0203964 A1 | 8/2009 | Shimizu et al. |
| 2009/0203971 A1 | 8/2009 | Sciarappa |
| 2009/0203972 A1 | 8/2009 | Heneghan |
| 2009/0203978 A1 | 8/2009 | Say et al. |
| 2009/0204265 A1 | 8/2009 | Hackett |
| 2009/0210164 A1 | 8/2009 | Say et al. |
| 2009/0216101 A1 | 8/2009 | Say et al. |
| 2009/0216102 A1 | 8/2009 | Say et al. |
| 2009/0227204 A1 | 9/2009 | Robertson et al. |
| 2009/0227876 A1 | 9/2009 | Tran |
| 2009/0227940 A1 | 9/2009 | Say et al. |
| 2009/0227941 A1 | 9/2009 | Say et al. |
| 2009/0227988 A1 | 9/2009 | Wood et al. |
| 2009/0228214 A1 | 9/2009 | Say et al. |
| 2009/0231125 A1 | 9/2009 | Baldus |
| 2009/0234200 A1 | 9/2009 | Husheer |
| 2009/0243833 A1 | 10/2009 | Huang |
| 2009/0253960 A1 | 10/2009 | Takenaka et al. |
| 2009/0256702 A1 | 10/2009 | Robertson |
| 2009/0260212 A1 | 10/2009 | Schmett et al. |
| 2009/0264714 A1 | 10/2009 | Chou |
| 2009/0264964 A1 | 10/2009 | Abrahamson |
| 2009/0265186 A1 | 10/2009 | Tarassenko et al. |
| 2009/0273467 A1 | 11/2009 | Elixmann |
| 2009/0281539 A1 | 11/2009 | Selig |
| 2009/0287109 A1 | 11/2009 | Ferren et al. |
| 2009/0295548 A1 | 12/2009 | Ronkka |
| 2009/0296677 A1 | 12/2009 | Mahany |
| 2009/0303920 A1 | 12/2009 | Mahany |
| 2009/0306633 A1 | 12/2009 | Trovato et al. |
| 2009/0312619 A1 | 12/2009 | Say et al. |
| 2009/0318303 A1 | 12/2009 | Delamarche et al. |
| 2009/0318761 A1 | 12/2009 | Rabinovitz |
| 2009/0318779 A1 | 12/2009 | Tran |
| 2009/0318783 A1 | 12/2009 | Rohde |
| 2009/0318793 A1 | 12/2009 | Datta |
| 2010/0001841 A1 | 1/2010 | Cardullo |
| 2010/0010330 A1 | 1/2010 | Rankers |
| 2010/0033324 A1 | 2/2010 | Shimizu et al. |
| 2010/0036269 A1 | 2/2010 | Ferren et al. |
| 2010/0049004 A1 | 2/2010 | Edman et al. |
| 2010/0049006 A1 | 2/2010 | Magar |
| 2010/0049012 A1 | 2/2010 | Dijksman et al. |
| 2010/0049069 A1 | 2/2010 | Tarassenko et al. |
| 2010/0056878 A1 | 3/2010 | Partin |
| 2010/0056891 A1 | 3/2010 | Say et al. |
| 2010/0056939 A1 | 3/2010 | Tarassenko et al. |
| 2010/0057041 A1 | 3/2010 | Hayter |
| 2010/0062709 A1 | 3/2010 | Kato |
| 2010/0063438 A1 | 3/2010 | Bengtsson |
| 2010/0063841 A1 | 3/2010 | D'Ambrosia et al. |
| 2010/0069002 A1 | 3/2010 | Rong |
| 2010/0069717 A1 | 3/2010 | Hafezi et al. |
| 2010/0099967 A1 | 4/2010 | Say et al. |
| 2010/0099968 A1 | 4/2010 | Say et al. |
| 2010/0099969 A1 | 4/2010 | Say et al. |
| 2010/0100077 A1 | 4/2010 | Rush |
| 2010/0100078 A1 | 4/2010 | Say et al. |
| 2010/0106001 A1 | 4/2010 | Say et al. |
| 2010/0118853 A1 | 5/2010 | Godfrey |
| 2010/0139672 A1 | 6/2010 | Kroll et al. |
| 2010/0168659 A1 | 7/2010 | Say et al. |
| 2010/0179398 A1 | 7/2010 | Say et al. |
| 2010/0191073 A1 | 7/2010 | Tarassenko et al. |
| 2010/0210299 A1 | 8/2010 | Gorbachov |
| 2010/0222652 A1 | 9/2010 | Cho |
| 2010/0228113 A1 | 9/2010 | Solosko |
| 2010/0233026 A1 | 9/2010 | Ismagliov et al. |
| 2010/0234706 A1 | 9/2010 | Gilland |
| 2010/0234715 A1 | 9/2010 | Shin |
| 2010/0234914 A1 | 9/2010 | Shen |
| 2010/0245091 A1 | 9/2010 | Singh |
| 2010/0249541 A1 | 9/2010 | Geva et al. |
| 2010/0249881 A1 | 9/2010 | Corndorf |
| 2010/0256461 A1 | 10/2010 | Mohamedali |
| 2010/0259543 A1 | 10/2010 | Tarassenko et al. |
| 2010/0268048 A1 | 10/2010 | Say et al. |
| 2010/0268049 A1 | 10/2010 | Say et al. |
| 2010/0268050 A1 | 10/2010 | Say et al. |
| 2010/0274111 A1 | 10/2010 | Say et al. |
| 2010/0280345 A1 | 11/2010 | Say et al. |
| 2010/0280346 A1 | 11/2010 | Say et al. |
| 2010/0295694 A1 | 11/2010 | Kauffman et al. |
| 2010/0297640 A1 | 11/2010 | Kumar et al. |
| 2010/0298650 A1 | 11/2010 | Moon et al. |
| 2010/0298668 A1 | 11/2010 | Hafezi et al. |
| 2010/0298730 A1 | 11/2010 | Tarassenko et al. |
| 2010/0312188 A1 | 12/2010 | Robertson et al. |
| 2010/0312580 A1 | 12/2010 | Tarassenko et al. |
| 2011/0009715 A1 | 1/2011 | O'Reilly et al. |
| 2011/0054265 A1 | 3/2011 | Hafezi et al. |
| 2011/0065983 A1 | 3/2011 | Hafezi et al. |
| 2011/0077660 A1 | 3/2011 | Janik et al. |

(56) References Cited

U.S. PATENT DOCUMENTS

| | | | |
|---|---|---|---|
| 2011/0124983 A1 | 5/2011 | Kroll et al. |
| 2011/0134906 A1 | 6/2011 | Garudadri et al. |
| 2011/0160549 A1 | 6/2011 | Saroka et al. |
| 2011/0224912 A1 | 9/2011 | Bhavaraju et al. |
| 2011/0230732 A1 | 9/2011 | Edman et al. |
| 2011/0270135 A1 | 11/2011 | Dooley et al. |
| 2012/0011699 A1 | 1/2012 | Hafezi et al. |
| 2012/0016231 A1 | 1/2012 | Westmoreland |
| 2012/0032816 A1 | 2/2012 | Cho et al. |
| 2012/0062371 A1 | 3/2012 | Radivojevic et al. |
| 2012/0071743 A1 | 3/2012 | Todorov et al. |
| 2012/0179004 A1 | 7/2012 | Roesicke et al. |
| 2012/0245043 A1 | 9/2012 | England |
| 2012/0299723 A1 | 11/2012 | Hafezi et al. |
| 2013/0030366 A1 | 1/2013 | Robertson et al. |
| 2013/0129869 A1 | 5/2013 | Hafezi et al. |
| 2013/0129872 A1* | 5/2013 | Kruger ............. A47J 31/4492 426/115 |
| 2013/0144132 A1 | 6/2013 | Hafezi et al. |
| 2013/0171596 A1 | 7/2013 | French |
| 2013/0185228 A1 | 7/2013 | Dresner |
| 2013/0193950 A1 | 8/2013 | Hafezi et al. |
| 2013/0196012 A1 | 8/2013 | Dill |
| 2013/0199662 A1 | 8/2013 | Gebbink |
| 2013/0209877 A1 | 8/2013 | Kren et al. |
| 2013/0275296 A1 | 10/2013 | Tietzen et al. |
| 2014/0028309 A1* | 1/2014 | Taylor ............. G01R 33/02 324/258 |
| 2014/0280125 A1 | 9/2014 | Bhardwaj et al. |
| 2014/0308930 A1 | 10/2014 | Tran |
| 2014/0349256 A1 | 11/2014 | Connor |
| 2014/0374276 A1 | 12/2014 | Guthrie et al. |
| 2015/0017486 A1 | 1/2015 | Lai |
| 2015/0059922 A1 | 3/2015 | Thompson et al. |
| 2015/0080677 A1 | 3/2015 | Thompson et al. |
| 2015/0080678 A1 | 3/2015 | Frank et al. |
| 2015/0080679 A1 | 3/2015 | Frank et al. |
| 2015/0080680 A1 | 3/2015 | Zdeblick et al. |
| 2015/0112243 A1 | 4/2015 | Hafezi et al. |
| 2015/0127737 A1 | 5/2015 | Thompson et al. |
| 2015/0127738 A1 | 5/2015 | Thompson et al. |
| 2015/0150480 A1 | 6/2015 | Zdeblick et al. |
| 2015/0164746 A1 | 6/2015 | Costello et al. |
| 2015/0173646 A1 | 6/2015 | Berkman et al. |
| 2015/0223751 A1 | 8/2015 | Zdeblick et al. |
| 2015/0230729 A1 | 8/2015 | Zdeblick et al. |
| 2015/0248833 A1 | 9/2015 | Arne et al. |
| 2015/0352343 A1 | 12/2015 | Hafezi et al. |
| 2015/0361234 A1 | 12/2015 | Hafezi et al. |
| 2016/0033667 A1 | 2/2016 | Schmidt et al. |
| 2016/0345906 A1 | 12/2016 | Johnson et al. |
| 2016/0380708 A1 | 12/2016 | Dua et al. |
| 2017/0000179 A1 | 1/2017 | Cheng et al. |
| 2017/0014046 A1 | 1/2017 | Hafezi et al. |
| 2017/0020182 A1 | 1/2017 | Schmidt et al. |
| 2017/0216569 A1 | 8/2017 | Hafezi et al. |
| 2017/0265813 A1 | 9/2017 | Zdeblick et al. |
| 2017/0274194 A1 | 9/2017 | Robertson et al. |
| 2017/0296799 A1 | 10/2017 | Hafezi et al. |
| 2018/0026680 A1 | 1/2018 | Shirvani et al. |

FOREIGN PATENT DOCUMENTS

| | | |
|---|---|---|
| CN | 101795202 | 8/2010 |
| DE | 10313005 | 10/2004 |
| EP | 0344939 | 12/1989 |
| EP | 0526166 | 2/1993 |
| EP | 0981152 | 2/2000 |
| EP | 1246356 | 10/2002 |
| EP | 1534054 | 5/2005 |
| EP | 1702553 | 9/2006 |
| EP | 1244308 | 12/2007 |
| EP | 2143369 | 1/2010 |
| GB | 827762 | 2/1960 |
| JP | 61072712 | 4/1986 |
| JP | H01285247 | 11/1989 |
| JP | 05228128 | 9/1993 |
| JP | H11195415 | 7/1999 |
| JP | 2000506410 | 5/2000 |
| JP | 2002263185 | 9/2002 |
| JP | 2002282219 | 10/2002 |
| JP | 2003050867 | 2/2003 |
| JP | 2004313242 | 11/2004 |
| JP | 2005073886 | 3/2005 |
| JP | 2005087552 | 4/2005 |
| JP | 2005102959 | 4/2005 |
| JP | 2005304880 | 4/2005 |
| JP | 2005124708 | 5/2005 |
| JP | 2005514966 | 5/2005 |
| JP | 2005343515 | 12/2005 |
| JP | 20055332328 | 12/2005 |
| JP | 2006006377 | 1/2006 |
| JP | 2006509574 | 3/2006 |
| JP | 2007200739 | 8/2007 |
| JP | 2007313340 | 12/2007 |
| JP | 2009514870 | 4/2009 |
| JP | 2009528909 | 8/2009 |
| KR | 200600977523 | 7/2006 |
| TW | 200406192 | 5/2004 |
| TW | 200916136 | 4/2009 |
| WO | WO1988002237 | 4/1988 |
| WO | WO1992021307 | 12/1992 |
| WO | WO1993008734 | 5/1993 |
| WO | WO1993019667 | 10/1993 |
| WO | WO1994001165 | 1/1994 |
| WO | WO1997039963 | 10/1997 |
| WO | WO1998043537 | 10/1998 |
| WO | WO1999037290 | 7/1999 |
| WO | WO1999059465 | 11/1999 |
| WO | WO2001000085 | 1/2000 |
| WO | WO2000032474 | 6/2000 |
| WO | WO2000033246 | 6/2000 |
| WO | WO2001047466 | 7/2001 |
| WO | WO2001058236 | 8/2001 |
| WO | WO2001074011 | 10/2001 |
| WO | WO2001080731 | 11/2001 |
| WO | WO2002000920 | 1/2002 |
| WO | WO2002045489 | 6/2002 |
| WO | WO2002058330 | 7/2002 |
| WO | WO2002062276 | 8/2002 |
| WO | WO2002087681 | 11/2002 |
| WO | WO2002095351 | 11/2002 |
| WO | WO2003005877 | 1/2003 |
| WO | WO2003050643 | 6/2003 |
| WO | WO2003068061 | 8/2003 |
| WO | WO2004014225 | 2/2004 |
| WO | WO2004019172 | 3/2004 |
| WO | WO2004039256 | 5/2004 |
| WO | WO2004066833 | 8/2004 |
| WO | WO2004066834 | 8/2004 |
| WO | WO2004066903 | 8/2004 |
| WO | WO2004068881 | 8/2004 |
| WO | WO2004075032 | 9/2004 |
| WO | WO2004109316 | 12/2004 |
| WO | WO2005011237 | 2/2005 |
| WO | WO2005020023 | 3/2005 |
| WO | WO2005024687 | 3/2005 |
| WO | WO2005041438 | 5/2005 |
| WO | WO2005047837 | 5/2005 |
| WO | WO2005051166 | 6/2005 |
| WO | WO2005053517 | 6/2005 |
| WO | WO2005083621 | 9/2005 |
| WO | WO2005110238 | 11/2005 |
| WO | WO2005123569 | 12/2005 |
| WO | WO2006021932 | 3/2006 |
| WO | WO2006027586 | 3/2006 |
| WO | WO2006028347 | 3/2006 |
| WO | WO2006055892 | 5/2006 |
| WO | WO2006055956 | 5/2006 |
| WO | WO2006075016 | 7/2006 |
| WO | WO2006100620 | 9/2006 |
| WO | WO2006104843 | 10/2006 |
| WO | WO2006116718 | 11/2006 |

(56) References Cited

FOREIGN PATENT DOCUMENTS

| | | |
|---|---|---|
| WO | WO2006127355 | 11/2006 |
| WO | WO2007001724 | 1/2007 |
| WO | WO2007001742 | 1/2007 |
| WO | WO2007013952 | 2/2007 |
| WO | WO2007014084 | 2/2007 |
| WO | WO2007014527 | 2/2007 |
| WO | WO2007021496 | 2/2007 |
| WO | WO2007027660 | 3/2007 |
| WO | WO2007028035 | 3/2007 |
| WO | WO2007036687 | 4/2007 |
| WO | WO2007036741 | 4/2007 |
| WO | WO2007036746 | 4/2007 |
| WO | WO2007040878 | 4/2007 |
| WO | WO2007067054 | 6/2007 |
| WO | WO2007071180 | 6/2007 |
| WO | WO2007096810 | 8/2007 |
| WO | WO2007101141 | 9/2007 |
| WO | WO2007115087 | 10/2007 |
| WO | WO2007120946 | 10/2007 |
| WO | WO2007127316 | 11/2007 |
| WO | WO2007127879 | 11/2007 |
| WO | WO2007128165 | 11/2007 |
| WO | WO2007130491 | 11/2007 |
| WO | WO2007143535 | 12/2007 |
| WO | WO2007149546 | 12/2007 |
| WO | WO2008008281 | 1/2008 |
| WO | WO2008012700 | 1/2008 |
| WO | WO2008030482 | 3/2008 |
| WO | WO2008052136 | 5/2008 |
| WO | WO2008063626 | 5/2008 |
| WO | WO2008066617 | 6/2008 |
| WO | WO2008076464 | 6/2008 |
| WO | WO2008089232 | 7/2008 |
| WO | WO2008091683 | 7/2008 |
| WO | WO2008095183 | 8/2008 |
| WO | WO2008097652 | 8/2008 |
| WO | WO2008101107 | 8/2008 |
| WO | WO2008112577 | 9/2008 |
| WO | WO2008112578 | 9/2008 |
| WO | WO2008120156 | 10/2008 |
| WO | WO2008133394 | 11/2008 |
| WO | WO2008134185 | 11/2008 |
| WO | WO2008150633 | 12/2008 |
| WO | WO2009000447 | 12/2008 |
| WO | WO2009001108 | 12/2008 |
| WO | WO2009006615 | 1/2009 |
| WO | WO2009029453 | 3/2009 |
| WO | WO2009031149 | 3/2009 |
| WO | WO2009036334 | 3/2009 |
| WO | WO2009051829 | 4/2009 |
| WO | WO2009051830 | 4/2009 |
| WO | WO2009063377 | 5/2009 |
| WO | WO2009081348 | 7/2009 |
| WO | WO2009111664 | 9/2009 |
| WO | WO2009146082 | 12/2009 |
| WO | WO2010009100 | 1/2010 |
| WO | WO2010011833 | 1/2010 |
| WO | WO2010019778 | 2/2010 |
| WO | WO2010057049 | 5/2010 |
| WO | WO2010080765 | 7/2010 |
| WO | WO2010080843 | 7/2010 |
| WO | WO2010107563 | 9/2010 |
| WO | WO2010129288 | 11/2010 |
| WO | WO2010132331 | 11/2010 |
| WO | WO2010135516 | 11/2010 |
| WO | WO2011068963 | 6/2011 |
| WO | WO2011133799 | 10/2011 |
| WO | WO2011159336 | 12/2011 |
| WO | WO2011159337 | 12/2011 |
| WO | WO2011159338 | 12/2011 |
| WO | WO2011159339 | 12/2011 |
| WO | WO2012112561 | 8/2012 |
| WO | WO2015112603 | 7/2015 |
| WO | WO2015112604 | 7/2015 |
| WO | WO2015119911 | 8/2015 |

OTHER PUBLICATIONS

Target Innovations, Tablet Metal Detector, https://web.archive.org/web/20130215063351/http://www.metaldetectorindia.com/tablet-metal-detector.html, Feb. 15, 2013.*

TargetPharmaceutical Metal Detector, Feb. 15, 2013 downloaded from Target Innovations, Tablet Metal Detector, Feb. 15, 2013.*

AADE, "AADE 37th Annual Meeting San Antonio Aug 4-7 2010" American Association of Diabetes Educators (2010); http://www.diabeteseducator.org/annualmeeting/2010/index.html; 2 pp.

Arshak et al., A Review and Adaptation of Methods of Object Tracking to Telemetry Capsules IC-Med (2007) vol. 1, No. 1, Issue 1, 12pp.

"ASGE Technology Status Evaluation Report: wireless capsule endoscopy" American Soc. For Gastrointestinal Endoscopy (2006) vol. 63, No. 4; 7 pp.

Au-Yeung, K., et al., "A Networked System for Self-Management of Drug Therapy and Wellness", Wireless Health '10, Oct. 5-7, 2010, San Diego, 9 pages.

Aydin et al., "Design and implementation considerations for an advanced wireless interface in miniaturized integrated sensor Microsystems" Sch. of Eng. & Electron., Edinburgh Univ., UK; (2003); abstract.

Barrie, Heidelberg pH capsule gastric analysis. Texbook of Natural Medicine, (1992), Pizzorno, Murray & Barrie.

Bohidar et al., "Dielectric Behavior of Gelatin Solutions and Gels" Colloid Polym Sci (1998) 276:81-86.

Brock, "Smart Medicine: The Application of Auto-ID Technology to Healthcare" Auto-ID Labs (2002) http://www.autoidlabs.org/uploads/media/MIT-AUTOID-WH-010.pdf.

Carlson et al., "Evaluation of a non-invasive respiratory monitoring system for sleeping subjects" Physiological Measurement (1999) 20(1): 53.

Coury, L. "Conductance Measurement Part 1: Theory"; Current Separations, 18:3 (1999) p. 91-96.

Delvaux et al., "Capsule endoscopy: Technique and indications" Clinical Gastroenterology (2008) vol. 22, Issue 5, pp. 813-837.

Description of ePatch Technology Platform for ECG and EMG, located it http://www.nnadebydelta.com/imported/images/DELTA_Web/documents/Me/ePatch_ECG_EMG.pdf, Dated Sep. 2, 2010.

Dhar et al., "Electroless nickel plated contacts on porous silicon" Appl. Phys. Lett. 68 (10) pp. 1392-1393 (1996).

Eldek A., "Design of double dipole antenna with enhanced usable bandwidth for wideband phased array applications" Progress in Electromagnetics Research PIER 59, 1-15 (2006).

Fawaz et al., "Enhanced Telemetry System using CP-QPSK Band-Pass Modulation Technique Suitable for Smart Pill Medical Application" IFIP IEEE Dubai Conference (2008); http://www.asic.fh-offenburg.de/downloads/ePille/IFIP_IEEE_Dubai_Conference.pdf.

Ferguson et al., "Dielectric Constant Studies III Aqueous Gelatin Solutions" J. Chem. Phys. 2, 94 (1934) p. 94-98.

Furse C. M., "Dipole Antennas" J. Webster (ed). Wiley Encyclopedia of Electrical and Electronics Engineering (1999) p. 575-581.

Gaglani S. "Put Your Phone, or Skin, on Vibrate" MedGadget (2012) http://medgadget.com/2012/03/put-your-phone-or-skin-on-vibrate.html 8pp.

Gilson, D.R. "Molecular dynamics simulation of dipole interactions", Department of Physics, Hull University, Dec. 2002, p. 1-43.

Given Imaging, "Agile Patency Brochure" (2006) http://www.inclino.no/documents/AgilePatencyBrochure_Global_GMB-0118-01.pdf; 4pp.

Gonzalez-Guillaumin et al., "Ingestible capsule for impedance and pH monitoring in the esophagus" IEEE Trans Biomed Eng. (2007) 54(12): 2231-6; abstract.

Greene, "Edible RFID microchip monitor can tell if you take your medicine" Bloomberg Businessweek (2010) 2 pp.; http://www.businessweek.com/idg/2010-03-31/edible-rfid-microchip-monitor-can-tell-if-you-take-your-medicine.html.

Heydari et al., "Analysis of the PLL jitter due to power/ground and substrate noise"; IEEE Transactions on Circuits and Systems (2004) 51(12): 2404-16.

(56) References Cited

OTHER PUBLICATIONS

Hoeksma, J. "New 'smart pill' to track adherence" E-Health-Insider (2010) http://www.e-health-insider.com/news/5910/new_'smart_pill'_monitors_medicines.

Hoover et al., "Rx for health: Engineers design pill that signals it has been swallowed" University of Florida News (2010) 2pp.; http://news.ufl.edu/2010/03/31/antenna-pill-2/.

Intromedic, MicroCam Innovative Capsule Endoscope Pamphlet. (2006) 8 pp (http://www.intromedic.com/en/product/productinfo.asp).

ISFET—Ion Sensitive Field-Effect Transistor; Microsens S.A. pdf document. First Office Action dated Jun. 13 (2011) for U.S. Appl. No. 12/238,345; 4pp.

Jung, S. "Dissolvable 'Transient Electronics' Will Be Good for Your Body and the Environment" MedGadget; Oct. 1 (2012); Online website: http://medgadget.com/2012/10/dissolvable-transient-electronics-will-be-good-for-your-body-and-the-environment.html; downloaded Oct. 24, 2012; 4 pp.

Juvenile Diabetes Research Foundation International (JDRF), "Artificial Pancreas Project" (2010); http://www.artificialpancreasproject.com/; 3 pp.

Kamada K., "Electrophoretic deposition assisted by soluble anode" Materials Letters 57 (2003) 2348-2351.

Kendle, Earl R. and Morris, Larry A., "Preliminary Studies in the Development of a Gastric Battery for Fish" (1964). Nebraska Game and Parks Commission White Papers, Conference Presentations, & Manuscripts. Paper 22. pp. 1-6.

Kim et al., "A Semi-Interpenetrating Network System for a Polymer Membrane"; Eur. Polym. J. vol. 33 No. 7; pp. 1009-1014 (1997).

Li, P-Y, et al. "An electrochemical intraocular drug delivery device", Sensors and Actuators a 143 (2008) p. 41-48.

Lifescan, "OneTouch UltraLink™" http://www.lifescan.com/products/meters/ultralink (2010) 2 pp.

MacKay et al., "Radio Telemetering from within the Body" Inside Information is Revealed by Tiny Transmitters that can be Swallowed or Implanted in Man or Animal Science (1991) 1196-1202; 134; American Association for the Advancement of Science, Washington D.C.

MacKay et al., "Endoradiosonde" Nature, (1957) 1239-1240, 179 Nature Publishing Group.

McKenzie et al., "Validation of a new telemetric core temperature monitor" J. Therm. Biol. (2004) 29(7-8):605-11.

Medtronic, "CareLink Therapy Management Software for Diabetes" (2010); https://carelink.minimed.com/patient/entry.jsp?bhcp=1; 1 pp.

Medtronic, "Carelink™ USB" (2008) http://www.medtronicdiabetes.com/pdf/carelink_usb_factsheet.pdf 2pp.

Medtronic "The New MiniMed Paradigm® Real-Time Revel™ System" (2010) http://www.medtronicdiabetes.com/products/index.html; 2 pp.

Medtronic, "MINI MED Paradigm® Revel™ Insulin Pump" (2010) http://www.medtronicdiabetes.com/products/insulinpumps/index.html; 2 pp.

Medtronic, Mini Med Paradigm™ Veo™ System: Factsheet (2010). http://www.medtronic-diabetes.com.au/downloads/Paradigm%20Veo%20Factsheet.pdf ; 4 pp.

Melanson, "Walkers swallow RFID pills for science" Engadget (2008); http://www.engadget.com/2008/07/29/walkers-swallow-rfid-pills-for-science/.

Minimitter Co. Inc. "Actiheart" Traditional 510(k) Summary. Sep. 27, 2005.

Minimitter Co. Inc. Noninvasive technology to help your studies succeed. Mini Mitter.com Mar. 31, 2009.

Mini Mitter Co, Inc. 510(k) Premarket Notification Mini-Logger for Diagnostic Spirometer. Sep. 21, 1999.

Mini Mitter Co, Inc. 510(k) Premarket Notification for VitalSense. Apr. 22, 2004.

Minimitter Co. Inc. VitalSense Integrated Physiological Monitoring System. Product Description. (2005).

Minimitter Co. Inc. VitalSense Wireless Vital Signs Monitoring. Temperatures.com Mar. 31, 2009.

Mojaverian et al., "Estimation of gastric residence time of the Heidelberg capsule in humans: effect of varying food composition" Gastroenterology (1985) 89:(2): 392-7.

O'Brien et al., "The Production and Characterization of Chemically Reactive Porous Coatings of Zirconium Via Unbalanced Magnetron Sputtering" Surface and Coatings Technology (1996) 86-87; 200-206.

Park, "Medtronic to Buy MiniMed for $3.7 Billion" (2001) HomeCare; http://homecaremag.com/mag/medical_medtronic_buy_minimed/; 2 pp.

Philips Respironics Products, Noninvasive Technology to Help Your Studies Succeed. 510 (k) Permanent Notification for Vital Sense. Apr. 22, 2004; http/minimitter.com/products.cfm.

Radio Antennae, http://www.erikdeman.de/html/sail018h.htm; (2008) 5 pages.

"RFID "pill" monitors marchers" RFID News (2008) http://www.rfidnews.org/2008/07/23/rfid-pill-monitors-marchers/.

Rolison et al., "Electrically conductive oxide aerogels: new materials in electrochemistry" J. Mater. Chem. (2001) 1, 963-980.

Roulstone, et al., "Studies on Polymer Latex Films: I. A study of latex film morphology" Polymer International 24 (1991) pp. 87-94.

Sanduleanu et al., "Octave tunable, highly linear, RC-ring oscillator with differential fine-coarse tuning, quadrature outputs and amplitude control for fiber optic transceivers" (2002) IEEE MTT-S International Microwave Symposium Digest 545-8.

Santini, J.T. et al, "Microchips as controlled drug delivery-devices", Agnew. Chem. Int. Ed. (2000), vol. 39, p. 2396-2407.

"SensiVida minimally invasive clinical systems" Investor Presentation Oct. (2009) 28pp; http://www.sensividamedtech.com/SensiVidaGeneralOctober09.pdf.

Shawgo, R.S. et al. "BioMEMS from drug delivery", Current Opinion in Solid State and Material Science 6 (2002), p. 329-334.

Shin et al., "A Simple Route to Metal Nanodots and Nanoporous Metal Films"; Nano Letters, vol. 2, No. 9 (2002) pp. 933-936.

Shrivas et al., "A New Platform for Bioelectronics-Electronic Pill", Cummins College, (2010).; http://www.cumminscollege.org/downloads/electronics_andielecommunication/Newsletters/Current%20Newsletters.pdf; First cited in third party client search conducted by Patent Eagle Search May 18, 2010 (2010).

"Smartlife awarded patent for knitted transducer" Innovation in Textiles News: http://www.innovationintextiles.com/articles/208.php; 2pp. (2009).

"The SmartPill Wireless Motility Capsule" SmartPill, The Measure of GI Health; (2010) http://www.smartpillcorp.com/index.cfm?pagepath=Products/The_SmartPill_Capsule&id=17814.

Solanas et al., "RFID Technology for the Health Care Sector" Recent Patents on Electrical Engineering (2008) 1, 22-31.

Soper, S.A. et al. "Bio-Mems Technologies and Applications", Chapter 12, "MEMS for Drug Delivery", p. 325-346 (2007).

Swedberg, "University Team Sees Ingestible RFID Tag as a Boon to Clinical Trials" RFID Journal Apr. 27, 2010; http://www.rfidjournal.com/article/view/7560/1 3pp.

Tajalli et al., "Improving the power-delay performance in subthreshold source-coupled logic circuits" Integrated Circuit and System Design. Power and Timing Modeling, Optimization and Simulation, Springer Berlin Heidelberg (2008) 21-30.

Tatbul et al., "Confidence-based data management for personal area sensor networks" ACM International Conference Proceeding Series (2004) 72.

Tierney, M.J. et al "Electroreleasing Composite Membranes for Delivery of Insulin and other Biomacromolecules", J. Electrochem. Soc., vol. 137, No. 6, Jun. (1990), p. 2005-2006.

Trutag Technologies, Inc., Spectral Microtags for Authentication and Anti-Counterfeiting; "Product Authentication and Brand Protection Solutions"; http://www.trutags.com/; downloaded Feb. 12, 2013; 1 pp.

Walkey, "MOSFET Structure and Processing"; 97.398* Physical Electronics Lecture 20; 24 pp.

Wang, X. et al "Resistance to Tracking and Erosion of Silicone Rubber Material under Various Types of Precipitation", Jpn. J. Appl. Phys. vol. 38 (1999) pp. 5170-5175.

(56) References Cited

OTHER PUBLICATIONS

Watson, et al., "Determination of the relationship between the pH and conductivity of gastric juice" Physiol Meas. 17 (1996) pp. 21-27.
Winter, J. et al. "The material properties of gelatin gels"; USA Ballistic Research Laboratories, Mar. 1975, p. 1-157.
Wongmanerod et al., "Determination of pore size distribution and surface area of thin porous silicon layers by spectroscopic ellipsometry" Applied Surface Science 172 (2001) 117-125.
Xiaoming et al., "A telemedicine system for wireless home healthcare based on Bluetooth and the internet" Telemedicine Journal and e-health (2004) 10(S2): S110-6.
Yang et al., "Fast-switching frequency synthesizer with a discriminator-aided phase detector" IEEE Journal of Solid-State Circuits (2000) 35(10): 1445-52.
Yao et al., "Low Power Digital Communication in Implantable Devices Using Volume Conduction of Biological Tissues" Proceedings of the 28th IEEE, EMBS Annual International Conference, Aug. 30-Sep. 3, 2006.
Zimmerman, "Personal Area Networks: Near-field intrabody communication" IBM Systems Journal (1996) 35 (3-4):609-17.
Zworkin, "A Radio Pill" Nature, (1957) 898, 179 Nature Publishing Group.

\* cited by examiner

METAL DETECTOR APPARATUS, SYSTEM, AND METHOD

CROSS REFERENCE TO RELATED APPLICATIONS

This application claims priority to International Patent Application No. PCT/US2014/029272, entitled METAL DETECTOR APPARATUS, SYSTEM, AND METHOD, filed Mar. 14, 2014, which application, pursuant to 35 U.S.C. § 119 (e), claims priority to the filing date of United States Provisional Patent Application Ser. No. 61/794,492 filed Mar. 15, 2013, the disclosures of which are herein incorporated by reference.

INTRODUCTION

The present disclosure is related generally to a metal detector and metal detection techniques for detecting metal contaminants in dose forms comprising ingestible components. More particularly, the present disclosure is related to a metal detector and metal detection techniques for detecting metal contaminants in dose forms comprising ingestible components during the manufacturing process.

Broadly speaking, a dose form is a measured quantity of an ingestible substance. An ingestible component is a device that is intended to be ingested by a living subject. In one aspect, the ingestible component is a sensor. A sensor-enabled dose form is a sensor combined with the dose form. Sensors may take many forms.

In one example, the sensor may be an ingestible event marker (IEM), a radio frequency identification (RFID) device, a coil, and the like. A sensor may be an event indicator system configured to emit a detectable signal upon contact with a target internal physiological site. One such event indicator system includes systems configured for conductive communications, e.g., an IEM, as hereinafter described. In another aspect, the event indicator system may include systems configured for inductive communications, e.g., an RFID device. In various aspects, other modes of communication, as well as combinations of modes of communication, are possible.

While configurations may vary, in one example a sensor-enabled dose form comprises a sensor stably associated with a carrier, such as a tablet or capsule. In the particular example where the sensor is embodied as an IEM, the IEM may include an integrated circuit component and two dissimilar materials, e.g., two electrodes. Further components may include, for example, a current path extender and/or various other components which may, in certain instances, may be associated with a framework. When the IEM (sometimes referred to herein in certain aspects as an "ingestible event marker identifier" or "identifier"), contacts fluid at an internal target site, such as stomach fluid, a power source is completed that provides power to the integrated circuit component to provide a communication.

Sensors, such as, for example, an IEM, may be employed in a variety of different applications. One application of interest is monitoring how a patient adheres to a prescribed pharmaceutical therapeutic regimen. In these applications, IEMs are combined with the pharmaceutical dosages of the therapeutic regimen, where the carrier component of the marker may include an active pharmaceutical ingredient of interest or be a placebo, as desired. By monitoring for communications, e.g., a current path associated with the ingestible event marker, accurate information regarding patient adherence with a prescribed pharmaceutical therapeutic regimen may be obtained. Patient adherence data obtained with ingestible event markers holds great promise, both with patients who have been prescribed approved pharmaceuticals and with patients who are participating in clinical trials.

Sensors, such as, for example, an IEM, also may be employed in protocols that do not involve administration of a pharmaceutically active agent. For example, ingestible event markers may be used to monitor an occurrence of interest, such as a mealtime, a symptom, etc. As such, applications in which ingestible event markers may find use include dieting, monitoring patients for physiological symptoms of interest, and the like.

A sensor may contain metal elements that are germane to their operation. Such necessary metal elements differ based on the type of sensor. For example, a sensor may contain an IC and/or two or more dissimilar metals (e.g., IEM), coils, patterned antennas (e.g., RFID device), and the like. Conventional manufacturing processes that include a metal detection process for screening out dose forms with metal contaminants as part of a risk mitigation strategy will be challenged when a sensor-enabled dose form is inserted in the manufacturing process. Since sensor-enabled dose forms may contain metal elements that are necessary to their normal operation, conventional metal detection screening equipment cannot discriminate between wanted and unwanted metal elements located in a sensor-enabled dose form. In a quality control inspection context, for example, metal detection techniques for use on a production line as a process control check must be able to detect metal contaminants above the detection signal caused by the sensor in order to ensure practical usefulness of the metal detection process. Despite advances in conventional metal detection techniques and apparatuses, the present disclosure provides novel metal detection techniques and apparatuses that are capable of detecting metal contaminants in a sensor-enabled dose form above a metal detection threshold of an ingestible sensor alone.

SUMMARY

In one aspect, a method comprises orienting a sensor-enabled dose form in a predetermined orientation; receiving the sensor-enabled dose form through an aperture of a metal detector; generating a detection signal by the metal detector in response to receiving the sensor-enabled dose form through the aperture of the metal detector; comparing the detection signal to a predetermined threshold; and determining the presence of a metal contaminant in the sensor-enabled dose form based on the comparison of the detection signal and the predetermined threshold.

In addition to the foregoing, various other method and/or system and/or program product aspects are set forth and described in the teachings such as text (e.g., claims and/or detailed description) and/or drawings of the present disclosure.

The foregoing is a summary and thus may contain simplifications, generalizations, inclusions, and/or omissions of detail; consequently, those skilled in the art will appreciate that the summary is illustrative only and is NOT intended to be in any way limiting. Other aspects, features, and advantages of the devices and/or processes and/or other subject matter described herein will become apparent in the teachings set forth herein.

In one or more various aspects, related systems include but are not limited to circuitry and/or programming for effecting herein-referenced method aspects; the circuitry and/or programming can be virtually any combination of hardware, software, and/or firmware configured to effect the herein-referenced method aspects depending upon the design choices of the system designer. In addition to the foregoing, various other method and/or system aspects are set forth and described in the teachings such as text (e.g., claims and/or detailed description) and/or drawings of the present disclosure.

The foregoing summary is illustrative only and is not intended to be in any way limiting. In addition to the illustrative aspects, embodiments, and features described above, further aspects, embodiments, and features will become apparent by reference to the drawings and the following detailed description.

FIGURES

The novel features of the embodiments described herein are set forth with particularity in the appended claims. The embodiments, however, both as to organization and methods of operation may be better understood by reference to the following description, taken in conjunction with the accompanying drawings as follows.

FIG. 19A is an exploded view of the surface of dissimilar materials of FIG. 19.

Figure 20:
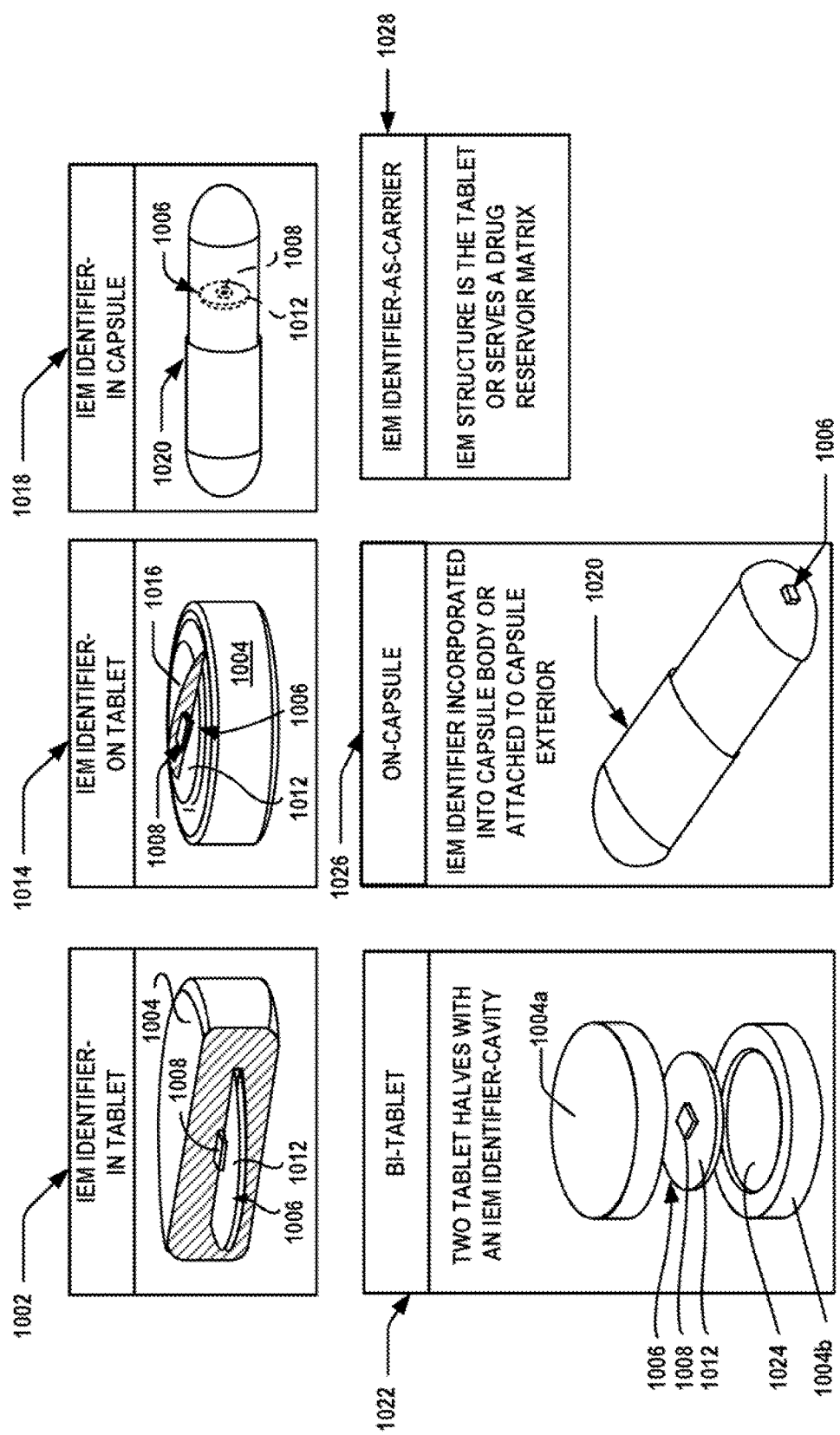

FIG. 20 provides views of various ingestible event marker configurations.

DESCRIPTION

In the following detailed description, reference is made to the accompanying drawings, which form a part hereof. In the drawings, similar symbols and reference characters typically identify similar components throughout the several views, unless context dictates otherwise. The illustrative embodiments described in the detailed description, drawings, and claims are not meant to be limiting. Other embodiments may be utilized, and other changes may be made, without departing from the spirit or scope of the subject matter presented here.

Before explaining the various embodiments of the metal detector apparatus, system, and method in detail, it should be noted that the various embodiments disclosed herein are not limited in their application or use to the details of construction and arrangement of components illustrated in the accompanying drawings and description. Rather, the disclosed embodiments may be positioned or incorporated in other embodiments, variations and modifications thereof, and may be practiced or carried out in various ways. Accordingly, embodiments of the metal detector apparatus, system, and method disclosed herein are illustrative in nature and are not meant to limit the scope or application thereof. Furthermore, unless otherwise indicated, the terms and expressions employed herein have been chosen for the purpose of describing the embodiments for the convenience of the reader and are not to limit the scope thereof. In addition, it should be understood that any one or more of the disclosed embodiments, expressions of embodiments, and/or examples thereof, can be combined with any one or more of the other disclosed embodiments, expressions of embodiments, and/or examples thereof, without limitation.

Also, in the following description, it is to be understood that terms such as front, back, inside, outside, top, bottom and the like are words of convenience and are not to be construed as limiting terms. Terminology used herein is not meant to be limiting insofar as devices described herein, or portions thereof, may be attached or utilized in other orientations. The various embodiments will be described in more detail with reference to the drawings.

In one aspect, the present disclosure is directed generally to a method for detecting metal debris in sensor-enabled dose form. A dose form is a measured quantity of an ingestible substance, and in one aspect, the substance may be a pharmaceutical. Thus, the dose form may be in the form of a tablet or capsule, although other form factors are envisioned. An ingestible component is a device that is intended to be ingested by a living subject. In one aspect, the ingestible component is a sensor. A sensor-enabled dose form is a sensor that is combined with a dose form. It will be appreciated that the sensor may be located on the surface of or embedded within the dose form. Throughout this description, for convenience and clarity of disclosure, the expression sensor-enabled dose form is used to refer to any combination of dose form and sensor, regardless of whether the sensor is located on the dose form or embedded within the dose form, without limitation.

Sensors may take many forms also. In one aspect, a sensor may contain conductive metal material that is germane to the operation of the sensor. Such conductive metal does not, however, interfere with the metal detection apparatus and method. Accordingly, metal debris in a sensor-enabled dose form may be detected by the metal detection instrument in the presence of the sensor. In one aspect, the sensor is oriented during passage through a coil of a metal detection instrument. The orientation of the sensor as it passes through the coil modifies the response of the detection signal obtained from the metal detection instrument. Accordingly, the detection signal may be exploited to characterize either the sensor or metallic debris, or combinations thereof. Such signal characterization may be employed in several ways.

For instance, in one method, the characterized detection signal may be employed to positively identify the presence of a sensor in a sensor-enabled dose form and, in another method, the characterized signal may be employed to detect metal debris present in or on a sensor-enabled dose form. In other words, the detection signal generated by the metal detector may include a first component associated with the sensor and a second component associated with metal debris, if any, that may be present in or on the dose form or sensor. Thus, modifications of the detection signal generated by the metal detector enable the sensor signal component to be separated from the metal debris signal component. This approach enables the detection of metal debris at the same or a similar sensitivity regardless of whether a sensor is present in the dose form.

To increase the inspection throughput, the sensor-enabled dose forms may be assisted through the metal detection coil using any suitable technique including gravity, air pressure, conveyors, and the like. Automated evaluation of the detection signal for sensor detection and/or debris detection may be integrated into an instrument or may be done separately. An adjustable threshold or trigger level may be employed to set detection sensitivity, and separation of sensors, metal debris, and/or dose forms, by signal level may be automated at the instrument or separately.

In one aspect, the present disclosure provides a metal detector and metal detection techniques for detecting sensor-enabled dose forms during the manufacturing process as a way to control or screen sensor-enabled dose forms. Specifically, the disclosed metal detector and metal detection techniques are capable of resolving a detection signal produced by the metal detector to discern the sensor signal component (e.g., an IEM) from the metal debris signal component as the sensor-enabled dose form passes through a coil of the metal detector.

In order to evaluate the efficacy of the novel metal detector and techniques associated therewith certain measurements were made as presented hereinbelow. The measurements were carried out on a modified CEIA THS/PH21N metal detector unit. It will be appreciated that such measurements are reasonably indicative of the effectiveness of the novel metal detector and techniques, but should not be taken as absolute or construed to in a limiting manner. Findings may not be applicable to other metal detectors or configurations.

The detection signal produced by the metal detector as the sensor-enabled dose form passes through an aperture of the detector is both position and orientation dependent. In one aspect, this dependency can be minimized by passing the sensor-enabled dose form vertically through the center of the detector aperture.

The detection signal may be characterized by using samples of compressed tablets fabricated with metal spheres of know diameters. The metal spheres can be located in samples with and without sensors (e.g., no IC die). A first set of samples without sensors containing only metal spheres of ferrous metal (0.3 mm and 0.5 mm), non-ferrous metal (0.3 mm and 0.5 mm), and stainless steel (0.5 mm) were passed through the metal detector and a first detection signal was obtained. Afterwards, a second set of samples containing sensors plus the same metal spheres as the first samples were vertically oriented in the center of the metal detector aperture and passed through the metal detector. A second detection signal was obtained. Thus, a first threshold can be set in the metal detector to detect metal debris in dose forms without sensors and a second threshold can be set in the metal detector to detect metal debris in dose forms with sensors. Baseline detection signals produced by a sensor alone also may be established. Other combinations and variations of thresholds may be obtained.

As described in detail hereinbelow, dose forms intentionally contaminated with metal spheres of known diameter and composition were detectable both with and without a sensor being present in the dose form, as long as the dose forms were passed individually through the detector and passed in a configuration that minimizes the background signal from the metal portions of the sensor (e.g., the IC). In one aspect, the sensor, and therefore the IC, may be oriented vertically in the center of the detection aperture and in another aspect, the sensor, and therefore the IC, may be oriented horizontally. Additional orientations between the vertical and horizontal would likely yield suitable results as are not excluded from the scope of the present disclosure.

In one aspect, multiple metal detectors can be employed in series. For example, two metal detectors (e.g., scanners) in series can be used to verify the presence of a sensor within a dose form by first passing it through the metal detector in a horizontal (or vertical) orientation followed by passing the sensor-enabled dose form in a vertical (or horizontal) orientation to verify that the detection signal is not the result of metal contamination.

TABLE 1 summarizes lot numbers for compressed tablets containing a sensor in the form of an event indicator system (e.g., IEM) used in metal detector testing. The tests were conducted with a CEIA THS/PH21N metal detector, MD scope software 4.50.28, CEIA metal detector standards encased in plastic pucks, 0.22 mm FE, 0.28 mm NF, 0.37 mm SS the compressed tablets containing an event indicator system orientation guide (FX006322) Spherical metal test standards used to establish minimum detection limits of metal detectors (BBs), ferric materials (FE), non-ferric materials (NF), stainless steel (SS) at both 0.3 mm and 0.5 mm the compressed tablets containing an event indicator system lots are given it TABLE 1. In TABLE 1, "MIT tool" refers to the specific tool used to compress the tablets containing IEMS, "IEM type" refers to an IEM type event indicator system, specifically whether it contains an IC (standard IEM) or not (skirt only), "BB type" refers to the metal defect standard size and material, and "DF lot" refers to a tracking number for the samples.

TABLE 1

| MIT tool | IEM Type | BB Type | DF lot |
|---|---|---|---|
| MITs w/o BBs | | | |
| 1 up | Std IEM | none | 702856 |
| 10 up | Std IEM | none | 702800 |
| 1 up | Skirt only | none | 702855 |
| 10 up | Skirt only | none | 702855 |
| MITs w/ BBs | | | |
| 10 up | Std IEM | 0.3 mm FE | 702868 |
| 10 up | Std IEM | 0.5 mm FE | 702869 |
| 10 up | Std IEM | 0.3 mm NF | 702866 |
| 10 up | Std IEM | 0.5 mm NF | 702867 |
| 10 up | Std IEM | 0.3 mm SS | 702870 |
| 10 up | Std IEM | 0.5 mm SS | 702871 |
| 10 up | Skirt only | 0.3 mm FE | 702862 |
| 10 up | Skirt only | 0.5 mm FE | 702863 |
| 10 up | Skirt only | 0.3 mm SS | 702860 |
| 10 up | Skirt only | 0.5 mm SS | 702861 |
| 10 up | Skirt only | 0.3 mm NF | 702864 |
| 10 up | Skirt only | 0.5 mm NF | 702865 |

Prior to turning to a discussion of specific test configurations and results obtained therewith to confirm the efficacy of the metal detection apparatus, system, and method according to the present disclosure, the description now turns briefly to FIGS. 1-4 for a discussion of a metal detection system and configuration.

Figure 1:
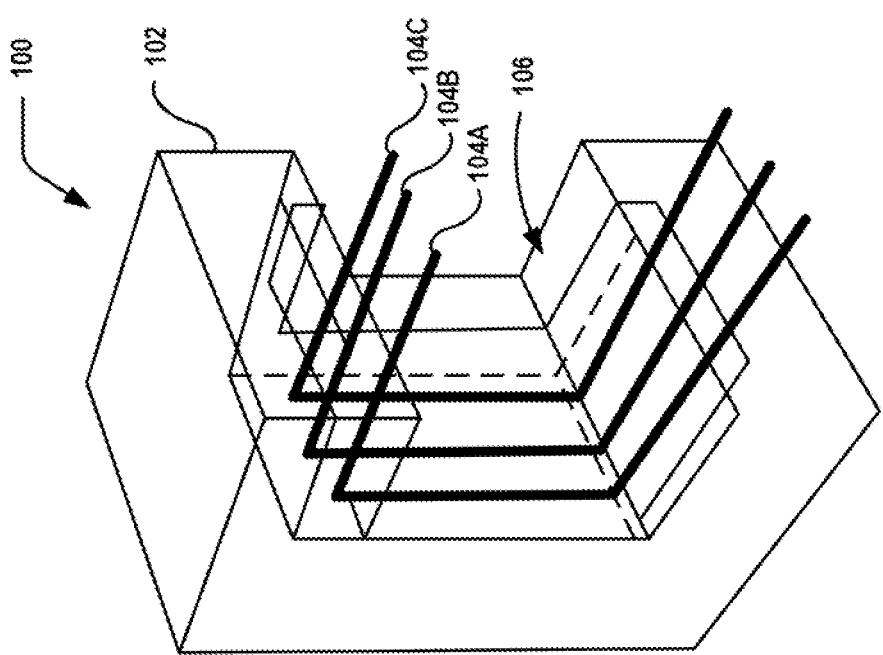
FIG. 1 is a componential cutaway/transparent view of one aspect of a metal detector.

Accordingly, turning now to FIG. 1, a componential cutaway/transparent view of a conventional metal detector 100 is shown. The metal detector 100 comprises a body 102 defining an aperture 106 to receive a sample such as a sensor, a sensor-enabled dose form or simply a dose form, therethrough. Although the depicted detector 100 comprises three coils 104a, 104b, 104c embedded on the body 102, a single coil, double coil, or other suitable number of coils greater than three may be employed, without limitation.

Figure 2:
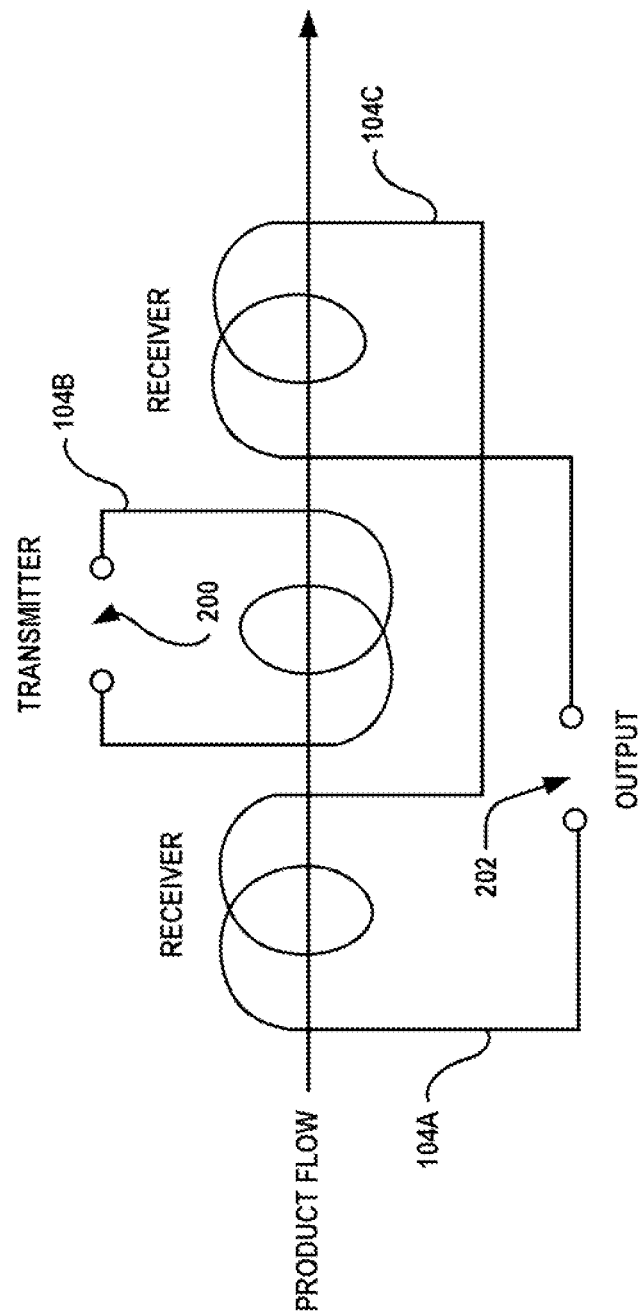
FIG. 2 is a schematic diagram of one aspect of the configuration of coils of the metal detector shown in FIG. 1.
Figure 3:
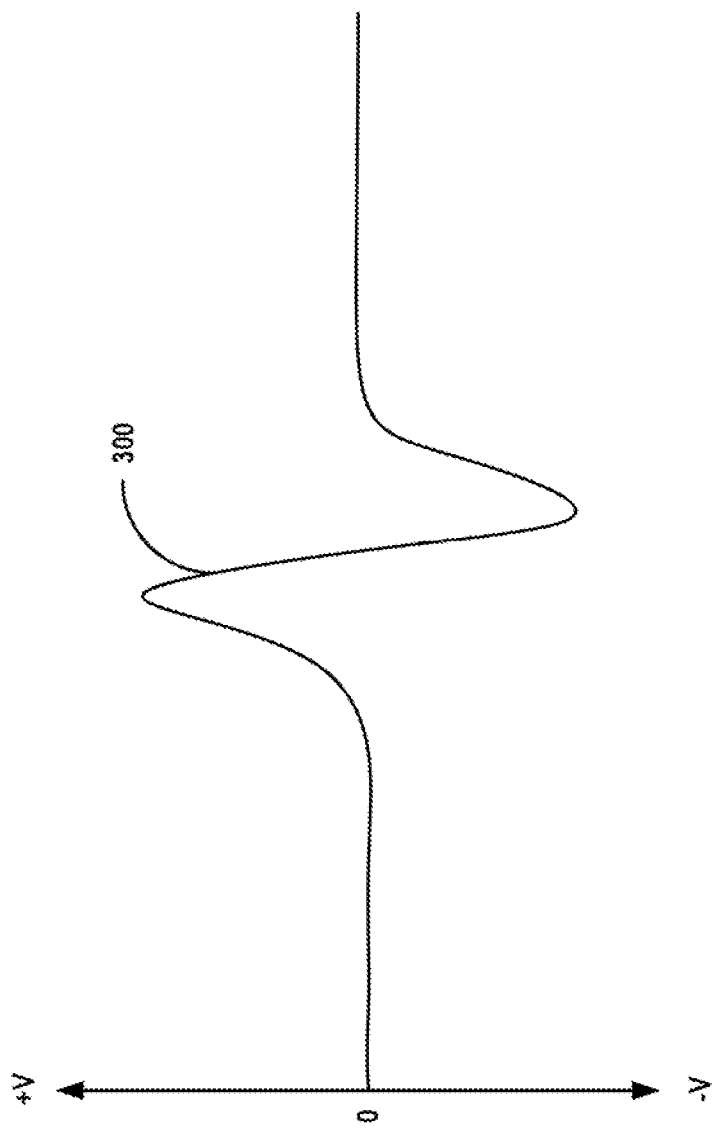
FIG. 3 is a depiction of a typical voltage signal appearing between output terminals of the metal detector shown in FIG. 1.

FIG. 2 is a schematic diagram of one aspect of the configuration of the coils 104a-c of the metal detector 100. As shown in FIGS. 1 and 2, in one aspect, the detector 100 is implemented as a balanced coil system where the center coil 104b is coupled to input terminals 200 and generates a field, wherein a field could be an electric field, electrostatic field, magnetic field, among other fields, and hence, the center coil 104b is referred to as a transmitter coil. The outer coils 104a and 104c act as receiver coils and detect perturbations in the field generated by the transmitter coil 104a caused by a metal object passing through the aperture 106 in the direction indicated by arrow labeled "Product Flow". Any perturbation of the field results in a voltage difference between the receiver coils 104a, 104c at output terminals 202. A typical voltage signal 300 appearing between output terminals 202 as material passes down the aperture 106 is depicted in FIG. 3, for example. One example of a conventional metal detector 110 such as shown in FIGS. 1-3 is produced by Mettler-Toledo, LLC of Tampa, Fla.

Any suitable metal detector may be employed and the disclosure is not limited in scope to the particular metal detector 100 shown in FIGS. 1 and 2. For example, any metal detector which responds to metal in proximity to a sensor coil may be readily employed. The simplest form of a metal detector consists of an oscillator producing an alternating current that passes through a coil producing an alternating field. If a piece of electrically conductive metal is located proximate to the coil, eddy currents will be induced in the metal, and this produces a field of its own. Thus, in one aspect, a one coil system may be employed as a metal detector. In another aspect, a second coil may be added to the single coil system where the second coil can be used to measure the field (acting as a magnetometer). Thus, the change in field due to the metallic object can be detected. Alternatively, in a two coil system, a first coil is the transmitting coil and the second coil is the receiving coil. Metal detection configurations that employ three or more coils also are contemplated to be within the scope of the present disclosure. Accordingly, the disclosed embodiments are not limited in this context.

The transmitter coil 104b is coupled to a field generator by way of the input terminal 200 to excite the coil 104b with a field that can be influenced by a metal object located in proximity thereto. The receiver coils 104a, 104c are coupled to a comparator circuit to detect the signal at the output terminals 202 and condition and/or amplify the signal such that it can be compared to a predetermined threshold. The threshold is selected such that the circuit can detect a contaminant metal object in the presence of a sensor-enabled dose form, which itself comprises a sensor having, for example, a minimum amount of metal in the form of an IC and/or dissimilar metals deposited on the IC. In one aspect, a controller comprising a processor can be employed to determine when to trigger the presence of a contaminant. The comparator circuit is configured to compare the amplitude of the detected signal to a predetermined threshold and output a control signal. A controller coupled to the apparatus receives the control signal from the comparator circuit and determines whether a metal contaminant is present in the sensor-enabled dose form based on the control signal. If a metal contaminant is detected, the controller is configured to reject the contaminated sensor-enabled dose form.

Figure 4:
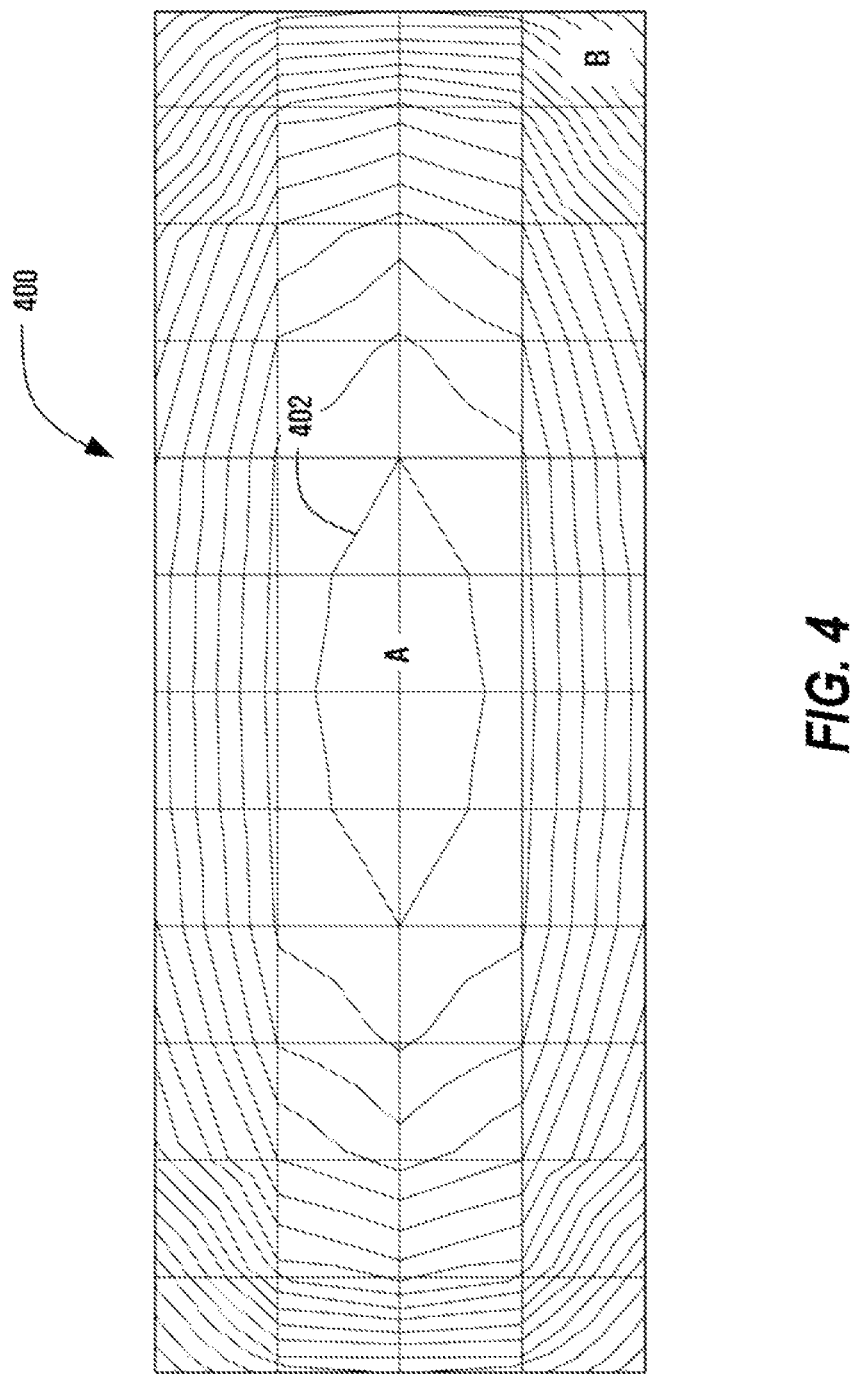
FIG. 4 shows a typical sensitivity plot of the field generated within an aperture of the metal detector shown in FIG. 1.

The sensitivity of the metal detector 100 depends on several variables such as, for example, the position of the aperture 106, the size of the aperture 106, the ability of the metal object being detected to disturb a field, and on the orientation of the metal object inside the aperture 106. FIG. 4 shows a typical sensitivity plot 400 of the field generated within the aperture 106. As shown in FIG. 4, the center region marked "A" has the lowest sensitivity and the lateral region marked "B" has the highest sensitivity. The density of lines of flux 402 indicates a gradient of sensitivity from "A" to "B".

In a metal detection technique, components to be screened for metal contaminants are passed through the aperture 106 that is surrounded by metal coils 104a-c, as shown for example, in FIGS. 1-2. A subset of the coils 104b generates a known field, with the remaining coils 104a, 104c sensing perturbations in that field. These perturbations create a voltage difference across coils 104a, 104c that is dependent on the size and composition of the object passing through the aperture 106, with larger and more conductive objects causing greater perturbations (and hence higher detected voltages) in the sensing coils 104a, 104c. Metal is detected by exceeding a voltage threshold on the sensing coils 104a, 104c. When the voltage threshold is exceed and metal is detected, the object passing through the aperture 106 at the time of the detection is diverted from the process flow into an alternate stream, which may be a waste stream, for example.

Sensor-enabled dose forms present a unique challenge for metal detection, as the fully assembled components contain a sensor having a small, but detectable, amount of metal in the form of an IC and/or one or more metal materials deposited thereon. As described in connection with FIG. 17, in the case of an IEM type of ingestible event indicator, the IC and metal materials are germane elements of the sensor. Therefore, any metal contaminants present in the sensor-enabled dose form must be detected in the presence of the metals associated with the sensor so as not to reject components without metal contaminants. Accordingly, the metal detection techniques described herein reliably detect metal contaminants above the signal caused by the sensor portion of the dose form.

The experiments and test methods described herein employ a dose form implemented as a compressed tablet. Dose forms, however, should not to be construed as being limited to "compressed tablets". Rather, any suitable dose form can be employed in conjunction with the metal detection techniques described herein. Initial experiments conducted by simply passing a standard compressed tablet containing an sensor through the aperture 106 of the metal detector 100 without orientation or positional control showed a large degree of scatter in the detected signals, as indicated in FIG. 5, and thus cannot be used as a reliable indicator for detecting metal contaminants in the presence of a sensor.

Figure 5:
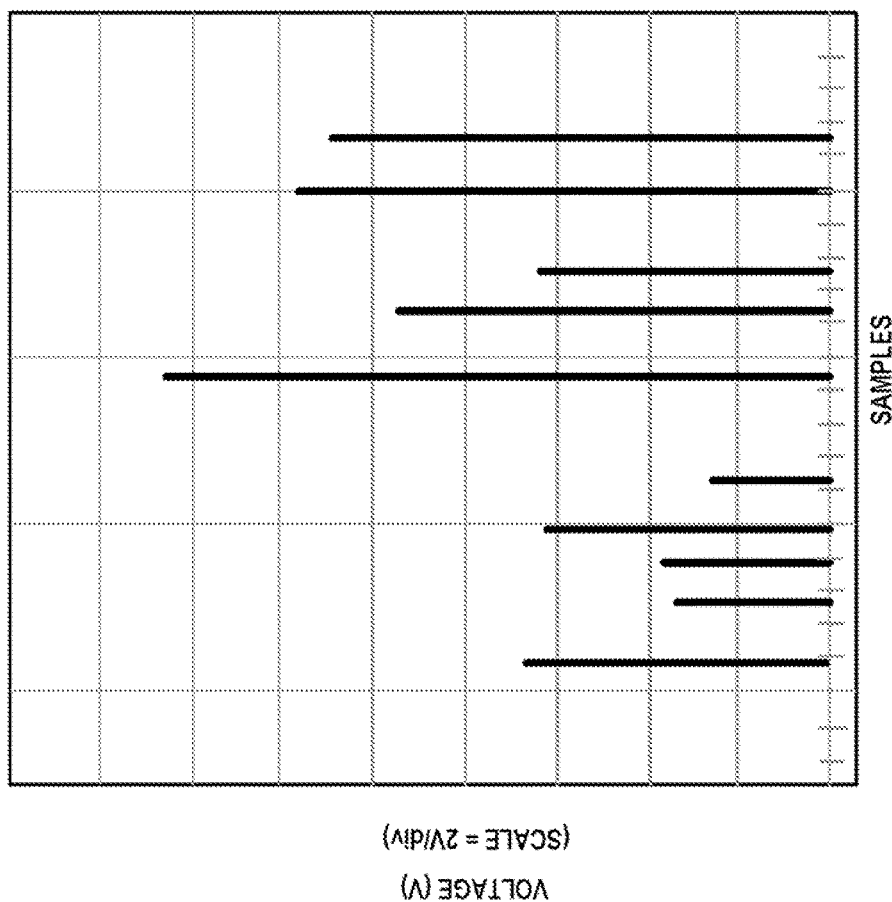
FIG. 5 is a graphical representation of dose forms (e.g., compressed tablets) containing an event indicator system passed through the aperture of the metal detector shown in FIG. 1 without orientation or positional control.

FIG. 5 is a graphical representation 500 of dose forms (e.g., compressed tablets) containing a sensor passed through the aperture 106 of the metal detector 100 without orientation or positional control. The vertical axis represents detected signal strength in Volts (V) and the horizontal axis representing time, with each vertical spike indicating a compressed tablet passing through the aperture, eleven tablets, in the present example. As shown in FIG. 5, the technique of randomly passing components through the metal detector 100 aperture 106 without attention to orientation of the sensor system produces high variability in detected signal strength, from ~0.5 to ~15V, and thus is not a preferred technique for detecting metal contaminants in a sensor-enabled dose form.

Figure 6:
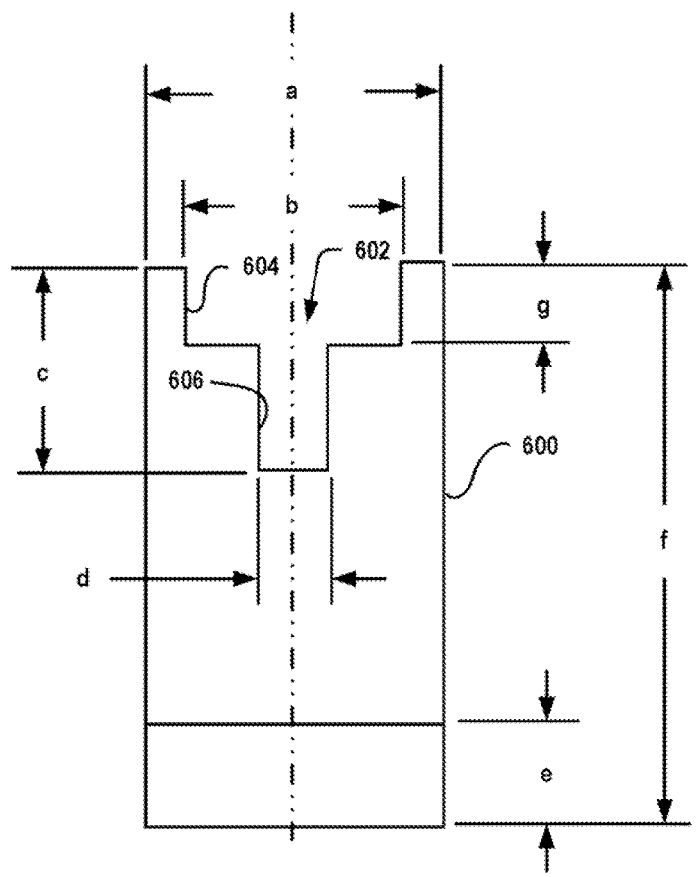
FIG. 6 shows an end view of a guide for passing a dose form through an aperture of the metal detector shown in FIG. 1.
Figure 7:
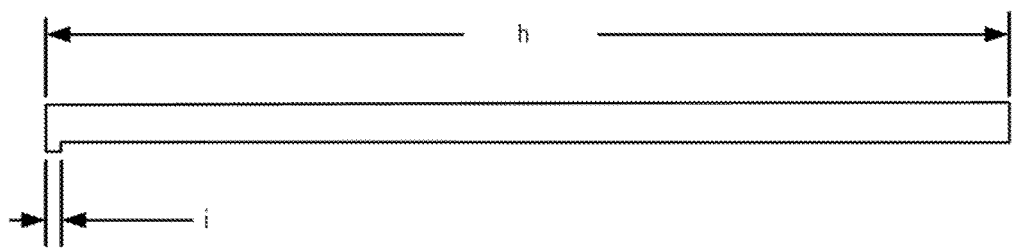
FIG. 7 shows a side view of the guide shown in FIG. 6.

It was noted by way of experimentation, however, that passing sensor-enabled dose forms through the aperture 106 in a predetermined orientation, such as, for example, horizontally versus vertically produced much different detection signals. Accordingly, to control the path and orientation of a sensor-enabled dose form as it passes through the aperture 106 of the detector 100, a guide 600 is coupled (e.g., hooked or otherwise attached) to the aperture 106 to provide orientation control on a fixed track 602, as shown in FIGS. 6 and 7 for example, where FIG. 6 shows an end view of the guide 600 and FIG. 7 shows a side view of the guide 600. The guide 600 enables the sensor-enabled dose form to be orientated and controlled either vertical or horizontally. The guide 600 comprises a track 602 for slidably receiving the dose form comprising an event indicator system. The track 602 comprises a horizontal slot 604 for slidably receiving the dose form comprising an event indicator system in a horizontal orientation and a vertical slot 606 for slidably receiving the dose form comprising an event indicator system in a horizontal orientation. It will be appreciated that the scope of the disclosure is not limited to horizontal or vertical orientations. For example, intermediate orientations between vertical and horizontal may be employed without limitation.

In one aspect, the guide 600 may be formed of plastic or any suitable non-metal material. The dimensions $d_a$-$d_i$ are provided as illustrative examples only and should not be construed in a limiting manner. In one aspect, the dimensions $d_a$-$d_i$ may be selected as follows, without limitation: $d_a$=~0.375"; $d_b$=~0.282"; $d_c$=~0.256"; $d_d$=~0.093"; $d_e$=~0.124"; $d_f$=~0.700"; $d_g$=~0.098"; $d_h$=~10.000"; $d_i$=~0.150"". Each of the dimensions $d_a$-$d_i$ have a suitable tolerance band. Furthermore, the dimensions, $d_a$-$d_i$ can be selected to accommodate any particular dose form such that it can be horizontally or vertically oriented as it passes through the aperture 106 of the detector 100.

Figure 8:
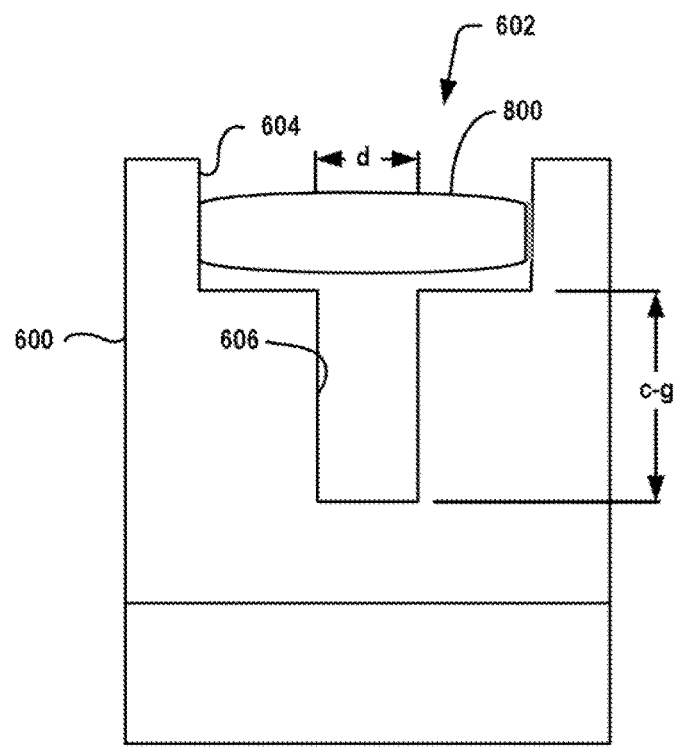
FIG. 8 illustrates a dose form containing an event indicator system located within a guide in a horizontal orientation.
Figure 9:
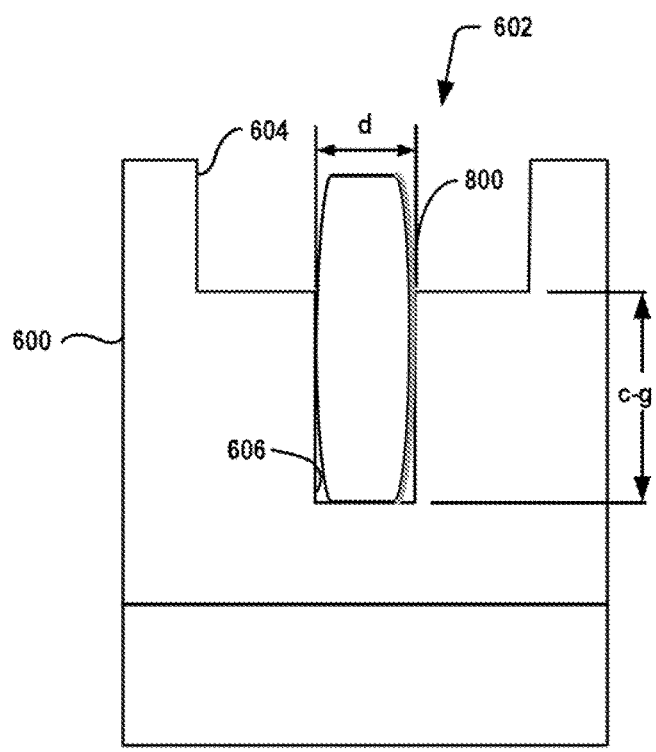
FIG. 9 illustrates a dose form containing an event indicator system located within a guide in a vertical orientation.
Figure 10:
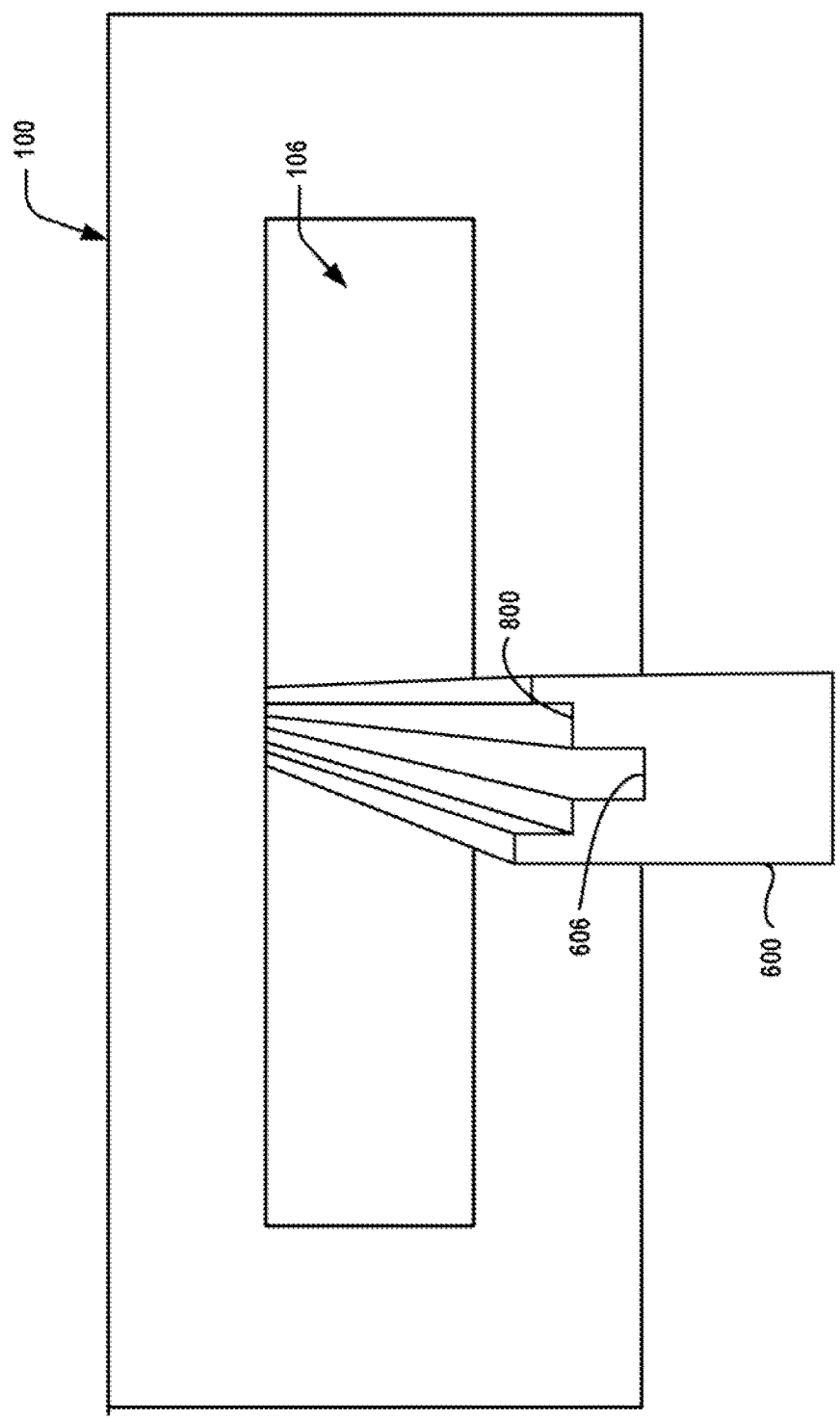
FIG. 10 shows the guide shown in FIGS. 6 and 7 located inside the center of the metal detector aperture shown in FIG. 1.

FIGS. 8 and 9 illustrate a sensor-enabled dose form (e.g., compressed tablet) containing a sensor 800 (referred to as "sensor-enabled dose form 800" hereinafter) located within a guide 600 in horizontal (FIG. 8) and vertical (FIG. 9) orientations in corresponding horizontal and vertical slots 604, 606. As previously discussed, the horizontal orientation of the sensor-enabled dose form 800 is achieved by locating the sensor-enabled dose form 800 in the horizontal slot 604 and vertical orientation is achieved by locating the sensor-enabled dose form 800 in the vertical slot 606 of the guide 600. FIG. 10 shows placement of the guide 600 inside center of the detector 100 aperture 106. The following discussion describes the effect of position and orientation on detection of the dose form containing an event indicator system signal as it is passed through the aperture 106 of the detector 100.

A single standard sensor-enabled dose form 800 was located within the guide 600 in horizontal and vertical orientations and repeatedly passed through the aperture 106 of the detector 100. The guide 600 was passed through the center and nearly to the right and left edges 1002, 1004 of the aperture 106 (about 3.5 cm to the left and right of the center, for example). The sensor-enabled dose forms 800 were passed in both vertical and horizontal orientations at each location (center, left, right). Only sensor-enabled dose forms 800 that trigger an ejection event when the detected signal exceeds the detection threshold are stored to the detector 100 log for subsequent analysis and/or printing. The detector 100 sensitivity was set to its maximum (299), which corresponds to a threshold ejection voltage of about 0.048V.

The signal strengths produced by various sensor-enabled dose forms 800 are shown graphically in FIGS. 11A and 11B and are summarized in TABLE 2 below, where the sensor-enabled dose form 800 are labeled as MIT IEM for short hand notation. Single sensor-enabled dose form 800 samples were passed through the aperture 106 of the detector 100 multiple times. The guide 600 was placed on the left edge, right edge, and center of the aperture 106 of the detector 100. The sensor-enabled dose form 800 samples were passed in both horizontal and vertical orientations. Generally, horizontal orientation was much stronger (~100×) than vertical orientation and the edges of the detector 100 aperture 106 were more sensitive than the center, especially for vertical orientation.

Figures 11A, 11B:
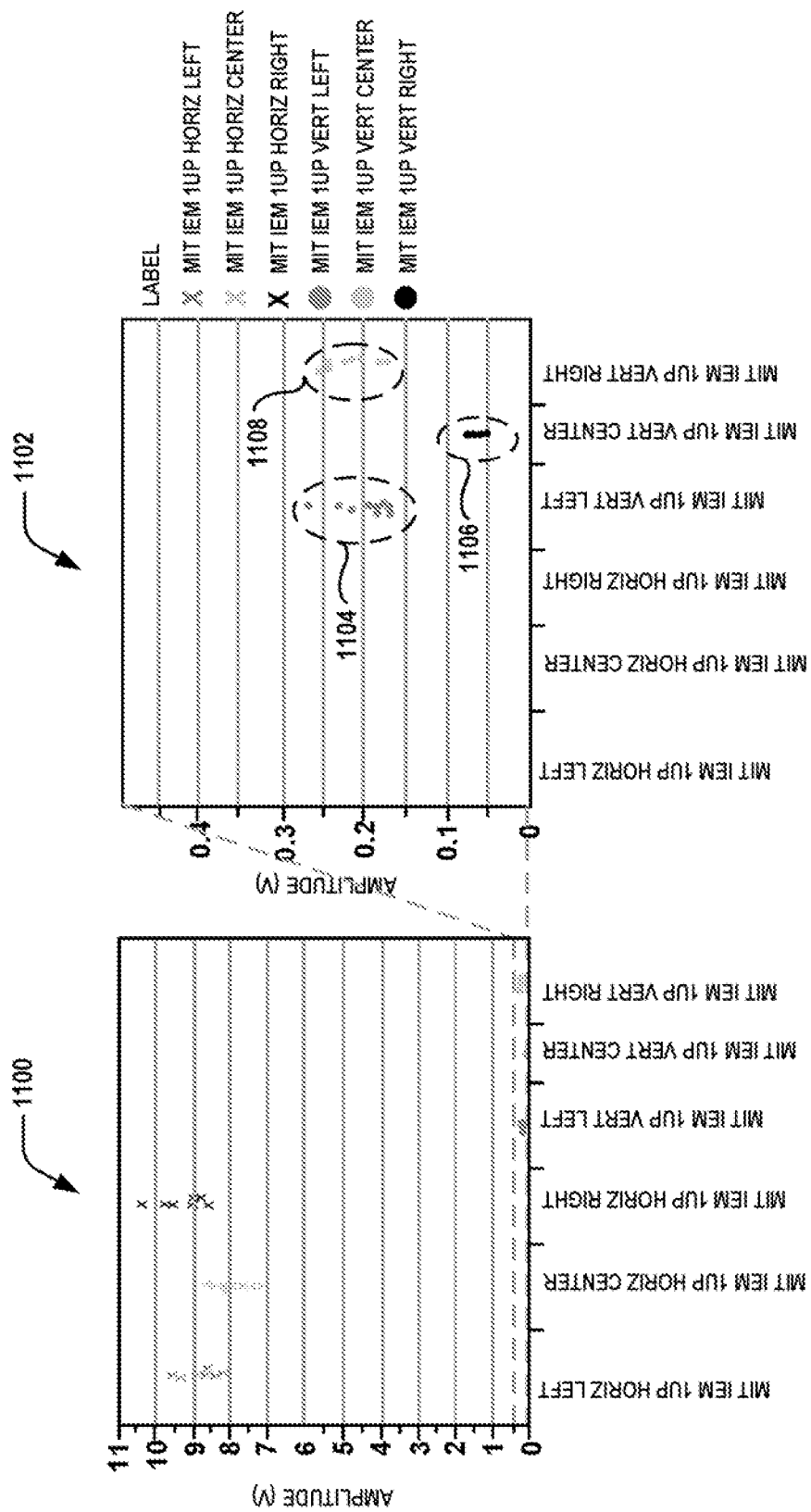
FIG. 11A is a graphical representation of overall orientation effects dominated the signal strength, with horizontally oriented event indicator systems (X's) showing up ~100× stronger than vertically oriented event indicator systems (O's).
FIG. 11B is a zoomed in graphical representation to make the smaller signals from the vertical orientation more easily visible.

FIGS. 11A, B graphically illustrate the effect of position and orientation on the detection signal. FIG. 11A is a graphical representation 1100 of overall orientation effects dominated the signal strength, with horizontally oriented event indicator systems (X's) showing up ~100× stronger than vertically oriented event indicator systems (O's). Position also influences detection for both orientations, with the center being least sensitive. FIG. 11B is a zoomed in graphical representation 1102 to render the smaller signals obtained from a vertically oriented sensor-enabled dose form more easily visible. It should be noted that only seven of ten passes in the vertical, center position resulted in triggered ejections, so only that data is included in the data set. A horizontally oriented sensor-enabled dose form produced a detection signal strength two orders of magnitude greater than the vertically oriented sensor-enabled dose form, regardless of the left, center, or right position. There was also a smaller positional dependence, with the detector showing more sensitivity towards the edges of the aperture 106. The center, vertical position provided the greatest minimization of signal from the event indicator system, with no detections exceeding 0.1V. The zoomed in plot 1102 of FIG. 11B shows vertically oriented samples 1104 passed through the left edge of the aperture 106, vertically oriented samples 1106 passed through the center of the aperture 106, and vertically oriented samples 1108 passed through the right of the aperture 106, producing a minimized signal from the sensor-enabled dose form 800.

A similar experiment was conducted by rolling calibration standards down a set track at the left, right, and center of the aperture. A standard is a metal sphere of a known metal type and diameter embedded in a plastic puck of approximately 1" diameter. Standards of 0.22 mm ferrous (FE, e.g., chrome-steel), 0.28 mm non-ferrous (NF, e.g., brass), and 0.37 mm 316 stainless steel (SS) spheres were used, as they represent the manufacturer's minimum detection specification. The position within the aperture shows no effect on signal strength, as shown in FIG. 12, with most detectable signals showing 0.1V or greater.

Figure 12:
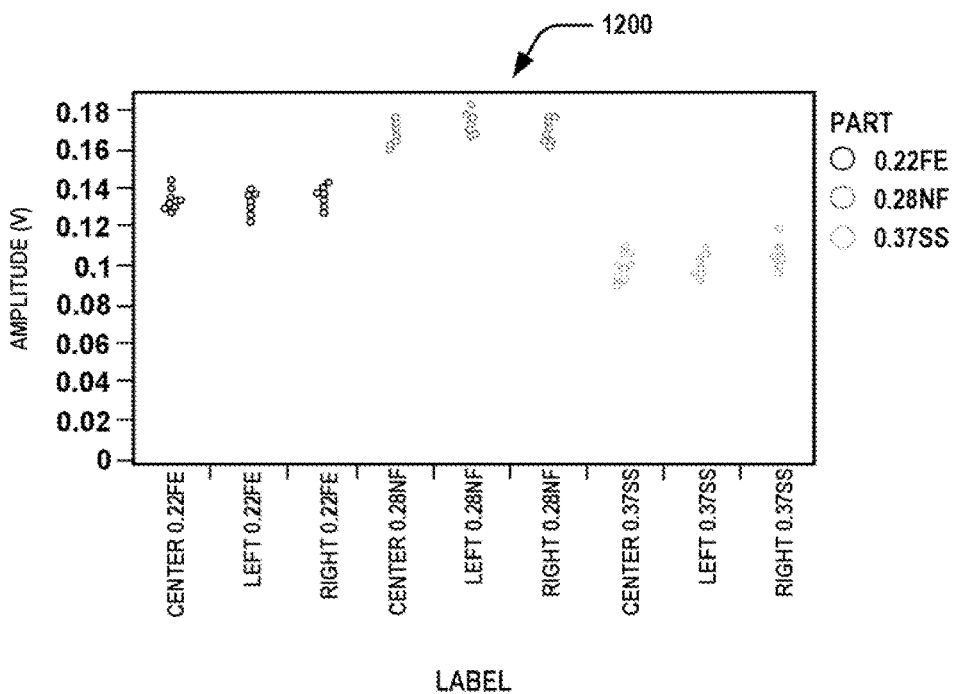
FIG. 12 is a graphical representation showing that position within the aperture did not affect detected signal strength of the spherical standards included with the metal detector.

FIG. 12 is a graphical representation 1200 showing that position within the aperture 106 did not affect detected signal strength of the spherical standards included with the metal detector 100. The spherical standards were encased in plastic and were passed through the aperture 106 of the detector 100 at least ten times and produced a minimally detectable signal for the various metal types. All the spherical standards showed detection amplitudes between 0.1-0.2 V. In other words, these samples were not positionally dependent on the path through the aperture 106 of the detector 100. Since signal strength of the standards did not seem to be strongly affected by position in the aperture 106, while the sensor signature could be minimized by orientation and positional control, it was concluded that detection of metal contaminants to level of industry best practices would be feasible as long as position and orientation can be controlled. Passing sensor-enabled dose forms in a first orientation could be used to verify that a sensor is present inside a closed dose form prior to screening for metal contaminants in a second orientation. For example, for a sensor-enabled dose form comprising an IEM type sensor, passing the sensor-enabled dose forms in the horizontal orientation could be used to verify that a sensor is present inside a closed dose form prior to screening for metal contaminants in the vertical orientation.

Figure 13:
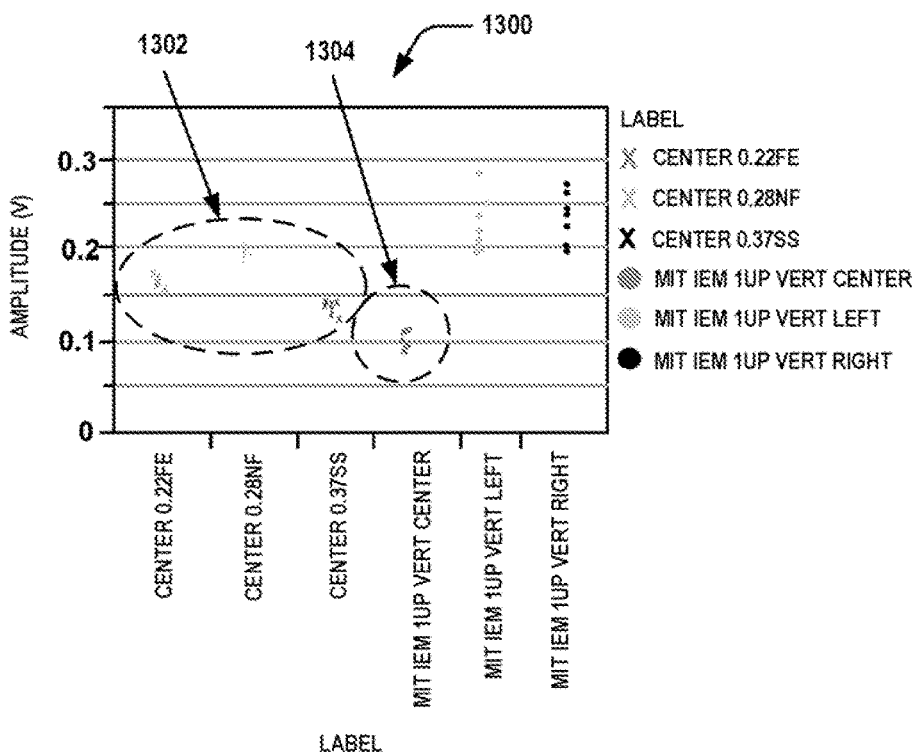
FIG. 13 is a graphical representation of a comparison of minimum signals generated by sensor-enabled dose forms with minimum signals generated by standards.

FIG. 13 is a graphical representation 1300 of a comparison of minimum signals generated by sensor-enabled dose forms 800 with minimum signals generated by standards. Spherical standard samples 1302 run through the center of the detector 100 aperture 106 and dose form samples 1304 in center/vertical orientation through the aperture 106 of the detector 100 are plotted where the vertical axis represents Amplitude (V) and the horizontal axis represents sample type. As shown in FIG. 13, all vertically and center oriented sensor-enabled dose form 800 showed lower signal than the minimum standards. Minimal separation between centered/vertically oriented sensor-enabled dose form 800 and 316SS at 0.37 mm.

Figure 14:
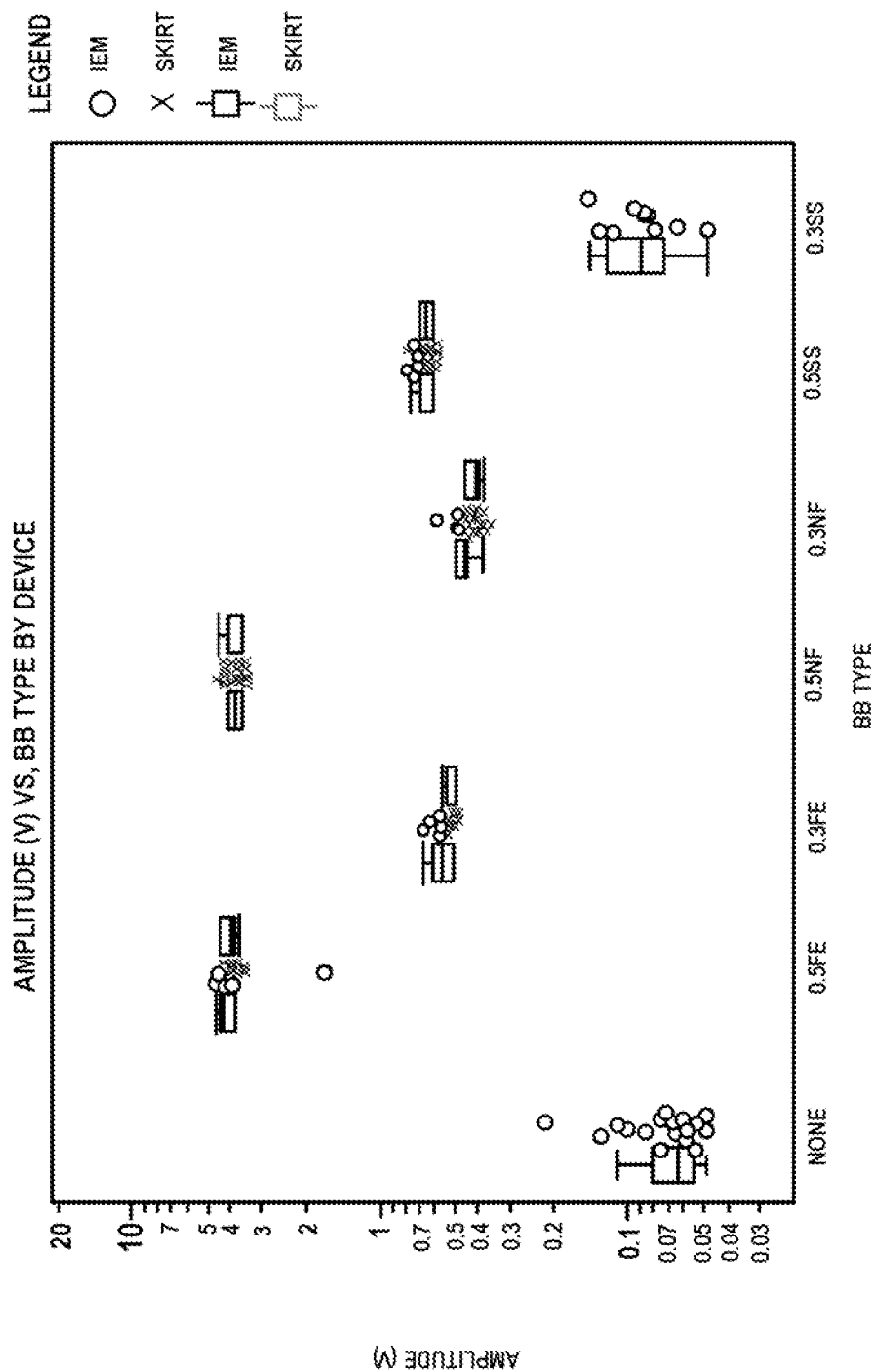
FIG. 14 is a graphical representation of amplitudes of dose forms (e.g., compressed tablets) containing an event indicator system (X's) and empty skirts (O) implanted with metal contaminants of known size directly compressed in the tablet.

FIG. 14 is a graphical representation 1400 of amplitudes of dose forms (e.g., compressed tablets) containing an event indicator system (X's) and empty skirts (O's) implanted with metal contaminants of known size directly compressed in the tablet. Standard the compressed tablets containing event indicator systems with event indicator systems (O's) were also included as a control. All metal contaminants except 0.3 mm SS spheres were detectable above the detection signal produced by the sensor-enabled dose form 800 baseline. In order to verify that metal particles were detectable within the sensor-enabled dose form 800, components were built with metal spheres of known diameter (0.3 mm and 0.5 mm) and metal type (FE, NF, SS) embedded into tablets both with and without sensors. To construct these components, the metal BBs were glued to the sensor (e.g., a skirt portion of an event indicator system, for example) with a small amount of hydroxypropyl cellulose glue. The sensors with the BBs attached were then compressed into tablet type dose forms using the standard tableting process for manufacturing tablets containing sensors. Following this step, the sensor-enabled dose forms 800 were tested by passing them through the center position of the aperture 106 in a vertical orientation using the guide 600 as previously discussed. A total of 13 groups of components were tested (2 BB diameters, 3 metal types, with and without ICs, plus one control group of standard dose forms (e.g., compressed tablets) containing an event indicator systems without BBs). The results are illustrated in FIG. 14 and summarized in TABLE 2.

Fifty standard sensors with no BBs (left group) showed a handful of outliers above 0.1V, with 58% passing completely below the detection threshold of 0.048V. Comparing between the compressed tablets containing sensors (O's) and the compressed tablets without sensors (X's), the addition of the sensor adds a small but detectable signal below 1V. Components with 0.3 mm FE, 0.3 mm NF, and 0.5 mm SS BBs showed a ~0.05V increase in the mean detected signal when an IC was present in a sensor-enabled dose form. For BBs with larger signals (0.5 mm FE and 0.5 mm NF), the additional metal from the sensor is not detectable above the noise in the detection signal. For 0.3 mm SS BBs, the compressed tablets without a sensor did not trigger any ejections, while the additional metal of the sensor caused all the compressed tablets containing a sensor with 0.3 mm SS BBs to be detected.

TABLE 2 is a summary of amplitudes and phases for detected components for the compressed tablets containing an event indicator system with metal spheres of known sizes.

TABLE 2

| BB Type | Device | Parts run | % detected | Amplitude (V) [Mean (SD)] | Phase [Mean (SD)] |
|---|---|---|---|---|---|
| None | IEM | 50 | 42% | 0.08 (0.04) | 89.9 (0.16) |
| 0.3 mm FE | Skirt | 6 | 100% | 0.52 (0.02) | 92.9 (1.38) |
|  | IEM | 10 | 100% | 0.57 (0.05) | 93.8 (0.42) |
| 0.5 mm FE | Skirt | 7 | 100% | 4.1 (0.18) | 99.8 (0.28) |
|  | IEM | 10 | 100% | 3.93 (0.81) | 99.9 (0.97) |
| 0.3 mm NF | Skirt | 10 | 100% | 0.42 (0.02) | 87.3 (0.7) |
|  | IEM | 10 | 100% | 0.47 (0.05) | 87 (1.25) |
| 0.5 mm NF | Skirt | 10 | 100% | 3.91 (0.26) | 82 (51.7) |
|  | IEM | 8 | 100% | 3.87 (0.25) | 77.1 (50.3) |
| 0.3 mm SS | Skirt | 8 | 0% | — | — |
|  | IEM | 9 | 100% | 0.09 (0.03) | 90 (0.15) |
| 0.5 mm SS | Skirt | 10 | 80%* | 0.63 (0.01) | 85.4 (1.15) |
|  | IEM | 10 | 100% | 0.68 (0.03) | 85.4 (1.06) |

From this data, setting a threshold of ~0.150V provides for minimization of false detections from sensors inside the compressed tablets, while allowing for detection of metal contaminants of the same size range as the detector 100 could sense without the presence of a sensor (0.3 mm FE and NF and above, 0.5 mm SS). The detection signal produced by 0.3 mm SS BBs was not discernible from the sensor detection signal when both were located in the same sensor-enabled dose form. But, dose forms containing just 0.3 mm SS BBs and no sensor were not detectable even at the detector's highest sensitivity.

After establishing a baseline with standard sensor-enabled dose forms 800 with and without standard metal contaminants, (e.g., BBs), the sensor-enabled dose forms 800 with BBs were passed through the detector in the same orientation, identical to the experiment previously outlined. The detection of the intentionally contaminated sensors is summarized in TABLE 3.

TABLE 3 summarizes detection of the sensor-enabled dose form 800 without BBs and with sensors and metal BBs after setting the ejection detector threshold to 0.1V. This eliminated detection of a majority of sensor-enabled dose forms that did not contain metal BBs contaminants. Those dose forms that did contain metal BBs were detected with the exception of the 0.3 mm stainless steel BBs (0.3 mm SS), that lie below the detection limits for this detector. Therefore, by orienting the sensors and proper establishment of baseline and trigger thresholds, sensor-enabled dose forms could be selectively screened for contaminants using a metal detector in a manufacturing process.

TABLE 3

| BB size | N | % Ejected | Amplitude (V) [mean (SD)] | Phase [mean (SD)] |
|---|---|---|---|---|
| None | 50 | 2% | .15 (—) | 90. (—) |
| 0.3 mm FE | 10 | 100% | .57 (.03) | 93.7 (.2) |
| 0.5 mm FE | 10 | 100% | 4.05 (.83) | 99.9 (.9) |
| 0.3 mm NF | 10 | 100% | .47 (.04) | 86.3 (1.1) |
| 0.5 mm NF | 8 | 100% | 3.99 (.24) | 78.0 (46.9) |
| 0.3 mm SS | 9 | 0% | — | — |
| 0.5 mm SS | 9 | 100% | .68 (.02) | 84.4 (.9) |

Comparing the data set in TABLE 3 to the data collected on the sensor-enabled dose forms 800 without sensors, e.g., just BBs in TABLE 2 and the detector set to the highest sensitivity, the same metal contaminants were detected, while screening out 98% of the sensor only components. All metal contaminants were detected except the 0.3 mm SS, which was not detected at the highest detector sensitivity. Thus, this method will allow for detection at a level approaching the maximum detection limit of the instrument, in line with industry best practices.

Based on the above, metal detection of sensor-enabled dose forms is possible with proper control of the orientation and position of the sensor within the detection aperture to minimize the detection signal produced by the sensor. If the sensor signal is minimized by passing through the aperture 106 of the detector in a center, vertical orientation and a threshold set to eliminate false positives from the sensor, metal contaminants down to 0.3 mm for ferrous and non-ferrous and 0.5 mm for stainless steel can be screened out. Smaller stainless steel particles may be detectable, but would require spheres of intermediate diameters to be tested.

In one aspect, the horizontal orientation also may be usable to verify the presence of a sensor inside a dose form prior to screening for metal contaminants.

The metal detector system consisted of a CEIA PH21N metal detector wirelessly connected via BlueTooth, for example, to a computer such as, for example, a Windows XP PC with MD Scope software installed. The MD scope software allows the user to control all detector settings from a command line interface, as well as providing a virtual scope that can be used to visualize the signals from the detector.

Following power up of the detector, connection can be establish to the PC by starting the MD scope software, and selecting the detector (listed by its serial number) under Communications->Settings, selecting BlueTooth on the right, selecting the device in the list, and connecting. To visualize the signal spikes, an oscilloscope or an oscilloscope mode can be used.

Screen captures may be acquired by pressing a "Freeze" button in the graphical user interface (GUI) (which also may toggle to display "Acquire") to stop the horizontal scroll of the scope screen and click Save. To restart scanning, the "Acquire" button is pressed (which will toggle back to display "Freeze"). The speed of horizontal scroll can be changed under the trace menu, and the vertical resolution can also be changed as well. However, if the signal exceeds the maximum vertical resolution, the signal may be truncated. Therefore it is recommended to set the voltage vertical resolution to a high enough value to contain the entire signal and when saving images. The ejection threshold voltage is shown by the dotted orange line and value in the lower left of the scope screen.

To collect data, the following procedure may be employed:
1) Start MD scope, login and start Oscilloscope F2.
2) Adjust to low horizontal scroll speed and 1V/div vertical resolution
3) Erase existing values (EV)
4) Run components through aperture
5) Freeze scope software, and take necessary saves (adjusting the vertical resolution as needed)
6) Print event log and copy/paste to Excel sheet (PL)
7) Repeat from 2 for subsequent data sets The amplitude (in dB) and phase reported by the scope were extracted and the amplitudes converted to V.

$$V_{th}=\exp(9.2656-0.04115*SE) \tag{1}$$

where $V_{th}$ is the minimum threshold voltage for a detection, and SE is the sensitivity setting (from 0 to 299) of the metal detector 100.

Once the threshold voltage $V_{th}$ is determined, amplitude can be converted from the decibel value to an absolute amplitude using Equation 2.

$$V_{det}=V_{th}10^{L/20} \tag{2}$$

where $V_{det}$ is the detected voltage, $V_{th}$ is the threshold voltage, and L is the signal in decibels.

Figure 15:
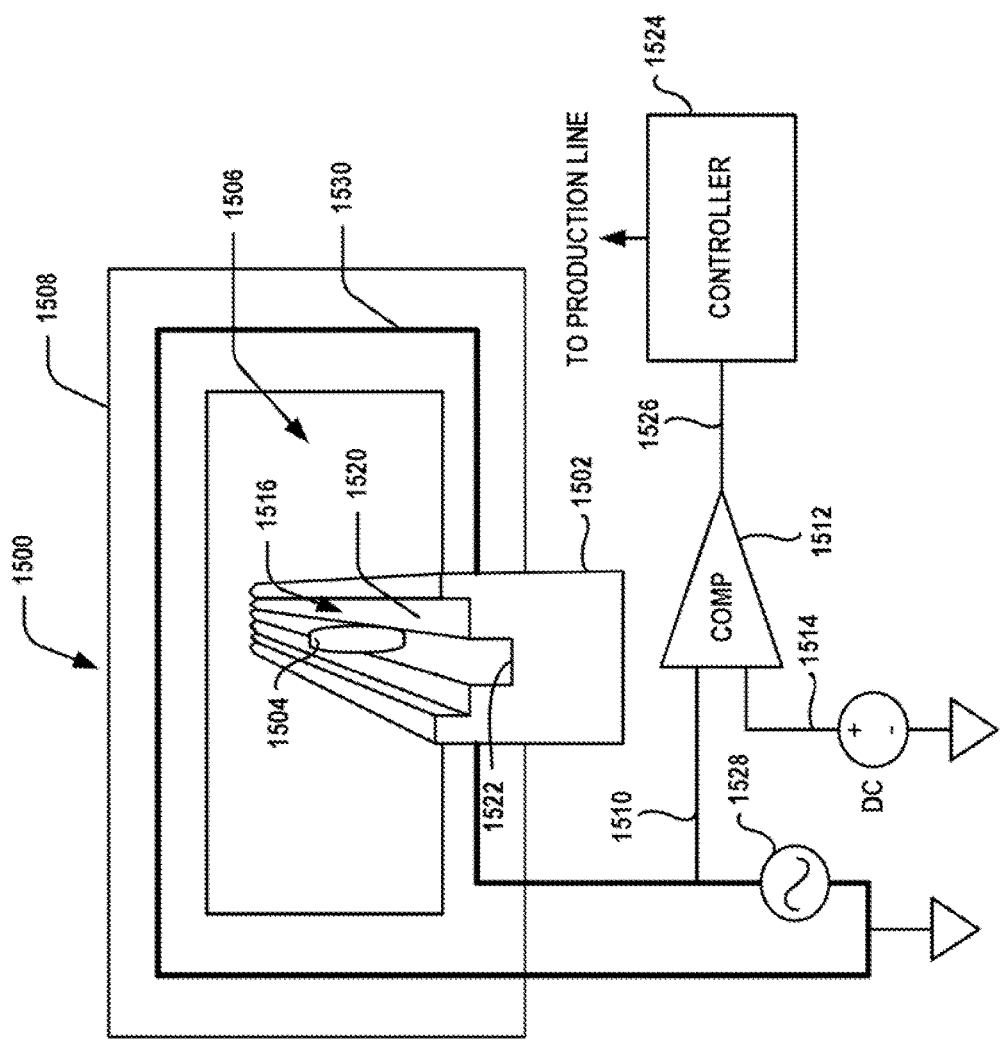
FIG. 15 is one aspect of a metal detector system.

FIG. 15 is one aspect of a metal detector system 1500. The system 1500 comprises a guide 1502 to position a sensor-enabled dose form 1504 in a predetermined orientation prior to passing through an aperture 1506 of a metal detector 1508. The metal detector 1508 comprises an aperture 1506 for receiving an oriented sensor-enabled dose form 1504 therethrough. The metal detector 1508 generates a detection signal 1510 when the sensor-enabled dose form 1504 passes through the aperture 1506 of the metal detector 1508. A comparator circuit 1512 compares the detection signal 1510 to a predetermined threshold 1514 to determine when a metal contaminant is present in the sensor-enabled dose form 1504.

As previously discussed, the metal detector 1508 comprises at least one coil 1530 driven by an oscillator 1528. In one aspect, the metal detector 1508 may comprise at least two coils, wherein at least one coil is configured to generate a field and the other coil is configured to detect a fluctuation signal in response to receiving the sensor-enabled dose form 1504 through the aperture 1506 of the metal detector 1508.

As previously discussed, the guide 1502 comprises a track 1516 with a slot to position the sensor-enabled dose form in a predetermined orientation. In one aspect, the track 1516 comprises a horizontal slot 1520 to position the sensor-enabled dose form 1504 in a horizontal orientation. In one aspect, the track 1516 also may comprise a vertical slot 1522 to position the sensor-enabled dose form 1504 in a vertical orientation.

In one aspect the system 1500 comprises a controller 1524 coupled to the comparator circuit 1512, wherein the comparator circuit 1512 generates a control signal 1526 based on the detection signal 1510. The controller 1524 rejects contaminated sensor-enabled dose forms based on the control signal 1526.

Figure 16:
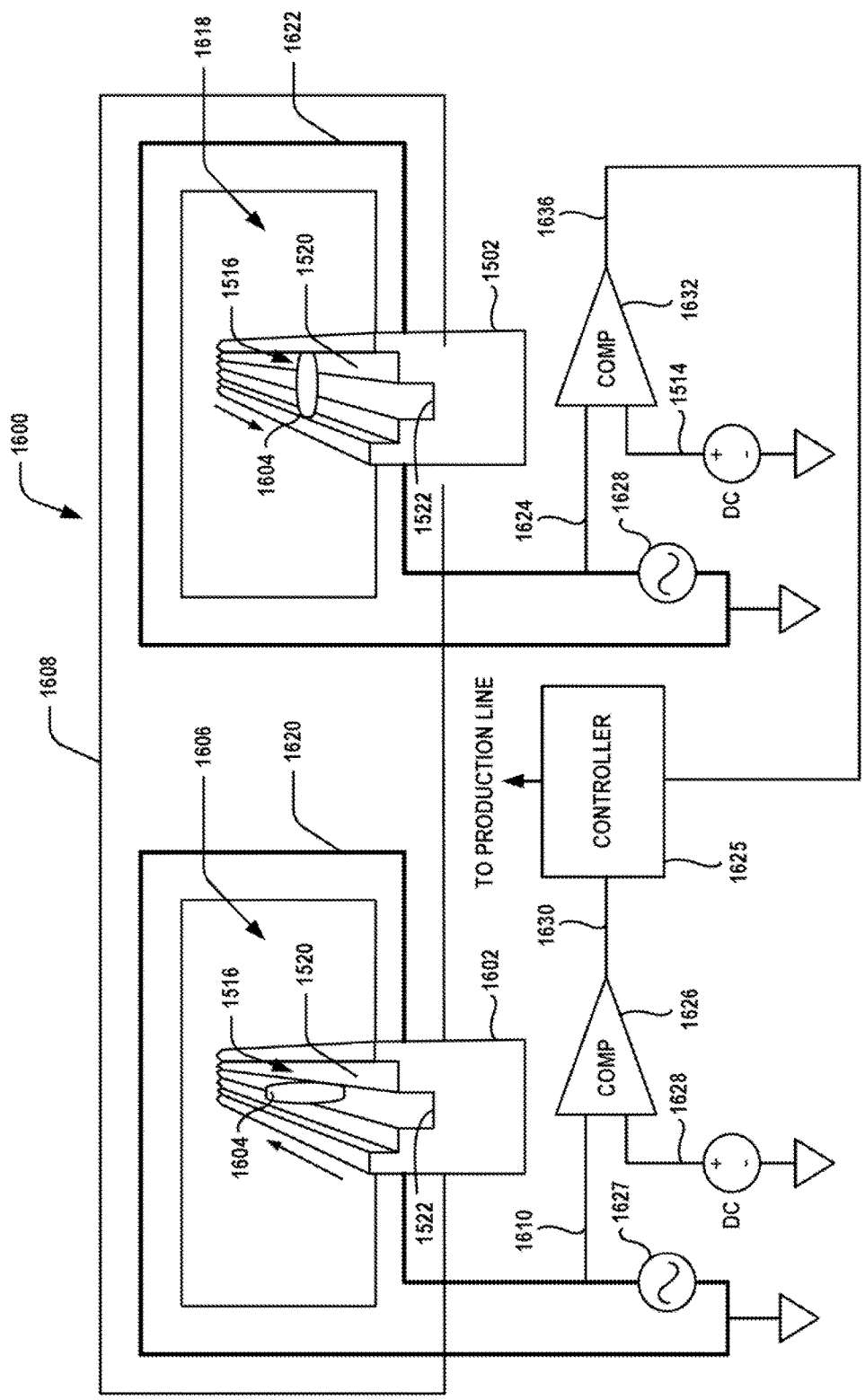
FIG. 16 is another aspect of a metal detector system.

FIG. 16 is another aspect of a metal detector system 1600. The system 1600 comprises a first track 1602 for orienting a sensor-enabled dose form 1604 in a first predetermined orientation. The system 1600 receives the sensor-enabled dose form 1604 in the first orientation through a first aperture 1606 of a metal detector 1608. The first aperture 1606 comprising at least one coil 1620 driven by an oscillator 1627. A first detection signal 1610 is generated by the metal detector 1608 in response to the sensor-enabled dose form 1604 passing through the first aperture 1606 of the metal detector 1608 in the first predetermined orientation. A first comparator circuit 1626 compares the first detection signal 1610 to a first threshold 1628 and outputs a first control signal 1630 to a controller 1625. In one aspect, in the first stage, the sensor-enabled dose form 1604 may be oriented in a vertical orientation.

After passing through the first stage 1614, the sensor-enabled dose form 1604 is oriented in a second predetermined orientation. The sensor-enabled dose form 1604 is then received in the second predetermined orientation through a second aperture 1618 of the metal detector 1608. The second aperture 1618 comprising at least one coil 1622 driven by an oscillator 1629. A second detection signal 1624 is generated by the metal detector 1608 in response to passing the sensor-enabled dose form 1604 through the second aperture 1618 of the metal detector 1608 in the second predetermined orientation. A second comparator circuit 1632 compares the second detection signal 1624 to a second threshold 1634 and outputs a second control signal 1636. In one aspect, in the second stage, the sensor-enabled dose form 1604 may be oriented in a horizontal orientation.

Thus, first and second detection signals 1610, 1624 are compared against first and second thresholds 1628, 1634 by a comparator circuit, e.g., the first and second comparator circuits 1626, 1632. A metal contaminant may be determined to be present in the sensor-enabled dose form 1604 by a controller 1636 based on the difference between the first and second detection signals 1610, 1624 relative to a predetermined threshold.

Having described a metal detector 100 and metal detection techniques for sensor-enabled dose forms 800, the description now turns to a brief description of a typical sensor-enabled dose form 800 that is suitable for testing in the disclosed metal detector 100 in accordance with the disclosed metal detection techniques.

Figure 17:
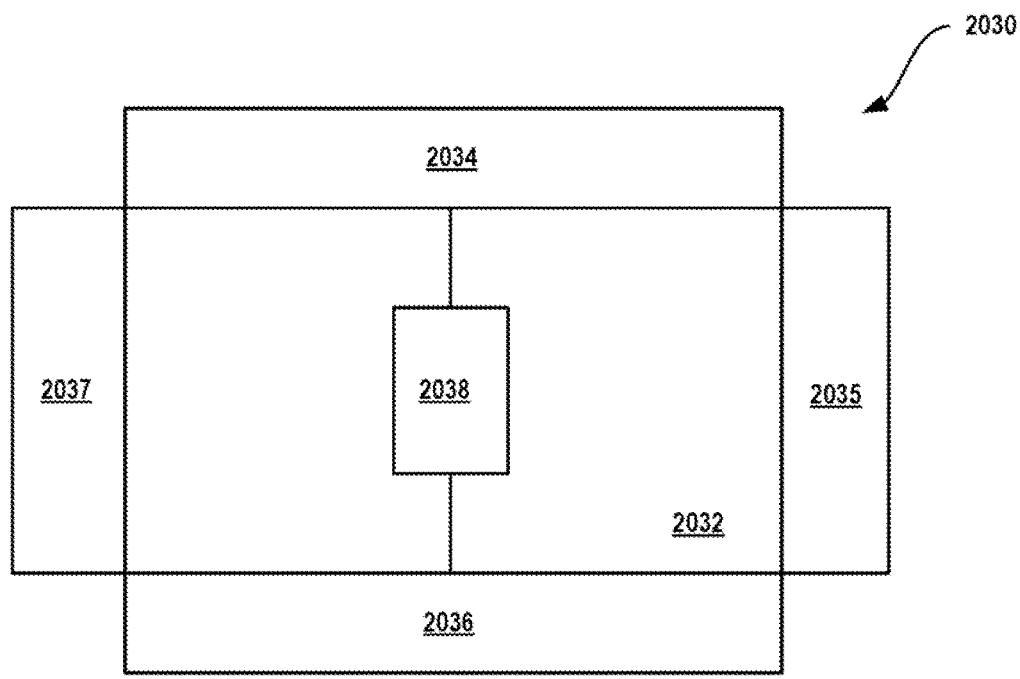
FIG. 17 is a block diagram representation of one aspect of the event indicator system with dissimilar metals positioned on opposite ends.

With reference to FIG. 17, there is shown one aspect of an ingestible device event indicator system with dissimilar metals positioned on opposite ends as system 2030. The system 2030 can be used in association with any pharmaceutical product, as mentioned above, to determine when a patient takes the pharmaceutical product. As indicated above, the scope of the present invention is not limited by the environment and the product that is used with the system 2030. For example, the system 2030 may be placed within a capsule and the capsule is placed within the conducting liquid. The capsule would then dissolve over a period of time and release the system 2030 into the conducting liquid.

Thus, in one aspect, the capsule would contain the system 2030 and no product. Such a capsule may then be used in any environment where a conducting liquid is present and with any product. For example, the capsule may be dropped into a container filled with jet fuel, salt water, tomato sauce, motor oil, or any similar product. Additionally, the capsule containing the system 2030 may be ingested at the same time that any pharmaceutical product is ingested in order to record the occurrence of the event, such as when the product was taken.

In the specific example of the system 2030 combined with the pharmaceutical product, as the product or pill is ingested, the system 2030 is activated. The system 2030 controls conductance to produce a unique current signature that is detected, thereby signifying that the pharmaceutical product has been taken. The system 2030 includes a framework 2032. The framework 2032 is a chassis for the system 2030 and multiple components are attached to, deposited upon, or secured to the framework 2032. In this aspect of the system 2030, a digestible material 2034 is physically associated with the framework 2032. The material 2034 may be chemically deposited on, evaporated onto, secured to, or built-up on the framework all of which may be referred to herein as "deposit" with respect to the framework 2032. The material 2034 is deposited on one side of the framework 2032. The materials of interest that can be used as material 2034 include, but are not limited to: Cu or CuI. The material 2034 is deposited by physical vapor deposition, electrodeposition, or plasma deposition, among other protocols. The material 2034 may be from about 0.05 to about 500 µm thick, such as from about 5 to about 100 µm thick. The shape is controlled by shadow mask deposition, or photolithography and etching. Additionally, even though only one region is shown for depositing the material, each system 2030 may contain two or more electrically unique regions where the material 2034 may be deposited, as desired.

At a different side, which is the opposite side as shown in FIG. 17, another digestible material 2036 is deposited, such that materials 2034 and 2036 are dissimilar. Although not shown, the different side selected may be the side next to the side selected for the material 2034. The scope of the present invention is not limited by the side selected and the term "different side" can mean any of the multiple sides that are different from the first selected side. Furthermore, even though the system is shaped as a square, the system may take the form of any suitable geometric shape. Material 2034 and 2036 are selected such that they produce a voltage potential difference when the system 2030 is in contact with conducting liquid, such as body fluids. The materials of interest for material 2036 include, but are not limited to: Mg, Zn, or other electronegative metals. As indicated above with respect to the material 2034, the material 2036 may be chemically deposited on, evaporated onto, secured to, or built-up on the framework. Also, an adhesion layer may be necessary to help the material 2036 (as well as material 2034 when needed) to adhere to the framework 2032. Typical adhesion layers for the material 2036 are Ti, TiW, Cr or similar material. Anode material and the adhesion layer may be deposited by physical vapor deposition, electrodeposition or plasma deposition. The material 2036 may be from about 0.05 to about 500 µm thick, such as from about 5 to about 100 µm thick. However, the scope of the present invention is not limited by the thickness of any of the materials nor by the type of process used to deposit or secure the materials to the framework 2032.

Figure 19:
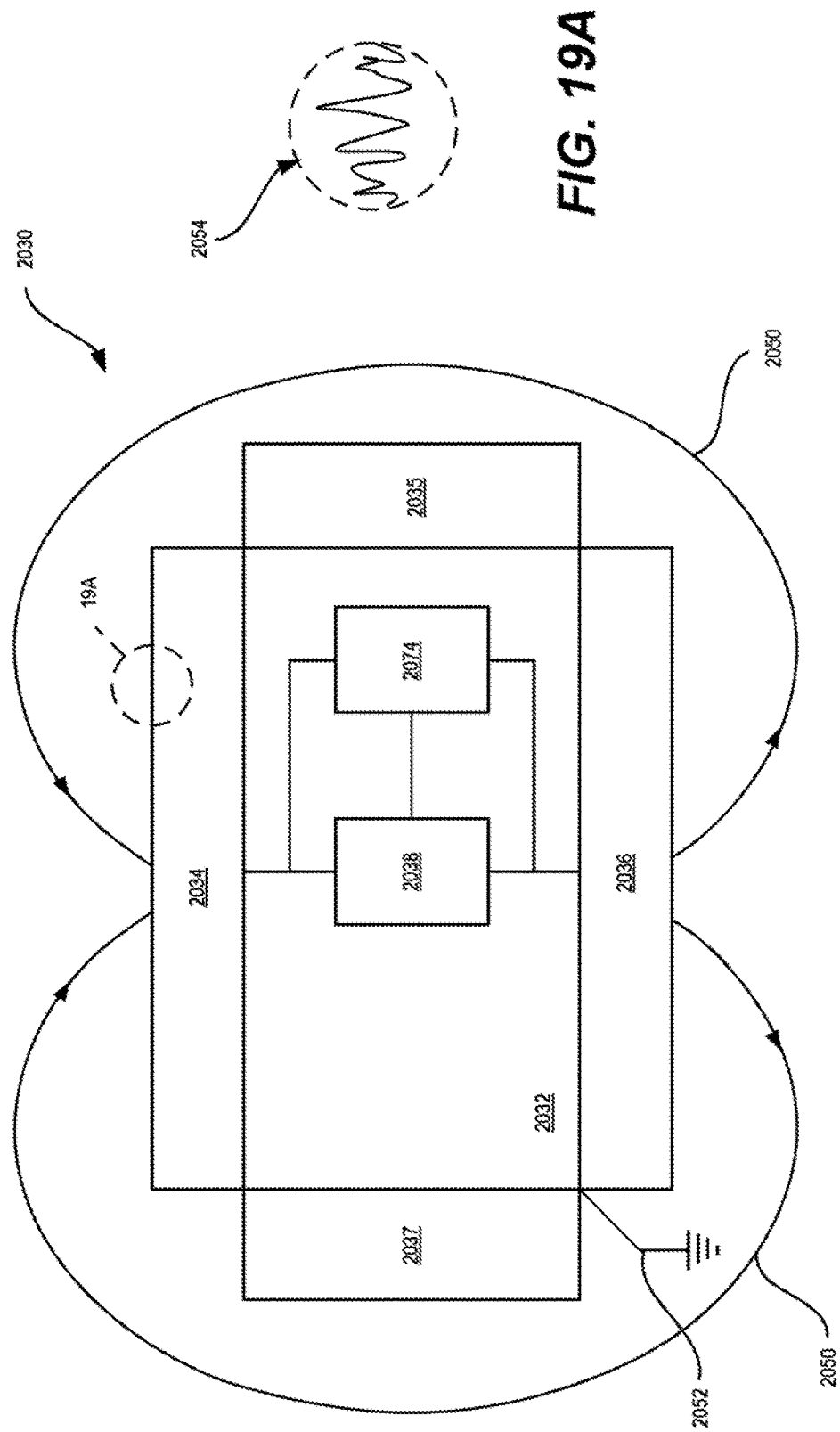
FIG. 19 shows ionic transfer or the current path through a conducting fluid when the event indicator system of FIG. 17 is in contact with conducting liquid and in an active state.

Thus, when the system 2030 is in contact with the conducting liquid, a current path, an example is shown in FIG. 19, is formed through the conducting liquid between material 2034 and 2036. A control device 2038 is secured to the framework 2032 and electrically coupled to the materials 2034 and 2036. The control device 2038 includes electronic circuitry, for example control logic that is capable of controlling and altering the conductance between the materials 2034 and 2036.

The voltage potential created between the materials 2034 and 2036 provides the power for operating the system as well as produces the current flow through the conducting fluid and the system. In one aspect, the system operates in direct current mode. In an alternative aspect, the system controls the direction of the current so that the direction of current is reversed in a cyclic manner, similar to alternating current. As the system reaches the conducting fluid or the electrolyte, where the fluid or electrolyte component is provided by a physiological fluid, e.g., stomach acid, the path for current flow between the materials 2034 and 2036 is completed external to the system 2030; the current path through the system 2030 is controlled by the control device 2038. Completion of the current path allows for the current to flow and in turn a receiver, not shown, can detect the presence of the current and recognize that the system 2030 has been activate and the desired event is occurring or has occurred.

In one aspect, the two materials 2034 and 2036 are similar in function to the two electrodes needed for a direct current power source, such as a battery. The conducting liquid acts as the electrolyte needed to complete the power source. The completed power source described is defined by the physical chemical reaction between the materials 2034 and 2036 of the system 2030 and the surrounding fluids of the body. The completed power source may be viewed as a power source that exploits reverse electrolysis in an ionic or a conductive solution such as gastric fluid, blood, or other bodily fluids and some tissues. Additionally, the environment may be something other than a body and the liquid may be any conducting liquid. For example, the conducting fluid may be salt water or a metal based paint.

In certain aspects, these two materials are shielded from the surrounding environment by an additional layer of material. Accordingly, when the shield is dissolved and the two dissimilar materials are exposed to the target site, a voltage potential is generated.

Referring again to FIG. 17, the materials 2034 and 2036 provide the voltage potential to activate the control device 2038. Once the control device 2038 is activated or powered up, the control device 2038 can alter conductance between the materials 2034 and 2036 in a unique manner. By altering the conductance between materials 2034 and 2036, the control device 2038 is capable of controlling the magnitude of the current through the conducting liquid that surrounds the system 2030. This produces a unique current signature that can be detected and measured by a receiver (not shown), which can be positioned internal or external to the body. In addition to controlling the magnitude of the current path between the materials, non-conducting materials, membrane, or "skirt" are used to increase the "length" of the current path and, hence, act to boost the conductance path, as disclosed in the U.S. patent application Ser. No. 12/238,345 entitled, "In-Body Device with Virtual Dipole Signal Amplification" filed Sep. 25, 2008 and is incorporated herein by reference in its entirety. Alternatively, throughout the disclosure herein, the terms "non-conducting material", "membrane", and "skirt" are interchangeable with the term "current path extender" without impacting the scope or the present aspects and the claims herein. The skirt, shown in portion at 2035 and 2037, respectively, may be associated with, e.g., secured to, the framework 2032. Various shapes and configurations for the skirt are contemplated as within the scope of the present invention. For example, the system 2030 may be surrounded entirely or partially by the skirt and the skirt maybe positioned along a central axis of the system 2030 or off-center relative to a central axis. Thus, the scope of the present invention as claimed herein is not limited by the shape or size of the skirt. Furthermore, in other aspects, the materials 2034 and 2036 may be separated by one skirt that is positioned in any defined region between the materials 2034 and 2036.

Figure 18:
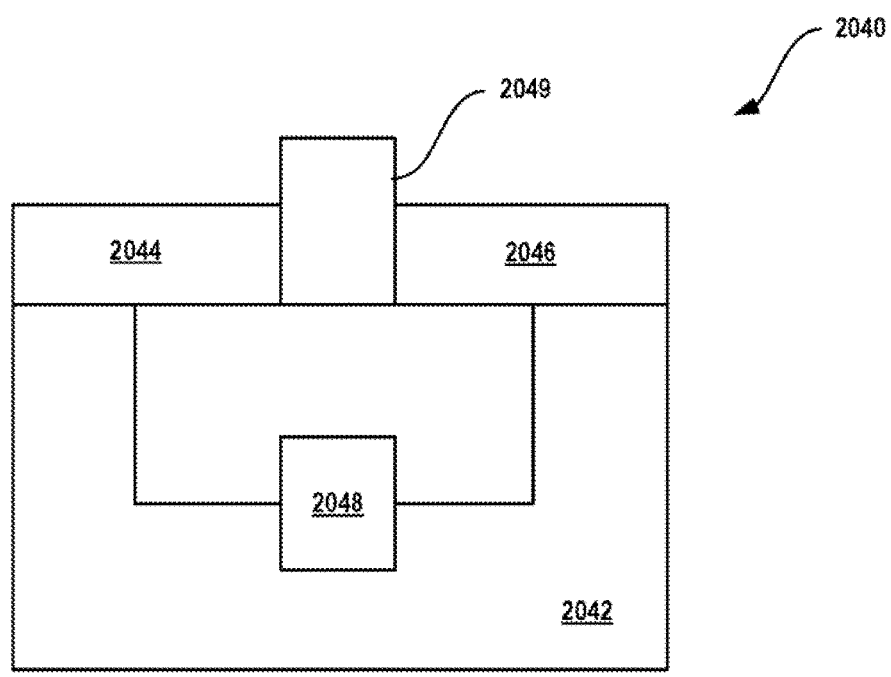
FIG. 18 is a block diagram representation of another aspect of the event indicator system with dissimilar metals positioned on the same end and separated by a non-conducting material.

Referring now to FIG. 18, in another aspect of an ingestible device is shown in more detail as system 2040. The system 2040 includes a framework 2042. The framework 2042 is similar to the framework 2032 of FIG. 17. In this aspect of the system 2040, a digestible or dissolvable material 2044 is deposited on a portion of one side of the framework 2042. At a different portion of the same side of the framework 2042, another digestible material 2046 is deposited, such that materials 2044 and 2046 are dissimilar. More specifically, material 2044 and 2046 are selected such that they form a voltage potential difference when in contact with a conducting liquid, such as body fluids. Thus, when the system 2040 is in contact with and/or partially in contact with the conducting liquid, then a current path, an example is shown in FIG. 19, is formed through the conducting liquid between material 2044 and 2046. A control device 2048 is secured to the framework 2042 and electrically coupled to the materials 2044 and 2046. The control device 2048 includes electronic circuitry that is capable of controlling part of the conductance path between the materials 2044 and 2046. The materials 2044 and 2046 are separated by a non-conducting skirt 2049. Various examples of the skirt 2049 are disclosed in U.S. Provisional Application No. 61/173,511 filed on Apr. 28, 2009 and entitled "HIGHLY RELIABLE INGESTIBLE EVENT MARKERS AND METHODS OF USING SAME" and U.S. Provisional Application No. 61/173,564 filed on Apr. 28, 2009 and entitled "INGESTIBLE EVENT MARKERS HAVING SIGNAL AMPLIFIERS THAT COMPRISE AN ACTIVE AGENT"; as well as U.S. application Ser. No. 12/238,345 filed Sep. 25, 2008 and published as 2009-0082645, entitled "IN-BODY DEVICE WITH VIRTUAL DIPOLE SIGNAL AMPLIFICATION"; the entire disclosure of each is incorporated herein by reference.

Once the control device 2048 is activated or powered up, the control device 2048 can alter conductance between the materials 2044 and 2046. Thus, the control device 2048 is capable of controlling the magnitude of the current through the conducting liquid that surrounds the system 2040. As indicated above with respect to system 2030, a unique current signature that is associated with the system 2040 can be detected by a receiver (not shown) to mark the activation of the system 2040. In order to increase the "length" of the current path the size of the skirt 2049 is altered. The longer the current path, the easier it may be for the receiver to detect the current.

Referring now to FIG. 19, the system 2030 of FIG. 17 is shown in an activated state and in contact with conducting liquid. The system 2030 is grounded through ground contact 2052. The system 2030 also includes a sensor module 2074. Ion or current paths 2050 form between material 2034 to material 2036 through the conducting fluid in contact with the system 2030. The voltage potential created between the material 2034 and 2036 is created through chemical reactions between materials 2034/2036 and the conducting fluid.

FIG. 19A is an exploded view of the surface of the material 2034. The surface of the material 2034 is not planar, but rather an irregular surface 2054 as shown. The irregular surface 2054 increases the surface area of the material and, hence, the area that comes in contact with the conducting fluid.

In one aspect, at the surface of the material 2034, there is chemical reaction between the material 2034 and the surrounding conducting fluid such that mass is released into the conducting fluid. The term "mass" as used herein refers to protons and neutrons that form a substance. One example includes the instant where the material is CuCl and when in contact with the conducting fluid, CuCl becomes Cu (solid) and Cl⁻ in solution. The flow of ions into the conduction fluid is depicted by the ion paths 2050. In a similar manner, there is a chemical reaction between the material 2036 and the surrounding conducting fluid and ions are captured by the material 2036. The release of ions at the material 2034 and capture of ion by the material 2036 is collectively referred to as the ionic exchange. The rate of ionic exchange and, hence the ionic emission rate or flow, is controlled by the control device 2038. The control device 2038 can increase or decrease the rate of ion flow by altering the conductance, which alters the impedance, between the materials 2034 and 2036. Through controlling the ion exchange, the system 2030 can encode information in the ionic exchange process. Thus, the system 2030 uses ionic emission to encode information in the ionic exchange.

The control device 2038 can vary the duration of a fixed ionic exchange rate or current flow magnitude while keeping the rate or magnitude near constant, similar to when the frequency is modulated and the amplitude is constant. Also, the control device 2038 can vary the level of the ionic exchange rate or the magnitude of the current flow while keeping the duration near constant. Thus, using various combinations of changes in duration and altering the rate or magnitude, the control device 2038 encodes information in the current flow or the ionic exchange. For example, the control device 2038 may use, but is not limited to any of the following techniques namely, Binary Phase-Shift Keying (PSK), Frequency modulation, Amplitude modulation, on-off keying, and PSK with on-off keying.

As indicated above, the various aspects disclosed herein, such as systems 2030 and 2040 of FIGS. 16 and 17, respectively, include electronic components as part of the control device 2038 or the control device 2048. Components that may be present include but are not limited to: logic and/or memory elements, an integrated circuit, an inductor, a resistor, and sensors for measuring various parameters. Each component may be secured to the framework and/or to another component. The components on the surface of the support may be laid out in any convenient configuration. Where two or more components are present on the surface of the solid support, interconnects may be provided.

As indicated above, the system, such as system 2030 and 2040, control the conductance between the dissimilar materials and, hence, the rate of ionic exchange or the current flow. Through altering the conductance in a specific manner the system is capable of encoding information in the ionic exchange and the current signature. The ionic exchange or the current signature is used to uniquely identify the specific system. Additionally, the systems 2030 and 2040 are capable of producing various different unique exchanges or signatures and, thus, provide additional information. For example, a second current signature based on a second conductance alteration pattern may be used to provide additional information, which information may be related to the physical environment. To further illustrate, a first current signature may be a very low current state that maintains an oscillator on the chip and a second current signature may be a current state at least a factor of ten higher than the current state associated with the first current signature.

FIG. 20 provides views of various ingestible event marker configurations. Aspects of sensor-enabled dose forms 800 implemented as IEMs may include an assembly unit configured to stably associate one or more ingestible event marker with a carrier, such as a tablet or capsule, to produce an ingestible event marker. Ingestible event markers may have a variety of different configurations. Configurations of interest include, but are not limited to, those shown in FIG. 20, which include various configurations.

For example, in "IEM Identifier-in-Tablet" 1002, an IEM 1006 having a unit 1008, e.g., two dissimilar materials and a control device, and a current path extender ("skirt") 1012 is present inside of a tablet 1004, e.g., by incorporation during tablet pressing or placement in a cavity provided by two tablet halves.

In "IEM Identifier-On-Tablet" 1014, an IEM 1006 having a unit 1008, e.g., two dissimilar materials and a control device, and a current path extender ("skirt") 1012 is communicably associated with a tablet 1004. A coating 1016, shown in partial form, partially or wholly covers the IEM 1005 and may cover at least a portion of the carrier, e.g., tablet 1004.

In "IEM Identifier-As-Carrier" 1018, an IEM 1006 having a unit 1008, e.g., two dissimilar materials and a control device, and a current path extender ("skirt") 1012 is communicably associated, e.g., inserted into, a capsule 1020.

In "Bi-Tablet" 1022, an IEM 1006 having a unit 1008, e.g., two dissimilar materials and a control device, and a current path extender ("skirt") 1012 is communicably associated, e.g., disposed within two tablet-halves 1004a and 1004b, respectively.

In "On-Capsule" 1026, an IEM 1006 having a unit 1008 is communicably associated, e.g., attached to an exterior portion of capsule 1020.

In "IEM Identifier-As-Carrier" 1028, an IEM 1006 structure is the tablet or serves as a drug-reservoir matrix. To illustrate, an ingestible event marker includes an integrated carrier structure, where a current path extender ("skirt") serves as drug matrix. By "stably associate" is meant that the one or more markers are physically associated with the carrier component of the ingestible event marker prior to ingestion. A given ingestible event marker may be associated with a carrier, such as a tablet or capsule, using a variety of different approaches. For example, physiological acceptable adhesives, such as thermoset, solvent evaporation, or other types of adhesives may be employed. Alternatively, welding elements, such as tabs or other structures, which can be melted with a high energy stimulus (such as a laser, ultrasonic source, etc.), may be employed to stably associate the ingestible event marker with a carrier. Alternatively, one or more components of the ingestible event marker may be manufactured on a carrier or carrier precursor thereof (such as by use of pulse-jet protocols described in greater detail below) in a manner that stably associates the ingestible event marker with the carrier. Also of interest is the use of ingestible event marker that include structures (such as elastic bands, press-fit structures, etc.) configured to mechanically interact with a carrier to provide the desired stable association of the ingestible event marker with the carrier. Such structures are elements that mechanically provide for stable association of the ingestible event marker with the pre-made carrier.

Further aspects of the invention are defined in the following clauses:
1. A method comprising:
   orienting a sensor-enabled dose form in a predetermined orientation;
   receiving the sensor-enabled dose form through an aperture of a metal detector;
   generating a detection signal by the metal detector in response to receiving the sensor-enabled dose form through the aperture of the metal detector;
   comparing the detection signal to a predetermined threshold; and
   determining the presence of a metal contaminant in the sensor-enabled dose form based on the comparison of the detection signal and the predetermined threshold.
2. The method of clause 1, comprising generating a control signal indicative of detecting the metal contaminant when the detection signal exceeds the predetermined threshold and/or comprising orienting the sensor-enabled dose form in any one of a horizontal orientation, vertical orientation, and any combination thereof.
3. The method of clause 1 or 2, comprising locating the sensor-enabled dose form in a guide comprising a track having a horizontal slot and a vertical slot for positioning the sensor-enabled dose form in a horizontal orientation when the sensor-enabled dose form is located in the horizontal slot and positioning the sensor-enabled dose form in a vertical orientation when the sensor-enabled dose form is located in the vertical slot.
4. The method of any of the preceding clauses, comprising:
   orienting the sensor-enabled dose form in a first orientation;
   wherein generating a detection signal further comprises:
     generating a first detection signal in response to receiving the sensor-enabled dose form through the aperture of the metal detector; and
   wherein comparing the detection signal to a predetermined threshold further comprises:
     comparing the first detection signal to a first threshold to determine the presence of a sensor in the sensor-enabled dose form, the method preferably comprising:
     orienting the sensor-enabled dose form in a second orientation;
   wherein generating a detection signal further comprises:
     generating a second detection signal in response to receiving the sensor-enabled dose form through the aperture of the metal detector; and
   wherein comparing the detection signal to a predetermined threshold further comprises:
     comparing the second detection signal to a second threshold to determine the presence of a metal contaminant in the sensor-enabled dose form.
5. The method of clause 4, comprising:
   generating a first control signal indicative of detecting the sensor based on the first detection signal relative to the first threshold; and
   generating a second control signal indicative of detecting the metal contaminant based on the second detection signal relative to the second threshold.
6. The method of clause 4 or 5, comprising:
   receiving the sensor-enabled dose form in the first orientation through a first aperture of a metal detector;
   receiving the sensor-enabled dose form in the second predetermined orientation through a second aperture of the metal detector, different form the first aperture of the metal detector;
   generating a first and second detection signal by the metal detector in response to the sensor-enabled dose form passing through the first and second aperture;
   comparing the first and second detection signals;
   determining when a metal contaminant is present in the sensor-enabled dose form based on the difference between the first and second detection relative to a predetermined threshold.
7. The method of any of the preceding clauses, wherein the sensor-enabled dose form comprises an ingestible event indicator system comprising dissimilar metals positioned on different sides of a framework and a control device secured to the framework, wherein the ingestible event indicator system is configured to generate a voltage potential when in contact with a conductive fluid suitable to activate the control device and generate an electrical current through the conductive fluid.
8. The method of any of the preceding clauses, comprising receiving the sensor-enabled dose form in any one of a center, left, or right position relative to the aperture of the metal detector.
9. An apparatus for detecting a metal contaminant in a sensor-enabled dose form, the apparatus comprising:
   a guide to position a sensor-enabled dose form in a predetermined orientation;
   a metal detector comprising an aperture for receiving an oriented sensor-enabled dose form therethrough, the metal detector to generate a detection signal when the sensor-enabled dose form passes through the metal detector; and
   a comparator circuit to compare the detection signal to a predetermined threshold to determine when a metal contaminant is present in the sensor-enabled dose form.
10. The apparatus of clause 9, wherein the metal detector comprises at least one coil or, preferably, wherein the metal detector comprises at least two coils, wherein at least one coil is configured to generate a field and the other coil is configured to detect a fluctuation signal in response to receiving the sensor-enabled dose form through the aperture of the metal detector.
11. The apparatus of clause 9 or 10, wherein the guide comprises a track with a slot to position the sensor-enabled dose form in a predetermined orientation, for instance a track with a horizontal slot to position the sensor-enabled dose form in a horizontal orientation and/or a track with a vertical slot to position the sensor-enabled dose form in a vertical orientation.
12. The apparatus of clause 9, 10 or 11, wherein the sensor-enabled dose form comprises an ingestible event indicator system comprising dissimilar metals positioned on different sides of a framework and a control devices secured to the framework, wherein the ingestible event indicator system is configured to generate a voltage potential when in contact with a conductive fluid suitable to activate the control device and generate an electrical current through the conductive fluid.
13. A system for detecting a metal contaminant in a sensor-enabled dose form, the system comprising:
   an apparatus according to any of clauses 9-12;
   a controller coupled to the comparator circuit.
14. System according to clause 13, wherein the comparator circuit generates a control signal based on the detection signal and wherein the controller is configured to reject contaminated sensor-enabled dose forms based on the control signal.
15. System for detecting a metal contaminant in a sensor-enabled dose form, comprising:
   a first apparatus comprising:

a guide to position a sensor-enabled dose form in a predetermined orientation;

a metal detector comprising an aperture for receiving an oriented sensor-enabled dose form therethrough, the metal detector to generate a first detection signal when the sensor-enabled dose form passes through the aperture of the metal detector; and a first comparator circuit to compare the first detection signal to a predetermined threshold and to generate a first control signal based on the first detection signal;

a second apparatus comprising:

a guide to position a sensor-enabled dose form in a predetermined orientation;

a metal detector comprising an aperture for receiving an oriented sensor-enabled dose form therethrough, the metal detector to generate a second detection signal when the sensor-enabled dose form passes through the aperture of the metal detector; and a second comparator circuit to compare the second detection signal to a predetermined threshold and to generate a second control signal based on the second detection signal; and a controller coupled to the first and second comparator circuits, configured to determine when a metal contaminant is present in the sensor-enabled dose form based on both the first and second control signals, preferably further being configured to reject contaminated sensor-enabled dose forms based on the determination.

While various details have been set forth in the foregoing description, it will be appreciated that the various aspects of the metal detector apparatus, system, and method may be practiced without these specific details. For example, for conciseness and clarity selected aspects have been shown in block diagram form rather than in detail. Some portions of the detailed descriptions provided herein may be presented in terms of instructions that operate on data that is stored in a computer memory. Such descriptions and representations are used by those skilled in the art to describe and convey the substance of their work to others skilled in the art. In general, an algorithm refers to a self-consistent sequence of steps leading to a desired result, where a "step" refers to a manipulation of physical quantities which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities.

Unless specifically stated otherwise as apparent from the foregoing discussion, it is appreciated that, throughout the foregoing description, discussions using terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

It is worthy to note that any reference to "one aspect," "an aspect," "one embodiment," or "an embodiment" means that a particular feature, structure, or characteristic described in connection with the aspect is included in at least one aspect. Thus, appearances of the phrases "in one aspect," "in an aspect," "in one embodiment," or "in an embodiment" in various places throughout the specification are not necessarily all referring to the same aspect. Furthermore, the particular features, structures or characteristics may be combined in any suitable manner in one or more aspects.

Some aspects may be described using the expression "coupled" and "connected" along with their derivatives. It should be understood that these terms are not intended as synonyms for each other. For example, some aspects may be described using the term "connected" to indicate that two or more elements are in direct physical or electrical contact with each other. In another example, some aspects may be described using the term "coupled" to indicate that two or more elements are in direct physical or electrical contact. The term "coupled," however, also may mean that two or more elements are not in direct contact with each other, but yet still co-operate or interact with each other.

It is worthy to note that any reference to "one aspect," "an aspect," "one embodiment," or "an embodiment" means that a particular feature, structure, or characteristic described in connection with the aspect is included in at least one aspect. Thus, appearances of the phrases "in one aspect," "in an aspect," "in one embodiment," or "in an embodiment" in various places throughout the specification are not necessarily all referring to the same aspect. Furthermore, the particular features, structures or characteristics may be combined in any suitable manner in one or more aspects.

Although various embodiments have been described herein, many modifications, variations, substitutions, changes, and equivalents to those embodiments may be implemented and will occur to those skilled in the art. Also, where materials are disclosed for certain components, other materials may be used. It is therefore to be understood that the foregoing description and the appended claims are intended to cover all such modifications and variations as falling within the scope of the disclosed embodiments. The following claims are intended to cover all such modification and variations.

Some or all of the embodiments described herein may generally comprise technologies for an metal detector apparatus, system, and method, or otherwise according to technologies described herein. In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in component, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

All of the above-mentioned U.S. patents, U.S. patent application publications, U.S. patent applications, foreign patents, foreign patent applications, non-patent publications referred to in this specification and/or listed in any Application Data Sheet, or any other disclosure material are incorporated herein by reference, to the extent not inconsistent herewith. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

In some instances, one or more components may be referred to herein as "configured to," "configurable to," "operable/operative to," "adapted/adaptable," "able to," "conformable/conformed to," etc. Those skilled in the art will recognize that "configured to" can generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

In certain cases, use of a system or method may occur in a territory even if components are located outside the territory. For example, in a distributed computing context, use of a distributed computing system may occur in a territory even though components of the system may be located outside of the territory (e.g., relay, server, processor, signal-bearing medium, transmitting computer, receiving computer, etc. located outside the territory).

A sale of a system or method may likewise occur in a territory even if components of the system or method are located and/or used outside the territory. Further, implementation of at least component of a system for performing a method in one territory does not preclude use of the system in another territory.

Although various embodiments have been described herein, many modifications, variations, substitutions, changes, and equivalents to those embodiments may be implemented and will occur to those skilled in the art. Also, where materials are disclosed for certain components, other materials may be used. It is therefore to be understood that the foregoing description and the appended claims are intended to cover all such modifications and variations as falling within the scope of the disclosed embodiments. The following claims are intended to cover all such modification and variations.

In summary, numerous benefits have been described which result from employing the concepts described herein. The foregoing description of the one or more embodiments has been presented for purposes of illustration and description. It is not intended to be exhaustive or limiting to the precise form disclosed. Modifications or variations are possible in light of the above teachings. The one or more embodiments were chosen and described in order to illustrate principles and practical application to thereby enable one of ordinary skill in the art to utilize the various embodiments and with various modifications as are suited to the particular use contemplated. It is intended that the claims submitted herewith define the overall scope.

The invention claimed is:

1. A method comprising:
  receiving a sensor-enabled dose form through a metal detector in a predetermined orientation relative to the metal detector;
  generating a detection signal by the metal detector in response to receiving the sensor-enabled dose form through the metal detector;
  comparing the detection signal to a predetermined threshold; and
  determining the presence of a metal contaminant in the sensor-enabled dose form based on the comparison of the detection signal and the predetermined threshold.

2. The method of claim 1, comprising generating a control signal indicative of detecting the metal contaminant when the detection signal exceeds the predetermined threshold.

3. The method of claim 1, comprising orienting the sensor-enabled dose form in any one of a horizontal orientation, vertical orientation, and any combination thereof.

4. The method of claim 3, comprising locating the sensor-enabled dose form in a guide comprising a track having a horizontal slot and a vertical slot for positioning the sensor-enabled dose form in a horizontal orientation when the sensor-enabled dose form is located in the horizontal slot and positioning the sensor-enabled dose form in a vertical orientation when the sensor-enabled dose form is located in the vertical slot.

5. The method of claim 1, comprising receiving the sensor-enabled dose form in any one of a center, left, or right position relative to the metal detector.

6. The method of claim 1, wherein the predetermined orientation is configured to minimize a detection signal resulting from a sensor of the sensor-enabled dose form.

7. The method of claim 1, wherein the predetermined orientation comprises a first predetermined orientation, the detection signal comprises a first detection signal, and the predetermined threshold comprises a first predetermined threshold, the method further comprising:
  receiving the sensor-enabled dose form through the metal detector in a second predetermined orientation relative to the metal detector, the second predetermined orientation configured to maximize a second detection signal resulting from the sensor of the sensor-enabled dose form;
  generating the second detection signal in response to receiving the sensor-enabled dose form through the metal detector;
  comparing the second detection signal to a second predetermined threshold; and determining the presence of the sensor in the sensor-enabled dose form based on the comparison of the second detection signal and the second predetermined threshold.

8. The method of claim 7, comprising:
generating a first control signal indicative of detecting the metal contaminant based on the first detection signal relative to the first predetermined threshold; and
generating a second control signal indicative of detecting the sensor based on the second detection signal relative to the second predetermined threshold.

9. The method of claim 1, wherein the sensor-enabled dose form comprises an ingestible event indicator system comprising dissimilar metals positioned on different sides of a framework and a control device secured to the framework, wherein the ingestible event indicator system is configured to generate a voltage potential when in contact with a conductive fluid suitable to activate the control device and generate an electrical current through the conductive fluid.

10. An apparatus, comprising:
a guide to position a sensor-enabled dose form in a predetermined orientation;
a metal detector configured to receive an oriented sensor-enabled dose form therethrough in the predetermined orientation, the metal detector configured to generate a detection signal when the sensor-enabled dose form passes through the metal detector; and
a comparator circuit configured to compare the detection signal to a predetermined threshold to determine whether a metal contaminant is present in the sensor-enabled dose form.

11. The apparatus of claim 10, wherein the metal detector comprises at least one coil.

12. The apparatus of claim 11, wherein the metal detector comprises at least two coils, wherein at least one coil is configured to generate a field and the other coil is configured to detect a fluctuation signal in response to receiving the sensor-enabled dose form through the metal detector.

13. The apparatus of claim 10, wherein the guide comprises a track with a slot to position the sensor-enabled dose form in the predetermined orientation.

14. The apparatus of claim 13, wherein the slot comprises a horizontal slot to position the sensor-enabled dose form in a horizontal orientation.

15. The apparatus of claim 14, wherein the slot comprises a vertical slot to position the sensor-enabled dose form in a vertical orientation.

16. The apparatus of claim 10, wherein the sensor-enabled dose form comprises an ingestible event indicator system comprising dissimilar metals positioned on different sides of a framework and a control devices secured to the framework, wherein the ingestible event indicator system is configured to generate a voltage potential when in contact with a conductive fluid suitable to activate the control device and generate an electrical current through the conductive fluid.

17. A system, comprising:
an apparatus for detecting a metal contaminant in a sensor-enabled dose form, the apparatus comprising:
a guide to position a sensor-enabled dose form in a predetermined orientation;
a metal detector configured to receive the sensor-enabled dose form therethrough in the predetermined orientation, the metal detector configured to generate a detection signal when the sensor-enabled dose form passes through the metal detector; and
a comparator circuit configured to compare the detection signal to a predetermined threshold to determine when a metal contaminant is present in the sensor-enabled dose form; and
a controller coupled to the comparator circuit.

18. The system of claim 17, wherein the comparator circuit generates a control signal based on the detection signal.

19. The system of claim 18, wherein the controller is configured to reject contaminated sensor-enabled dose forms based on the control signal.

20. The system of claim 17, wherein the metal detector comprises at least one coil disposed about an aperture configured to receive the sensor-enabled dose therethrough.

21. The system of claim 20, wherein metal detector comprises at least two coils, wherein at least one coil is configured to generate a field and the other coil is configured to detect a fluctuation signal in response to receiving the sensor-enabled dose form through the aperture of the metal detector.

22. The system of claim 17, wherein the guide comprises a track with a slot to position the sensor-enabled dose form in a predetermined orientation.

23. The system of claim 22, wherein the slot comprises a horizontal slot to position the sensor-enabled dose form in a horizontal orientation.

24. The system of claim 23, wherein the slot comprises a vertical slot to position the sensor-enabled dose form in a vertical orientation.

25. The system of claim 17, wherein the sensor-enabled dose form comprises an ingestible event indicator system comprising dissimilar metals positioned on different sides of a framework and a control devices secured to the framework, wherein the ingestible event indicator system is configured to generate a voltage potential when in contact with a conductive fluid suitable to activate the control device and generate an electrical current through the conductive fluid.

26. A method comprising:
receiving a sensor-enabled dose form in a first predetermined orientation through a metal detector;
generating a first detection signal by the metal detector in response to the sensor-enabled dose form passing through the metal detector in the first predetermined orientation;
receiving the sensor-enabled dose form in a second predetermined orientation through the metal detector;
generating a second detection signal by the metal detector in response to the sensor-enabled dose form passing through the metal detector in the second predetermined orientation;
comparing the first and second detection signals; and
determining when a metal contaminant is present in the sensor-enabled dose form based on the difference between the first and second detection signals relative to a predetermined threshold.

27. The method of claim 26, wherein orienting the sensor-enabled dose form in the first predetermined orientation includes orienting the sensor-enabled dose form in a horizontal orientation and orienting the sensor-enabled dose form in the second predetermined orientation includes orienting the sensor-enabled dose in a vertical orientation.

28. The method of claim 27, comprising locating the sensor-enabled dose form in a guide comprising a horizontal slot to position the sensor-enabled dose form in the horizontal orientation and a vertical slot to position the sensor-enabled dose form in the vertical orientation.

29. The method of claim 26, comprising receiving the sensor-enabled dose form in any one of a center, left, or right position relative to the metal detector.

30. The method of claim 26, wherein the sensor-enabled dose form comprises an ingestible event indicator system comprising dissimilar metals positioned on different sides of a framework and a control devices secured to the framework, wherein the ingestible event indicator system is configured to generate a voltage potential when in contact with a conductive fluid suitable to activate the control device and generate an electrical current through the conductive fluid.

\* \* \* \* \*